United States Patent [19]

Hawley

[11] 4,399,503
[45] Aug. 16, 1983

[54] DYNAMIC DISK BUFFER CONTROL UNIT

[75] Inventor: Kenneth R. Hawley, Ventura, Calif.

[73] Assignee: Bunker Ramo Corporation, Oak Brook, Ill.

[21] Appl. No.: 920,831

[22] Filed: Jun. 30, 1978

[51] Int. Cl.³ ............................................. G06F 13/04
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,275,991 | 9/1966 | Schneberger | 364/200 |
| 3,647,348 | 3/1972 | Smith et al. | 364/200 |
| 3,820,078 | 6/1974 | Curley et al. | 364/200 |
| 3,911,401 | 10/1975 | Lee | 364/200 |
| 4,080,651 | 3/1978 | Cronshaw et al. | 364/200 |

OTHER PUBLICATIONS

Fisher et al., "Time Sharing on a Computer with a Small Memory", *Communications of the ACM*, vol. 10, No. 2, Feb. 1967, pp. 77-81.
Morris, "Demand Paging Through Utilization of Working Sets on the Maniac II", *Communications of the ACM*, vol. 15, No. 10, Oct. 1972, pp. 867-872.
Ling et al., "Cost-Oriented Algorithm for Data Set Allocation in Storage Hierarchies Based on Fundamental Data Set Characteristics", *IBM T.D.B.*, vol. 17, No. 5, Oct. 1974, pp. 1472-1474.
Mattson, "Storage Management of Linear Lists by Ordinal Numbers", *IBM T.D.B.*, vol. 19, No. 7, Dec. 1976, pp. 2709-2714.
Greenberg et al., "The Multics Multilevel Paging Hierarchy", *IEEE Intercon Conference Record 1975*, Session 20, p. 3, pp. 1-9.
Gold et al., "A Model for Masking Rotational Latency by Dyanmic Disk Allocation", *Communications of the ACM*, vol. 17, No. 5, May 1974, pp. 278-288.

*Primary Examiner*—Raulfe B. Zache
*Attorney, Agent, or Firm*—F. M. Arbuckle; A. Freilich

[57] ABSTRACT

A programmable control unit for disk memory and controller comprising a microprocessor (MPU), random access memory (RAM) used as a buffer to cache disk resident data used by a data processing system (DPS), and a configurable data path (CDP) which couples the DPS to the disk controller. The (MPU) is programmed to provide the DPS rapid access to disk resident data by so controlling the CDP as to maintain a memory cache of disk resident data in the RAM. Data is cached under either directed control via an application level task or operator console directive, or under dynamic control through which a predetermined number of successive blocks of data are read from the disk and stored in the RAM each time any one block is addressed, and once the RAM is full, by discarding from the RAM a block of data which the immediate history has shown is least useful.

10 Claims, 98 Drawing Figures

| STARTING DISK BLOCK ADDRESS 2 WORDS |
|---|
| ENDING DISK BLOCK ADDRESS 2 WORDS |
| CACHE POINTER-CACHE BLOCK NO.    BIT-15 - '1' FOR EXT. CACHE |
| HIT COUNT |
| CACHE STATUS |
| SPARE |

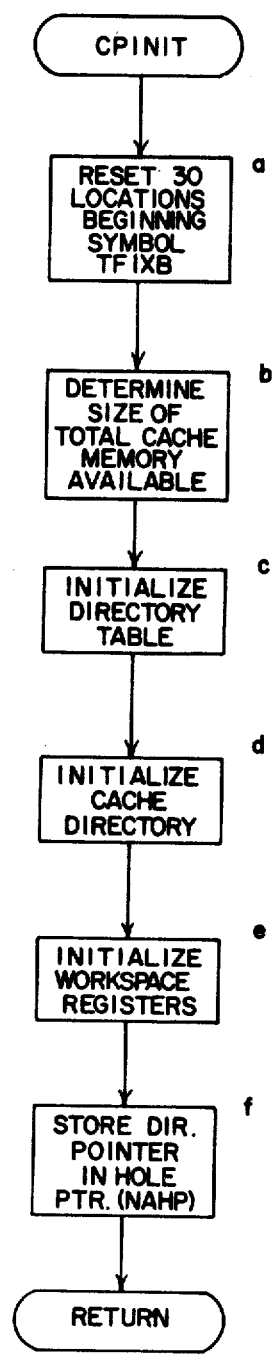
TFIXB = TOTAL NO. OF BLOCKS FIXED IN CACHE
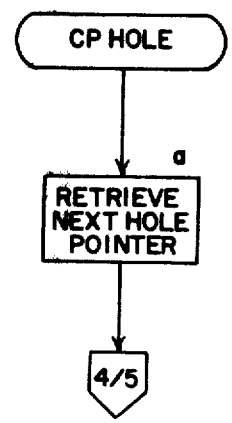
FIG. 30
FIG. 26

DATA PATH QUAD BUFFER

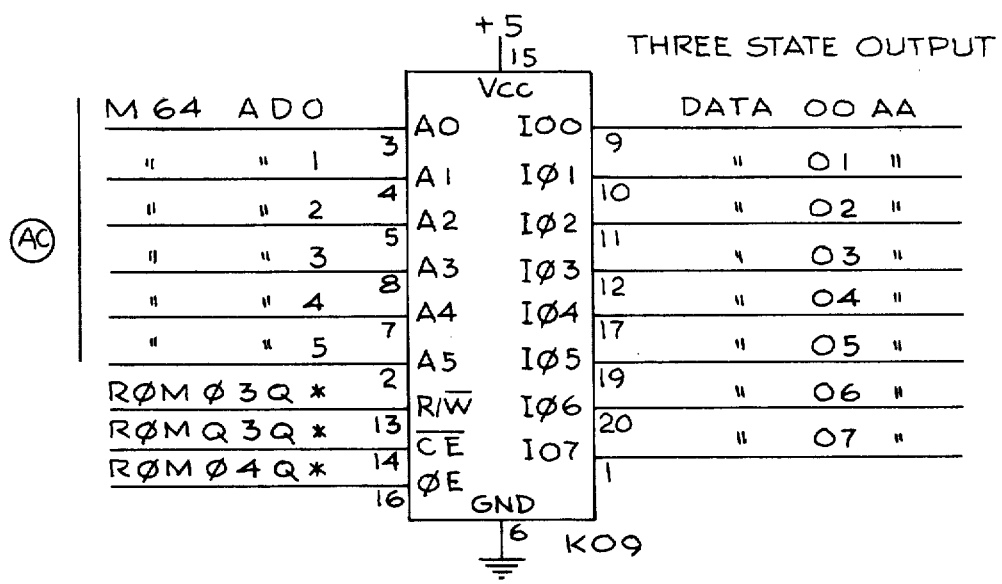
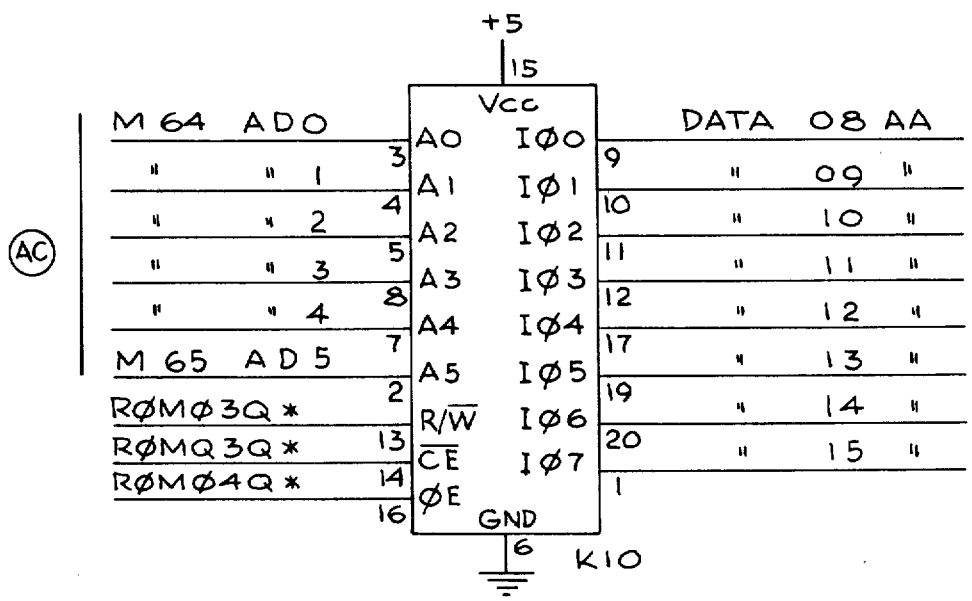
TMS 4036-2
64×8 RAM
MAIL BOX MEMORY
*Fig. 35AE*

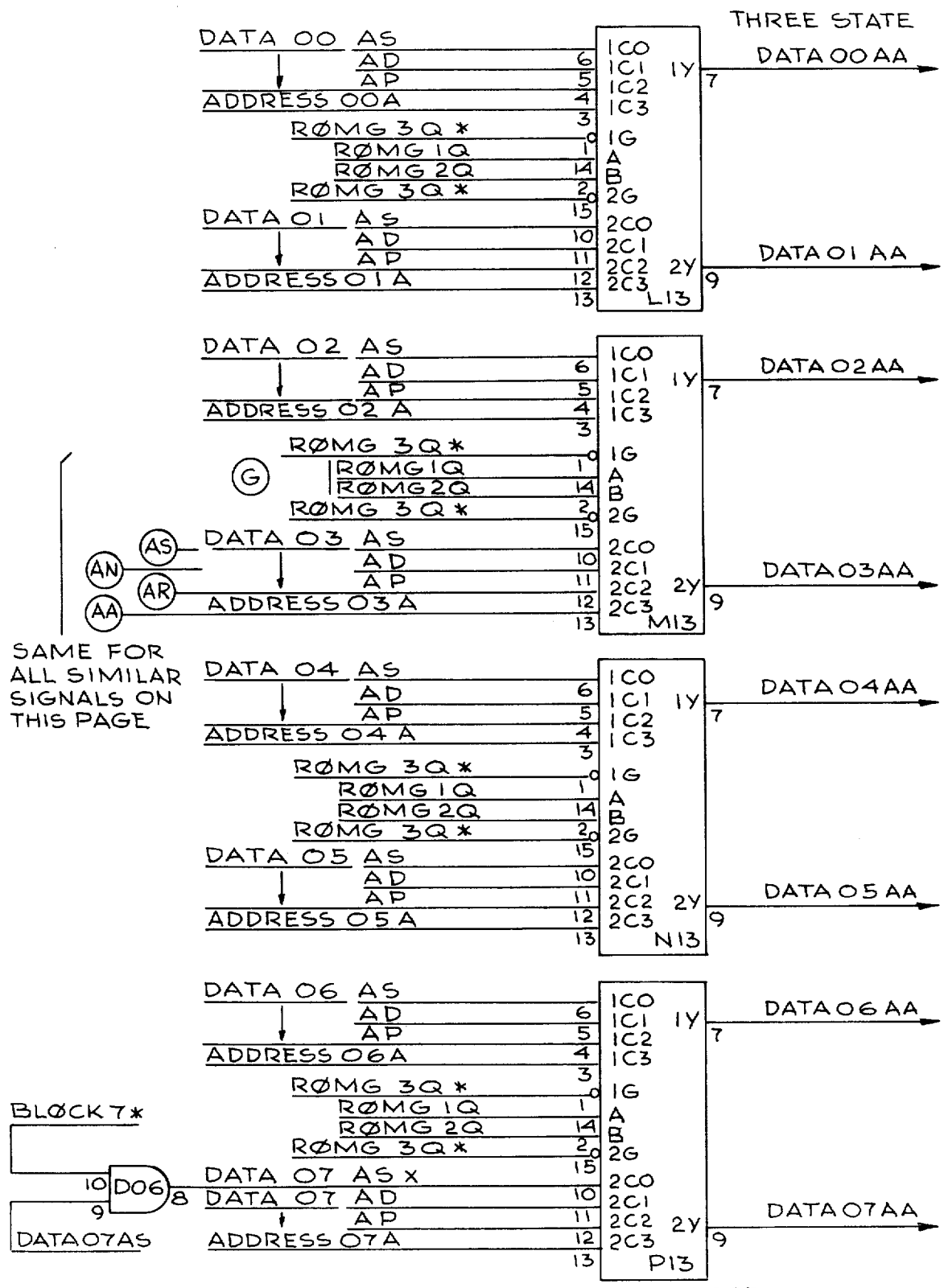

DATA PATH MUX BITS 8-15

MPU DATA MUX BITS 0-7

LS257
DATA PATH MUX 0-15

S BUS INTERFACE CONTROL

D/M INTERFACE CONTROL

D/M PORT ADDRESS

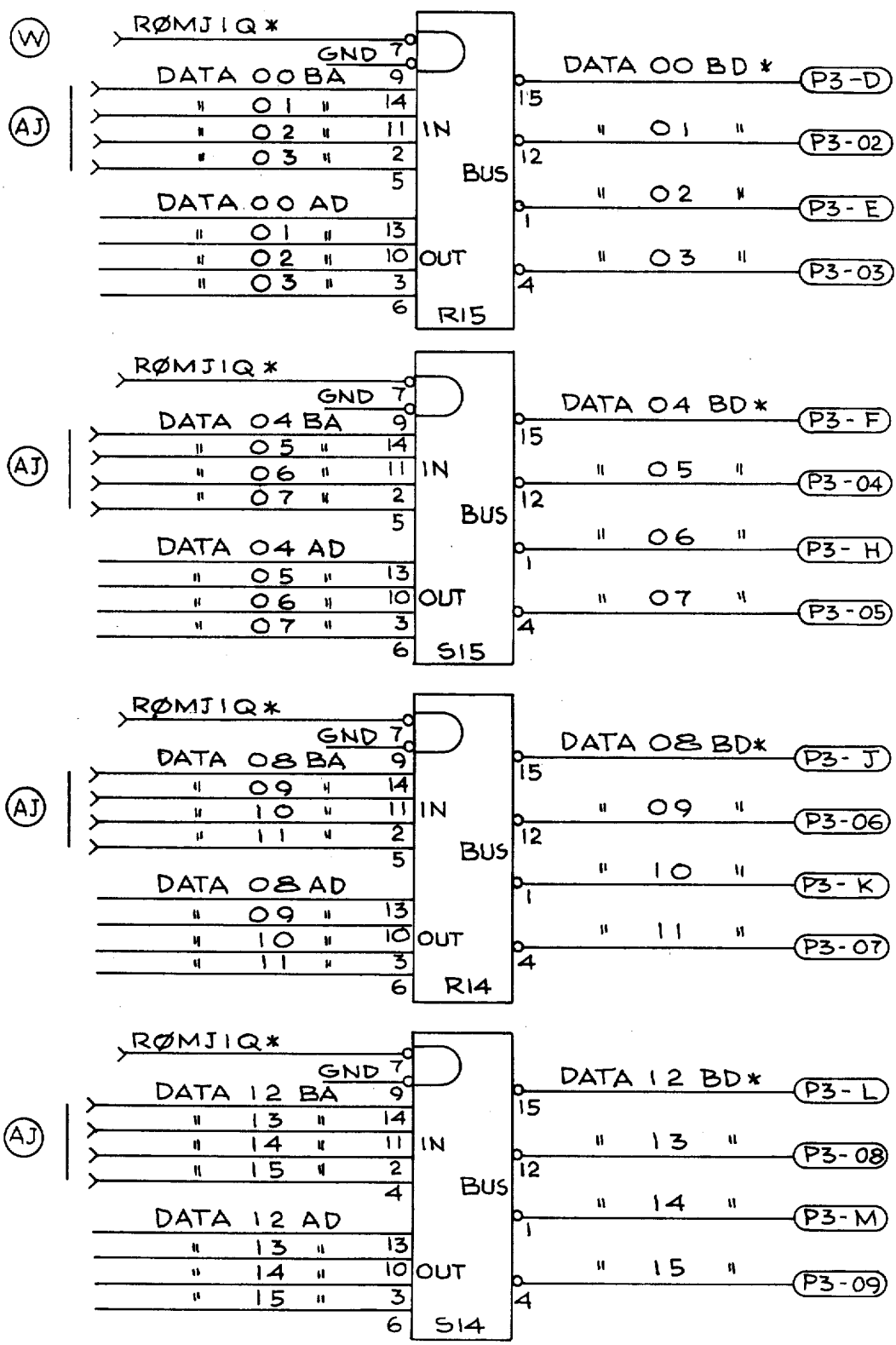

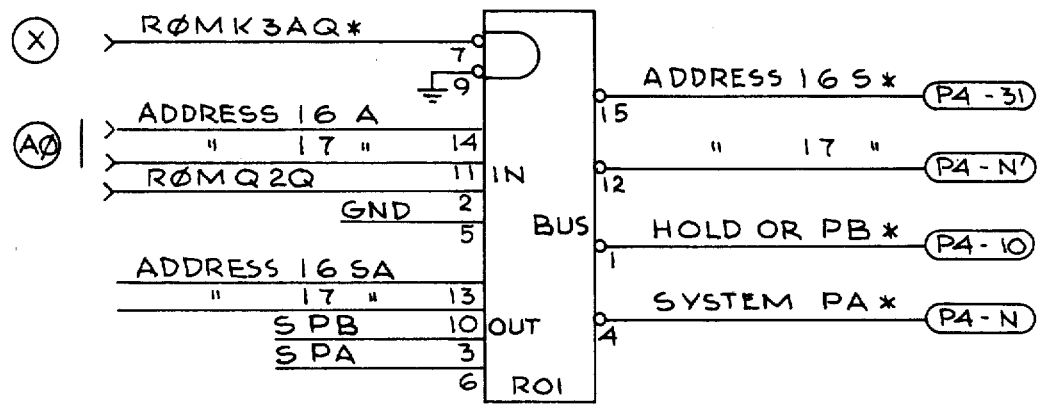
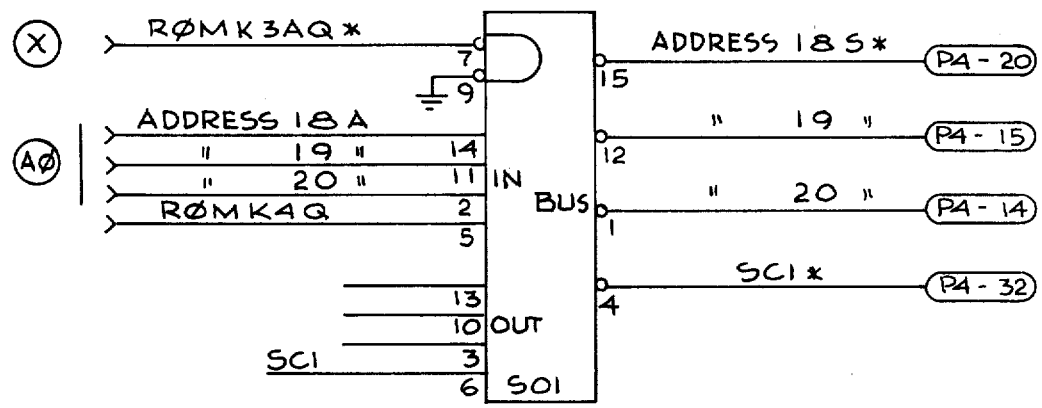
S PORT ADDRESS BUS
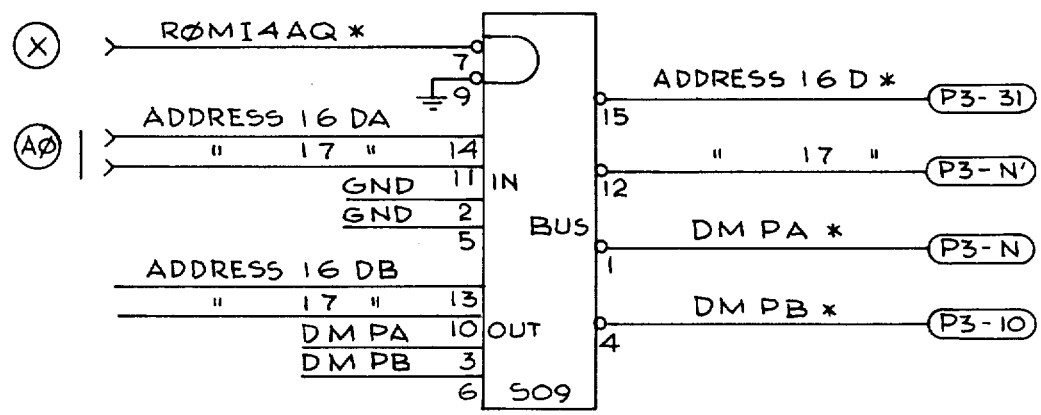
DM PORT ADDRESS BUS
Fig. 35AP

S PORT DATA BUS

S PORT ADDRESS BUS

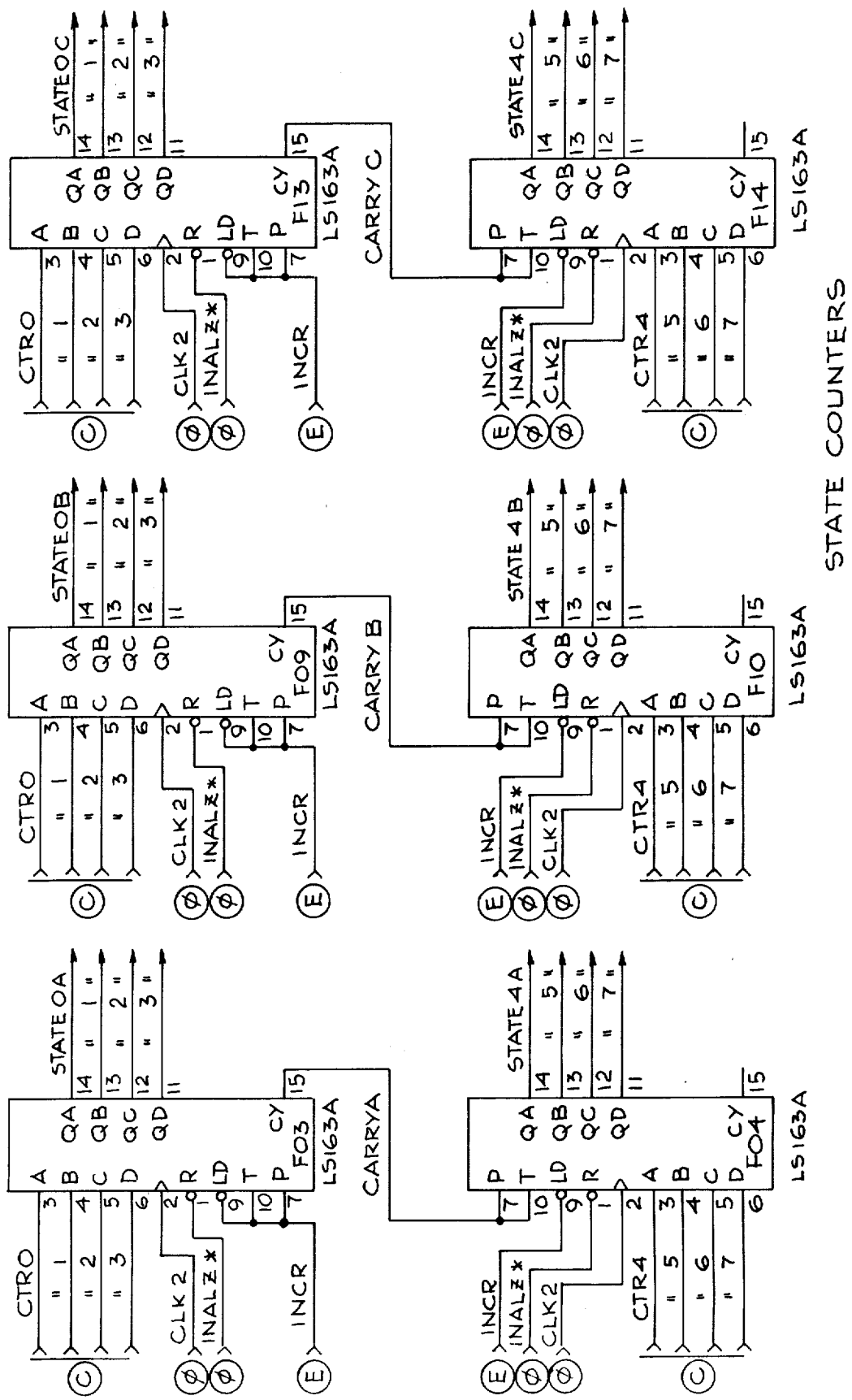

Fig. 35F — CONTROL ROMS — IM 5624

CONTROL ROMS

INVERTING ROM OUTPUT BUFFERS   LS175 QUAD D.

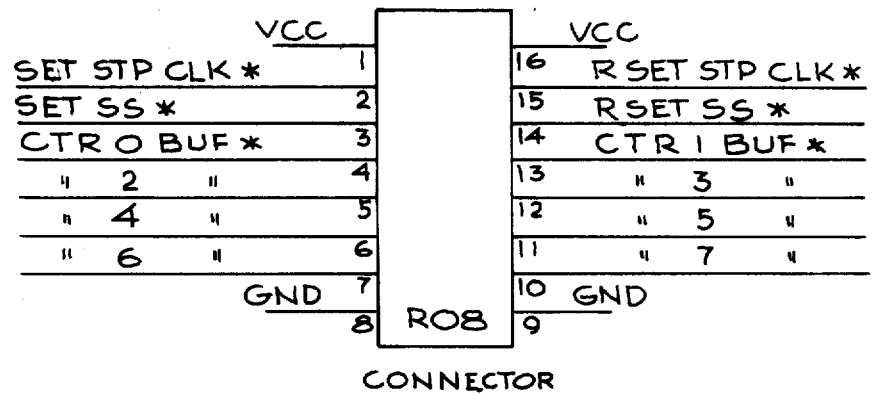
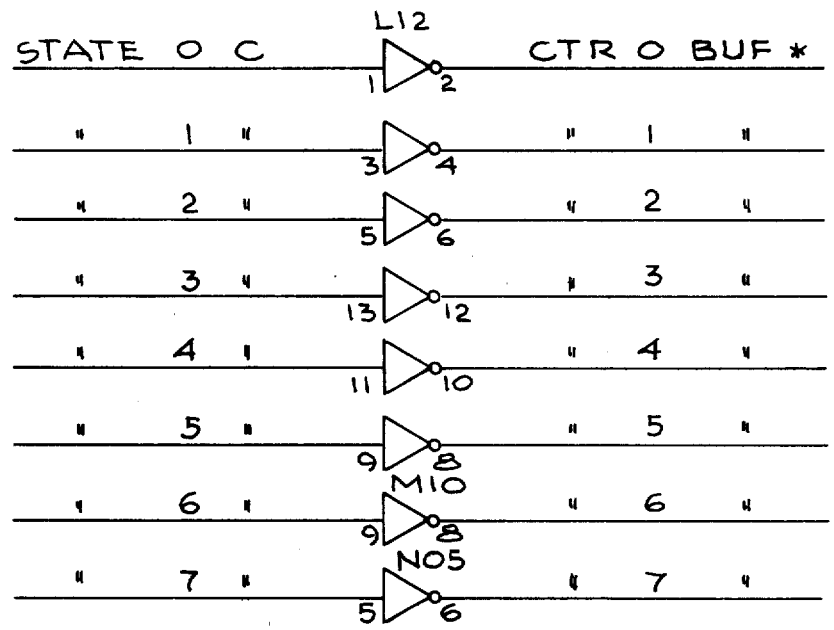
Fig. 35 Q

GET SRC OR DESTINATION PORT FOR THE DISK

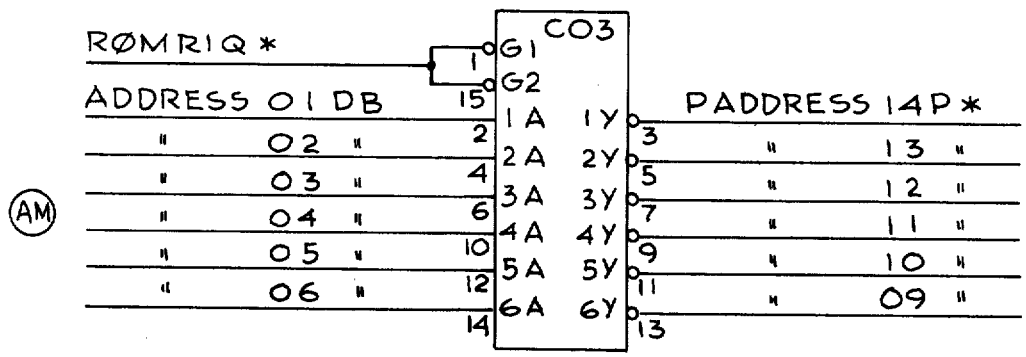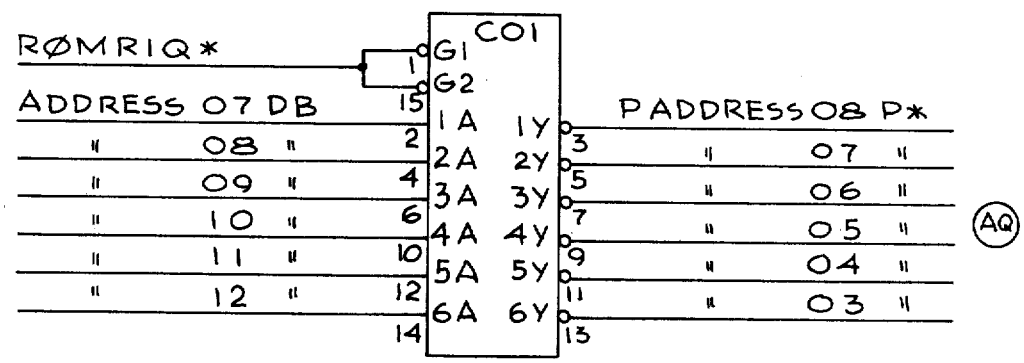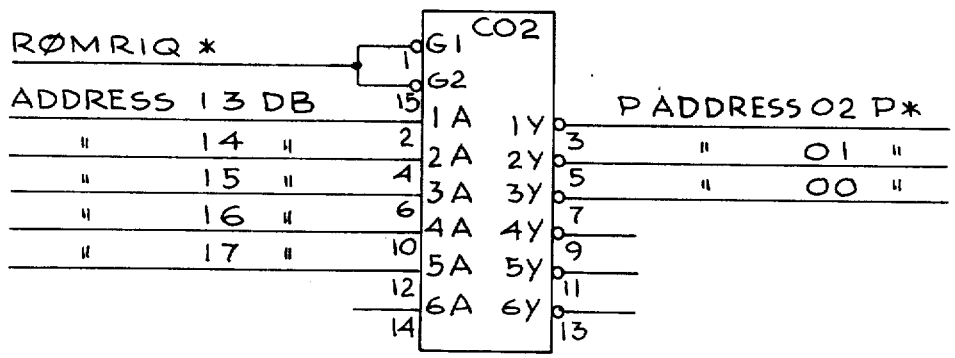
DM ADDRESS TO MPU MEMORY
Fig. 35W

DM, S BUS MASTER SYNC CONTROL

DYNAMIC DISK BUFFER CONTROL UNIT

BACKGROUND OF THE INVENTION

This invention relates to an improvement in information management systems and more particularly to apparatus for optimizing the throughput of such systems that use magnetic disk memory as auxiliary storage for data.

Flexible and very capable computer based data handling and control systems have been devised and put into use at sites all over the world. One such system consists of multiple AN/GYQ-21(V) units of Interactive Analysis Systems designed for automated data handling and control of multisource intelligence information and command/control data. The systems perform five basic functions:

Message control, storage and distribution.
Interactive analyst support and analytical aid.
Multi-channel, multi-level communications.
Special support through computer graphics and display.
Reference document and report preparation support.

Each unit is made up of a central processing unit (CPU), a mass data file, programmable communication controllers and real time operational software. Within a site, units are linked together to create a single operational entity, with each unit contributing its designated tasks to the overall system operation. This technique of "distributed processing" permits each unit to compute simultaneously with other units, accessing its own or other unit's data on a priority basis, resulting in a net performance more powerful than most large-scale machines. As workload requirements change, units may be added or removed as required.

At some sites, the units are interconnected to large-scale, host digital computers. In that case, the system acts as a front-end processor, relieving the host computers of considerable work associated with just the tasks interfacing to external systems. In combination with keyboard/display terminals, large screen wall displays and hard copy printers, the system provides automated assistance to the users in the performance of their duties. This is accomplished by a direct interactive dialog between the terminal user and a worldwide network of similar systems and data bases. The user has the ability to rapidly receive, transmit, and display data from similar sites throughout the world. In addition, the system has a variety of methods for communicating with the user in the manipulation, fusion, and exploitation of the data. Through the keyboard and displays the system provides:

Status of current events and pending actions through automatic interrogation of data bases and surveying of message profiles. Data in the form of interterminal messages, standard data formats, free text from historical files and reference documentation, and computer-generated graphics. Procedural aids with display forms completion, computer directed prompting and editing. Operational feedback of user actions with the system, in the form of displayed notices. Alarms to call the user's attention to critical events or messages. Special operational capabilities as teleconferencing, automatic call-back, bulk message transmission to individual addresses or priority broadcast, remote job entry, timesharing, and automatic logging and report generation.

A typical application of such a system involves a heavy communications processing load, large-scale on-line data base operations, and sophisticated support of a large analyst terminal population. Many systems are part of distributed processor configurations involving 3 to 10 systems, each with billion-character on-line data bases. Initially, some of these systems encountered problems due to inefficient use of hardware and software resources and other design problems, which lead to premature system saturation and lack of responsiveness. With more imaginative and enlightened use of system resources, however, it has been demonstrated that these problems can be overcome. These experiences did highlight the factors limiting system performance in these applications and indicated the next significant system enhancement. These performance-limiting factors are main (core) memory utilization and disk access time.

Several conventional remedies to this problem have been investigated and determined to be considerably less than optimum. First, the addition of a large central processing unit, such as PDP 11/70, to the system processor family with its two-million word memory capacity is a solution if the performance limits are construed as due solely to lack of memory capacity. The system provides several mechanisms whereby tradeoffs between added core memory and reduced disk access delays can be made. While these measures can be effective in reducing delays involving system task loading, they are of only limited value in large data base, multi-user systems. In such systems, large numbers of different files are always active, and the price of maintaining in cache memory the resulting large numbers of core resident-user directories, indices, and file headers employed by these techniques is prohibitive.

A second technique traditionally employed is the use of fixed, as well as moving, head disks in a hierarchy of progressively more rapid access but smaller capacity media. This technique approximately duplicates the performance achieved by the large PDP 11/70 mentioned above and suffers from the same limitations. Because of their small capacity (500K words), only a fraction of the concurrently active files could be stored in cache memory. Furthermore, the frequency of use of every block in the file, except for system files (tasks images, etc.), would not justify the processing overhead required for the initial transfer of the data from the main data base to the intermediate storage media. Such a technique would only be effective for providing preferential treatment to a very small set of files on a semi-permanent basis. Furthermore, overall access delays of 10 to 20 milliseconds would still be incurred. A variant of this technique utilizes bulk core replacements for the fixed head disk units. This has the advantage of much smaller access delays, but suffers from capacity limitations.

The solution provided by the present invention is functionally similar to the conventional solutions mentioned above, but with at least one significant difference. Although a limited capacity random access memory is used, its use is highly selective and based upon predictable demands for disk resident data and dynamically imposed priority criteria. The invention exploits certain file management system attributes to minimize the amount of fast access memory required to perform its function. The net result is that for each user transaction, only those blocks of data actually to be processed next are cached in fast access memory, and disk transactions are carried out in larger, more efficient multi-block transfers.

OBJECTS AND SUMMARY OF THE INVENTION

An object of this invention is to increase the throughput and responsiveness of a data processing system (DPS) utilizing disk memory. Other objectives are to pre-access and hold in high-speed random access memory (RAM) the most frequently used disk resident data; to eliminate short-term repeated reads of the same disk data; and retrieve more file data per disk access without requiring larger buffer memory for the disk. These and other objects of the invention are achieved in a preferred embodiment by a programmable control unit interposed between one or more disk memory subsystems and a (DPS) comprised of a central processing unit (CPU), and optionally a main memory. The control unit is capable of pre-accessing and holding in RAM a small percentage of the disk resident data using a dynamic method to transfer blocks of data from a disk into the RAM, and to continually determine what data to hold in the RAM by initially holding all data it reads in single-block increments, and then determining what data to retain based upon the immediate history of the usefulness of the data. In the dynamic method, any disk access for one block of data results in the next predetermined number of blocks (e.g., four blocks) of data also being read into the RAM, on the expectation that they will be accessed next. As this data is accessed in the RAM, it is reentered. The control unit maintains a directory of data held and determines what data to discard whenever new blocks of data are read from the disk memory.

In operation, all disk resident data read is cached in the RAM, until all the RAM capacity has been used. Then, based upon predetermined parameters determining least useful data, the control unit causes new data accessed in the disk memory to replace the least useful cached data. The DPS may periodically modify parameters of the criteria used in this determination in an attempt to maintain the greatest effectiveness in the use of the RAM regardless of the type of system activity. Basically, the program in the control unit maintains a reentry directory in which reentries from the RAM, as entries from the disk memory, are effectively placed at the end of the directory used as a replacement queue, while other entries which progress to the head of the directory are discarded. Frequently accessed and reentered blocks thus remain in the RAM longer. In fact a block of data used frequently over an indefinite period of time may be retained indefinitely. A variety of initialization and retention factors can be used, and updated, to vary the retention time. For example, two accesses within a number of successive accesses for all disk resident data may be required before any entry is moved back to the end of the directory. The number could be varied from time to time, and the number chosen may depend upon the type or class of data being accessed. As a directory entry is moved to the end, all other directory listings are moved up to fill the vacancy left by the entry moved to the end. In that manner the directory functions as a control on the use of the RAM.

In the preferred mode of practicing the invention, the entries themselves are not reordered in the directory. Instead a pointer table is maintained for the entries, and it is in the pointer table that entries are rearranged for the implementation of this technique, although the entries themselves could be reorganized if the entries were short enough to fit in one or two memory words to make it feasible. In that manner the entries in the directory maintained by the control unit as well as the blocks of data in the cache memory remain in place while only the pointers are rearranged.

The control unit is preferably implemented by a microprogrammed configurable link or data path between three ports, a first port, S, to the data processing system, a second port, D/M (to be referred to more simply as the D port), to the disk and/or cache memory, and a third port, P, to a microprocessor having a memory in which a control program is stored, and in which disk resident data may be stored. Disk resident data may also be stored in an extension to the microprocessor memory. The microprocessor receives instructions from the data processing system that are intended for the disk controller, but are intercepted by the configurable data path (CDP). The microprocessor then acts on the instruction, deciding whether data called for is to be read from the disk to the data processing system, and cache memory, or from the cache memory, and directing the CDP accordingly. It also decides whether data being transferred to the disk is to update data also in cache memory, and if so directs the CDP to update the cache memory. The CDP receives macroinstructions from the microprocessor and executes the instructions through the execution of microprogrammed routines.

BRIEF DESCRIPTION OF THE DRAWINGS

FIGS. 26 through 34 illustrate caching program (CP) flow charts for programmed subroutines, as follows:
26. CPINIT—initialize cache program
27. CPFIX—fix disk blocks in cache 28. CPREAD—read disk blocks
29. CPSORT—order the pointer table
30. CPHOLE—make a space in the dynamic cache
31. CPWRITE—write disk blocks
32. CPDEFIX—deallocate fix in cache
33. CPDLTE—deallocate READ from disk in the cache
34. DPSRBK—search cache for disk block number FIGS. 35A through 35J and 35M through 35Z and 35AA through 35AT are logic diagrams for an exemplary implementation of the functional block diagram illustrated in FIG. 3 wherein logic diagrams are called out by a circled letter or letters corresponding to the figure letter, or letters. For the sake of clarity and brevity, the logic diagrams of FIGS. 35A through 35J, 35M through 35Z and 35AA through 35AT will sometimes herein be referred to merely by their letter designation. Thus, for example, it will be understood that the circled letters of FIGS. 3 and 5 refer to the correspondingly lettered logic diagrams of FIG. 35.

DESCRIPTION OF PREFERRED EMBODIMENTS

Figure 1:
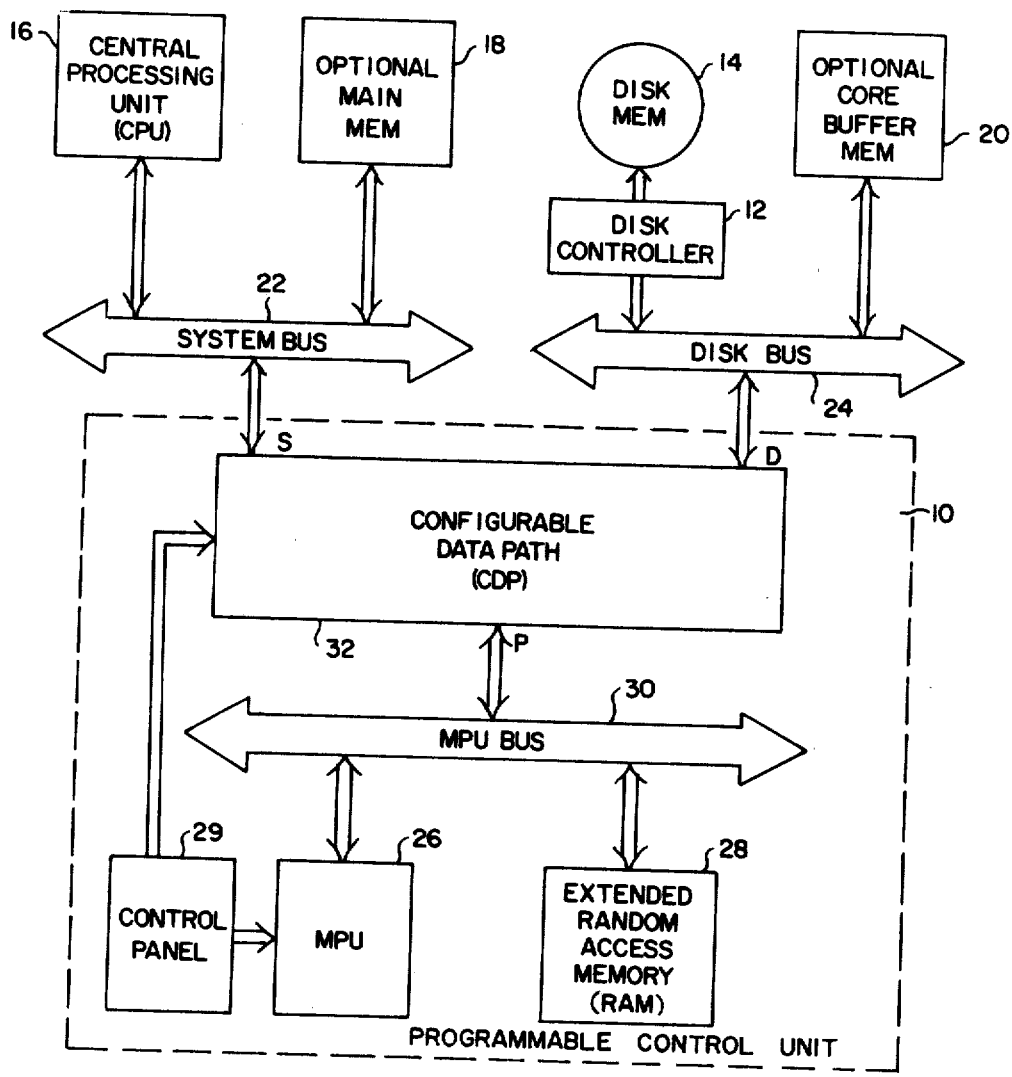
FIG. 1 illustrates a functional block diagram of the present invention.

Referring now to FIG. 1 of the drawings, there is shown a functional block diagram for a programmable control unit 10 capable of optimizing throughput between one or more standard disk memory subsystems, each comprised of a disk controller 12 and a disk memory 14, and a data processing system (DPS) comprised of central processing unit (CPU) 16 and an optional main memory 18, and associated with the disk memory subsystem is an optional core buffer memory 20. Connection between the CPU, main memory and the control unit is through a system bus 22, and connection between the disk memory subsystem, buffer memory and control unit is through a disk bus 24.

The purpose of the control unit 10 is to enhance system throughput by reducing the average time required to retrieve data from the disk memory subsystems. While only one CPU is illustrated in the preferred embodiment to be described, it will be readily appreciated that a plurality of independent processors may be accommodated to have access to one or more disk memories by proper programming of the control unit.

The purpose of the control unit is achieved by preaccessing and holding a predetermined small percentage of the disk resident data. The data is held in either a small high-speed random access memory (RAM) of a microprocessor (MPU) 26 or an extended random access memory (RAM) RAM 28. The effectiveness of this control unit in fulfilling its purpose is dependent upon the extent that requests for disk resident data can be anticipated. It has been demonstrated that for several typical applications, this can be done for 60% of the disk data requests for an improvement in throughput by a factor of 2 or 3. With program routines in the microprocessor for dynamic self-optimization, even greater improvement in throughput is possible.

The microprocessor 26 may be a conventional series 990 manufactured by Texas Instruments, Inc. It includes a programmers control panel 29, and it includes a programmable read-only memory (PROM) of 1 K to 3 K word capacity, and a RAM of 1 K to 28 K capacity. Assuming a maximum of 28 K, the buffer memory 20 may not be required, particularly if the extended RAM 28 of 24 K word capacity is provided in the control unit. In either case, the optional buffer memory 20 may be provided for use in the same manner as the RAM 28 in those applications that require it. A suitable buffer memory is a model BR-1539 made by Bunker Ramo Corporation with 16 K to 124 K word capacity.

The microprocessor 26 is connected to the RAM 28 (when included) by a bus 30. That bus is in turn coupled to the system bus 22 and the disk bus 24 through a configurable data path (CDP) 32 controlled by the microprocessor via the bus 30. The CDP has three ports: S, P and D/M (for disk and optional cache memory) which will hereinafter be referred to simply as port D.

Port S is made to be compatible with system bus, be it a Digital Equipment Corporation (DEC) Unibus or a Bunker Ramo Corporation B bus. For some data processing systems, such as the DEC PDP-11/70 systems, a memory interface unit may be required between the processor Unibus, the main memory bus aand port S of the CDP, such as the BR-1566 Memory Bus produced by the Bunker Ramo Corporation. Where the main memory can be connected to the system bus of the CPU, such as in the case of the DEC PDP 11/45, such an interface will not be required. It is this simpler case that is illustrated in FIG. 1. Port D is made to be compatible with the bus 24 while port P is made to be compatible with the microprocessor bus 30.

The CDP connection states are synchronous with the microprocessor clock, but transfer of data through the CDP connections are asynchronous. The CDP data path is therefore double clocked for holding the appropriate port for the duration of the transfer. The possible transfers are between ports S and D, ports S and P, and ports P and D, and in each case the transfer to or from a port may be to or from any unit connected to the bus to which the port is connected. The primary transfers of interest in the present invention are: from the disk to the CPU, with bifurcated transfer to cache memory (28 or 20) of the block transferred plus the next four blocks of disk memory; from cache memory (28 or 20) to the DPS; from CPU to disk; and from CPU to cache memory and then disk memory.

The CDP control registers are maintained and accessed by the microprocessor as specific memory locations. Other memory locations which can be accessed by the microprocessor outside of its memory are located in the RAM 28. Consequently, part of the memory addressing capability of the microprocessor is reserved for these registers in order to define the configurable data paths between ports. Assuming a 15-bit Hex address word, the control register assignments are as follows:

F400-ENCODED CDP FUNCTION

The bits 15 through 13 of the byte F400 are used to specify the CDP functions. Bits 12 through 8 act like momentary push buttons. That is, each time the microprocessor outputs a binary 1 in bits 12 through 8, the activity associated with that bit takes place. Bits 8-0 define the F400 address. A binary 1 in bit 12 will cause the CDP to start the activity identified in bits 15-13. A binary 1 in bit 11 will cause the CDP to send an interrupt vector address (see byte F405) to the S port CPU. A binary 1 in bits 10, 9 or 8 will reset the interrupt to the microprocessor from the S port, the D port (see byte F404) or the CDP. The eight possible functions and 5 activities of the CDP are as follows:

| Bits |
| --- |

-continued

| 13 | 14 | 15 | Function |
|---|---|---|---|
| 0 | 0 | 0 | CDP Idle |
| 0 | 0 | 1 | Transfer data from D/M to S |
| 0 | 1 | 0 | Transfer data from S to D/M |
| 0 | 1 | 1 | Transfer data from P to S |
| 1 | 0 | 0 | Transfer data from S to P |
| 1 | 0 | 1 | Transfer data from D/M to P |
| 1 | 1 | 0 | Transfer data from P to D/M. |
| 1 | 1 | 1 | Count down word count registers to zero, give interrupt. (diagnostic function). |

| Bit | Activity |
|---|---|
| 12 | 1 = Initiate CDP activity defined in bits 13-15. |
| 11 | 1 = Send interrupt to CPU on S Port. |
| 10 | 1 = Clear interrupt from S Port. |
| 9 | 1 = Clear D/M Port interrupt. |
| 8 | 1 = Clear CDP interrupt |

F401-CDP INTERRUPT CONTROL

Byte F401 contains the interrupt control and status bits as well as a bit (7) that determines the slave that responds to a D port master. Bits 0, 2, 4 and 6 are binary 1 if the respective interrupts have not been serviced, regardless of the state of the respective blocking bit. The interrupt mask or blocking bits 1, 3 and 5 are set to one by the microprocessor to prevent a pending interrupt from actually being sent to the microprocessor. The bit assignments are as follows:

| Bit | Function |
|---|---|
| 0 | 1 = Interrupt Pending from S Port |
| 1 | 1 = Allow S Port Interrupt |
|   | 0 = Block S Port Interrupt |
| 2 | 1 = Interrupt Pending From D/M Port |
| 3 | 1 = Allow D/M Port Interrupt |
|   | 0 = Block D/M Port Interrupt |
| 4 | 1 = CDP Transfer Complete Interrupt Pending |
| 5 | 1 = Allow D/M Port Interrupt |
|   | 0 = Block D/M Port Interrupt |
| 6 | 1 = Interrupt to S Port Pending |
| 7 | 1 = D/M Port Master to S Port Slave |
|   | 0 = D/M Port Master to D/M Port Slave |

Note:
Use SOC command to change bits 1, 3, 5 or 7.

F402-CDP STATUS BITS

Byte F402 contains the CDP error status bits as follows:

| Bit | |
|---|---|
| 15 | D/M port line PA (1 = error) |
| 14 | D/M port line PB (1 = error) |
| 13 | S port line PA (1 = error) |
| 12 | S port line PB (1 = error) |
| 11 | CDP timeout on D/M port |
| 10 | CDP timed out on S port |
| *9 | 1 = continue transfer if data parity error |
|    | 0 = half transfer at data parity error |
| *10 | 1 = S port is B bus |
|    | 0 = S port is Unibus |

*Jumper controlled on CDP as status bits to the CPU.

Error bits 15-10 are cleared when a CDP transfer is initiated. Bits 15, 14, 13 and 12 report the status of S or D port lines PA and PB. IF these lines are asserted at any time during a CDP controlled transfer that assertion is locked into byte F402 and will not be cleared until another transfer is initiated. Bits 11 or 10, when binary 1, indicate that the CDP, as bus master, timed out on the S or D port and abandoned the transfer requested. Bit 9 is a status bit indicating that the CDP will halt a transfer if a data parity error is detected (0) or continue the transfer (1). Bit 10 indicates the configuration of the S port: Binary 1 indicates a B bus (PDP 11/70) and binary 0 indicates a Unibus (PDP 11/45), thus providing for two configurations, although only one is illustrated.

F403-PAGE SELECT REGISTER (PSR)

The microprocessor may indirectly access any address space on the disk (D) bus. A paging scheme uses the PSR register to supply the eight most significant D bus address bits (n). The least significant nine word select bits (x) are supplied by the microprocessor address bus 30. (The byte select bit 15 is binary 0). Using nine select bits the page size is $512_{10}$ words. The $512_{10}$ words starting at F000 (microprocessor address) is paged thru to the D bus. This feature is normally used to access the input-output (I/0) space control registers but it may also be used to access any D bus address space.

```
MICROPROCESSOR ADDRESS BITS   0 1 2 3 4 5 6 7 8 9 10 11 12 13 14 15
FOOO Through F3FE             1 1 1 1 0 0 X X X X X X X X X X
PAGE SELECT REGISTER          17 16 15 14 13 12 11 10 9 8 7 6 5 4 3 2 1 0
D BUS ADDRESS                 n n n n n n n n X X X X X X X X X 0
```

F404-INTERRUPT VECTOR ADDRESS FROM D PORT

Byte F404 contains the interrupt vector address (IVA) received from interrupting D bus resident. The largest possible address is $374_8$ according to the following:

| | | | Bit | F404 | | | |
|---|---|---|---|---|---|---|---|
| 8 | 9 | 10 | 11 | 12 | 13 | 14 | 15 |
| X | X | X | X | X | X | 0 | 0 |

F405-INTERRUPT VECTOR ADDRESS TO S PORT

Byte F405 contains the interrupt vector address that is transferred to the CPU. The largest possible address is $374_8$ according to the following:

| | | | Bit | F405 | | | |
|---|---|---|---|---|---|---|---|
| 0 | 1 | 2 | 3 | 4 | 5 | 6 | 7 |
| X | X | X | X | X | X | 0 | 0 |

F406-CDP WORD COUNT REGISTER BITS 0-15

Prior to initiating a CDP transfer, F406 must contain the complement of the number of words to be transferred. Maximum transfer is 65K words.

F408-P PORT ADDRESS BITS 0-15

If the P Port is involved in a CDP Transfer, F408 must be loaded with the starting P Port address (in byte).

F40A-D PORT ADDRESS BITS 0-15

If the D Port is involved in a CDP transfer, F40C must contain the least significant portion of the D/M port starting address (in byte).

F40C-S PORT ADDRESS BITS 0-15

If the S Port is involved in a CDP transfer, F410 must contain the least significant portion of the S port starting address (in byte).

F40E-D PORT ADDRESS BITS 16-21

Byte F40E contains the most significant address bits for the D Port.

F40F S PORT ADDRESS BITS 16-21

Byte F40F contains the most significant address bits for the S Port.

Any attempt by the S port processor to access 64 predetermined words in the S port bus I/Q space will result in the CDP's mapping the accessed location in P port memory space starting at $0_m00$, where n is any hex digit from 1 to F. If the attempted access is a DAT$\emptyset$, the CDP will turn on the S port to P port microprocessor interrupt.

This concludes a description of the control register assignments. The microprocessor controls the CPD by loading these registers with the appropriate control words.

The function of the microprocessor controlled CDP is to achieve the objective of preaccessing and holding (caching) a predetermined small percentage of the disk resident data. The data is held in either a small RAM 28, or optionally a larger core buffer memory 20. There are two basic methods for controlling the contents of the cache memory (20 or 28), i.e., determining what is cached. In general, both methods are employed concurrently. With one method, a directed method, the microprocessor is directed via an application level task or control panel directive to hold or remove certain data from the cache memory. When this one method is not being directed, the second method is in operation.

Unlike the directed method, the second method, a "dynamic" method, depends upon the use of an internally executed algorithm in the microprocessor to determine what data to retain in the cache memory. It initially holds all data it reads in single-block increments. Then based upon the immediate history of disk activity, it predicts what cached data is least useful and can be displaced.

The dynamic caching algorithm is in reality a composite of two algorithms termed "look-ahead" and "additive accounting." Only one is in effective control at a time as directed by the microprocessor software which is monitoring cache effectiveness.

In addition to shifts between the two basic algorithms, finer increments of control may be achieved within each algorithm by varying their parameters. Since cache effectiveness is sensitive to the type of system activity, at least these two algorithms are used because they are mutually complimentary in this regard and are individually the most effective as well. Thus, operating much like the control element in a servo system, the microprocessor software may periodically modify these parameters in an attempt to maintain the greatest cache effectiveness regardless of the type of system activity. Since the controlling software is for the microprocessor, the software is, in general, provided as firmware, i.e., program routines stored in a read only memory. Therefore each basic type of disk memory will require separate firmware modules. As a consequence, the exemplary software will be described in general terms with reference to flow charts following a more detailed description of the CDP organization. The programmable control unit (hereafter sometimes referred to as simply the control unit) will operate by intercepting the existing communications between the various disk handlers (software programs in the data processing system) and the disk memory subsystem, and respond appropriately in both directions.

Before proceeding with a description of the CDP organization, the objective of that software will be discussed briefly. The objective is similar to the conventional software system technique of fixing frequently used tasks and data tables in a main memory, except that an auxiliary memory (20 or 28) is used instead. The operation is transparent to the data processing system which interfaces with the disk subsystem for these transactions as before. In short, the control unit will provide an extension of the data processing system capability to fix portions of program base and other specified data in main memory, but without consuming additional main memory resources.

In addition to disk data which will be "fixed," a large percentage of system requests for disk data are repeats of previous requests made only a short time earlier. Because of limited main memory resources, this data cannot be held in main memory between requests. The control unit, however, will provide temporary storage and control for holding a significant percentage of such data. The length of time a particular data block is stored (cached) will be a function of available cache memory and the data block's usage. Assume a system which allocates disk space in five-block increments, and assume that all files are specified or maintained as contiguous, or are not contiguous to the extent of at least these segments. In order to conserve main memory, most files are processed in single, or at most double block segments. This results in separate disk accesses for each file segment. Sufficient processing delay occurs between successive segment retrievals in multi-user systems so that disk transactions involving other files may occur. This causes another seek delay to be incurred. A significant system improvement will thus result when the control unit is directed to read multiple (up to five) blocks per disk read access, even though the one block is requested. The desired block will be routed to the data processing system, but all five blocks will be cached in anticipation of the succeeding requests requiring them. Thus, in sequential search file operations, only one actual disk access in five need be made. This is the objective of the "look ahead" algorithm referred to above.

Once the cached memory has reached capacity, it becomes necessary to control what cached data can be displaced as new requests for data cause additional multiple blocks to be read from disk memory into cache memory. As noted hereinbefore, there is a directed method in which the control unit is directed to hold (fix) or remove certain data from cache memory. The data is then held until a second directive is received, via an application level task or control panel, to remove (unfix) it. Unlike the directed method, the dynamic method depends upon the use of an internally executed algorithm to determine what data to retain in memory cache. It holds all data it reads in response to requests. It then, based upon the immediate history of disk resident data requests, determines what previously cached data is least useful and can be displaced to make room for the next data to be cached.

The dynamic caching algorithm is in reality a composite of two algorithms, one termed "look-ahead" as described hereinbefore, and the second termed "additive accounting." In addition to shifts between these two basic algorithms, finer increments of control may be achieved within each algorithm by varying their control parameters, as noted hereinbefore. Since cache effectiveness is sensitive to the type of system activity, two algorithms were selected, because they are mutually complimentary in this regard and are individually the most effective as well.

However, it should be recognized that in addition to these two complimentary dynamic algorithms, other algorithms may be added. The disk controller functions remain basically the same. These are: dequeue disk access requests, validate request parameters, convert request parameters, load and read disk subsystem hardware registers, perform soft error recovery, and report transaction status.

The data processing system communicates via the bus 22 to control the control unit, (CDP and microprocessor) for the purpose of: directing cache initialization, controlling cache operation, and performing cache testing.

The control unit performs the following functions for each disk access initiated by the data processing (DP) system:
  Intercepts all DP system to disk controller communications to obtain access parameters.
  Searches the cache directory to determine if it contains the data being accessed, i.e., determines whether the current access is a cache hit or miss.
  Sets up the required data path and controls the transfer of data from the cache memory to the DP system for each read "hit."
  Sets up the required data paths and initiates concurrent data transfers from the disk to the DP system and cache memory for each read "miss."
  Updates and reorders the cache directory for each read "miss" or write "hit" concurrent with the actual data exchange between the DP system and disk.
  Purges the cache of invalid (write hit) or least valued data to make room for new entries according to an automatic algorithm.
  Generates a completion interrupt to the DP system for all transactions and returns specified items of status (disk/cache register contents) upon request.

The functions of the core buffer memory are to:
  Accept and store data from the disk subsystem following the bus protocol with the disk subsystem as bus master.
  Retrieve and transfer data to the CDP following the bus protocol with the CDP as bus master.
  Generate and check parity on each write and read operation respectively. Report parity errors to the bus master as part of the bus protocol.

The major features of the control unit and its associated disk-buffer memory subsystems are:
  Cached data blocks are accessed at a rate of 700 per second versus a 20 to 30 block/second rate for non-cached data.
  Up to 124K words (496 blocks) of data can be cached at one time in a 124K buffer memory. Buffer memory can be added or deleted without change to the control unit.
  Cached data is controlled by two basic mechanisms, fixed and dynamic, each with its user controlled allocation of cache memory space.
  A variety of caching algorithms are possible to control the contents of the dynamic portion of the cache. A combination of "look ahead" and "additive accounting" have been found to be superior in applications studied. They have been found to be a complimentary set.
  The dynamic portion of cache operation is transparent to the user.
  For "misses," most of the cache processing and data transfer delays are overlapped with the data exchange between the disk and data processing systems. Hence, less than a 3 percent added delay is incurred in these cases.
  Caching can be enabled and disabled under program control as an aid in fault isolation and to provide for a degraded mode of operation.
  The contents of the control unit RAM 28 can be copied onto a disk file and subsequently reloaded under DP system program control. This provides a quick, convenient means of switching from one cache environment to another, or to reinitialize the subsystem.

The configurable data path (CDP) will now be described in more detail. In operation, the CPU normally initiates disk transfers by moving transfer parameters to the disk controller 12 via preassigned addresses on the system bus 22, but with the programmable control unit 10 in the system, the transfer parameters are instead recognized by its CDP and copied into a preassigned block of memory in the MPU. Once that is complete, the CDP interrupts the MPU. In response to these transfer parameters, the MPU can cause the following system activity:
  Transfer a block of data between the disk 14 and the main memory 18.
  Transfer a block of data between the disk 14 and the buffer memory 20.
  Transfer a block of data between the disk 14 and the RAM 28.
  Transfer a block of data between the disk 14 to both the buffer memory 20 and the main memory 18.
  Transfer a block of data between the buffer memory 20 and the main memory 18.
  Transfer a block of data between the RAM 28 and the main memory 18.

FIG. 1 shows the CDP interfaced with the host system DPS (CPU and main memory) via the S bus which is form, fit and function compatible with DEC Unibus, assuming the case of the CPU being implemented with a DEC PDP 11/45. The CDP may be modified to interface with the BR-1566 Memory Bus for use with the PDP-11/70, as noted hereinbefore. The disk bus is form fit and function compatible with the DEC Unibus. The MPU bus is unique to the MPU.

Figure 2:
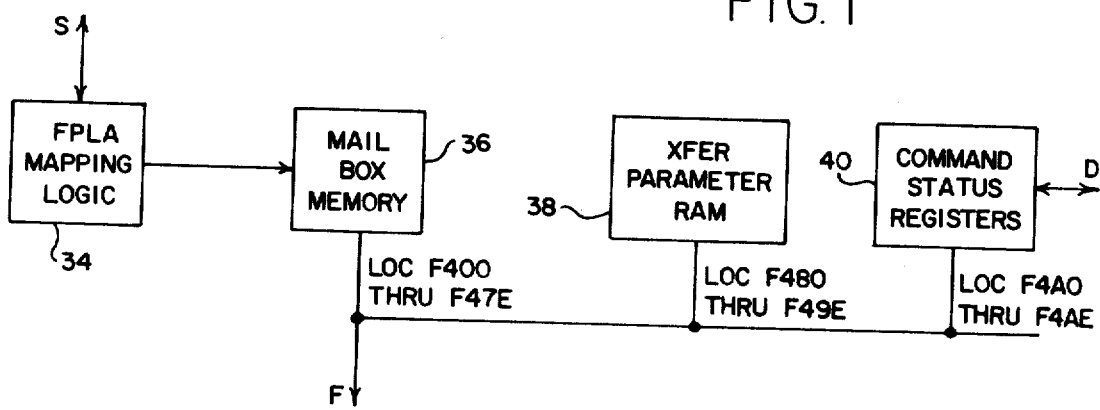
FIG. 2 illustrates an organization block diagram of a configurable data path in FIG. 1.

The CPU communicates with device controllers via pre-assigned memory space addresses. Up to 48 I/O space addresses may be assigned to the CDP. A FPLA 34 is used to map the desired S bus addresses to the CDP mailbox memory 36 as shown in FIG. 2. An FPLA is a field programmable logic array commercially available from Intersel, Inc., or Texas Instruments, Inc. The Intersel IM 5200 FPLA has 14 inputs and 8 outputs. It may have up to 48 product terms, and each product term may have up to 14 variables. Each one of the outputs provides a sum of the product terms. The FPLA may be programmed by the user to produce a sum of product terms at each of the eight outputs. Its organization includes input buffers to a programmable product term array (14×48) that is coupled to a summary array (8×48) which responds to the 48 product terms to product 8 outputs through output buffers which may be programmed to provide the desired logic levels for each of the 8 outputs. Locations F000 through F3FE (512 words) are paged through to any D bus memory space. The upper D bus address bits are provided by the contents of as CDP parameter RAM 38 (location F498).

Locations F400 through F47E (64 words) are assigned to the CDP mail box 36.

Locations F480 through F49E (16 words) are assigned to the CDP parameter RAM 38.

Locations F4A0 through F4A6 (4 words) are assigned to CDP command, control and status registers 40.

The CDP thus consists of a microprogrammed controller that resides on the MPU bus. Driven by programs in the MPU, the CDP functions as a coherent data path switch for four data sources and sinks: system memory (CPU and main memory), disk, external stand alone memory (optional core memory buffer), and MPU memory with extended RAM.

Any number of the mapped addresses may be identified (using the FPLA) as a special control location. When the CPU writes a one to data bit zero of a special control location, an interrupt will be set for the MPU, and data bit 7 of that special control location will be set to zero. This feature gives the CDP S port interface a ready/busy interlock as well as the ability to directly communicate with the MPU.

The MPU communicates with the CDP (and through the CDP to the D bus) via preassigned MPU memory space addresses. Unlike the S port mapping, the MPU port mapping is fixed. The memory space assigned to the CDP is divided into four functional groups. Locations F000 through F3FE (512 words) are paged through to any D bus memory space. The upper D bus address bits are provided by the contents of a CDP parameter RAM 38 (location F498). Locations F400 through F47E (64 words) are assigned to the CDP mail box. Locations F480 through F49E (16 words) are assigned to the CDP parameter RAM. Locations F4A0 through F4A6 (4 words) are assigned to CDP command, control and statur registers 40. The CDP thus consists of a microprogrammed controller that resides on the MPU bus. Driven by programs in the MPU, the CDP functions as a coherent data path switch for four data sources and sinks: CPU and main memory, disk memory, optional care buffer memory, and MPU memory with extended RAM.

Of the registers 40, three are hardware registers on the CDP that are only accessible by the microprocessor. They are:

a. F4A0 (hex)—CDP Status Register
b. F4A2 (hex)—CDP and Disk Transfer Mode Register
c. F4A4 (hex)—CDP Pushbuttons.

The CDP Status Register is a register which contains information pertaining to the status of the CDP according to the following table:

TABLE 1

| MPU BIT | CDP Status Register (F4A0) |
|---|---|
| 15 | CDP BUSY |
| 14 | ALLOW INTERRUPT TO MPU |
| 13 | ALLOW INTERRUPT FROM D/M BUS |
| 12 | PENDING INTERRUPT TO S |
| 11 | BIFURCATED TRANSFER COMPLETE |
| 10 | CDP TRANSFER COMPLETE |
| 9 | DISK TRANSFER COMPLETE |
| 8 | S PORT CPU WROTE INTO F404 (MPCS) |
| 7 | ERROR SUMMATION (BITS 0-5) |
| 6 | (RESERVED) |
| 5 | MPU MEMORY PARITY ERROR |
| 4 | CDP TIME OUT |
| 3 | S PB LINE |
| 2 | S PA LINE |
| 1 | D/M PB LINE |
| 0 | D/M PA LINE |

The CDP and disk transfer mode register defines the mode of both CDP transfers and disk transfers according to the following table:

TABLE 2

| MPU BITS | CDP Transfer Mode Register (F4A2) |
|---|---|
| 5-6-7 | CDP TRANSFER MODE |
| 000 | DO NOT USE |
| 001 | CACHE TO SYSTEM |
| 010 | SYSTEM TO CACHE |
| 011 | MPU TO SYSTEM |
| 100 | SYSTEM TO MPU |
| 101 | CACHE TO MPU |
| 110 | MPU TO CACHE |
| 111 | DO NOT USE |
| 14-15 | DISK TRANSFER MODE |
| 00 | BETWEEN DISK AND CACHE |
| 01 | BETWEEN DISK AND SYSTEM |
| 10 | BETWEEN DISK AND MPU |
| 11 | DISK TO CACHE AND SYSTEM (BIFURCATED) |
| 1 | BUS MODE |
| 0 | UNIBUS |
| 1 | B BUS (BR-1566) |

The various modes of transfers will be examined in detail in later discussions. This is a read/write register. The CDP pushbuttons register is a write only location. Upon writing into this location with various masks, interrupts may be blocked, interrupt flags may be cleared and error flags may be reset. For example, writing a one into the second least significant bit will initiate a CDP transfer according to the following table:

TABLE 3

| MPU BIT | CDP Pushbuttons (F4A4) |
|---|---|
| 15 | (RESERVED) |
| 14 | START CDP TRANSFER |
| 13 | CLEAR INTERRUPT FROM S |
| 12 | CLEAR INTERRUPT FROM CDP |
| 11 | CLEAR INTERRUPT FROM BIFURCATED |
| 10 | CLEAR INTERRUPT FROM D |
| 9 | SEND INTERRUPT TO S |
| 8 | (RESERVED) |
| 7 | ALLOW INTERRUPT TP MPU |
| 6 | BLOCK INTERRUPT TO MPU |
| 5 | ALLOW INTERRUPT FROM D |
| 4 | CLEAR ERROR FLAGS |
| 3 | (RESERVED) |
| 2 | (RESERVED) |

TABLE 3-continued

CDP Pushbuttons (F4A4)

| MPU BIT | |
|---|---|
| 1 | (RESERVED) |
| 0 | (RESERVED) |

As seen in the following table

TABLE 4

| | Mail Box | |
|---|---|---|
| PDP ADDRESS | MPU ADDRESS | |
| 776710 | F400 | MPDS |
| 776712 | F402 | MPER |
| 776714 | F404 | MPCS |
| 776716 | F406 | MPWC |
| 776720 | F408 | MPBA |
| 776722 | F40A | MPCA |
| 776724 | F40C | MPDA |
| 776726 | F40E | MPAE |
| 776730 | F410 | DBLH |
| 776732 | F412 | DBLL |
| 776734 | F414 | DHBN |
| 776736 | F416 | CHEX |
| 776740 | F418 | CHCD |
| 776742 | F41A | CHST |
| 776744 | F41C | CHAC |
| 776746 | E41E | CHRD |
| 776750 | F420 | CHWT |
| 776752 | F422 | CHIT |
| 776754 | F424 | CHFH |
| 776756 | F426 | CHTX |
| 776760 | F428 | CHCZ |
| 776762 | F42A | CHFZ |
| 776764 | F42C | CHIN |
| 776766 | F42E | CHRT |
| 776770 | F430 | CHAD |
| 776772 | F432 | CHIC | command and status information are exchanged with the S port CPU via a block of 26 locations. The first group (MXXX) contains the pseudo disk controller registers. The second group (CSSS) contains the cache registers. This block of 26 locations provides the means through which the system can communicate with the MPU. This group of addresses is referred to as the mail box. The actual disk controller registers (RXXX) reside on the D bus and are accessed by the MPU as shown in the following table:

TALBE 5

| Disk Controller Register (F498=PSR=00FF) | | |
|---|---|---|
| D ADDRESS | MPU ADDRESS | |
| 176710 | FIC8 | RPDS |
| 176712 | FICA | RPER |
| 176714 | FICC | RPCS |
| 176716 | FICE | RPWC |
| 176720 | FID0 | RPBA |
| 176722 | FID2 | RPCA |
| 176724 | FID4 | RPDA |
| 176726 | FID6 | RBAE |

Figure 3A:
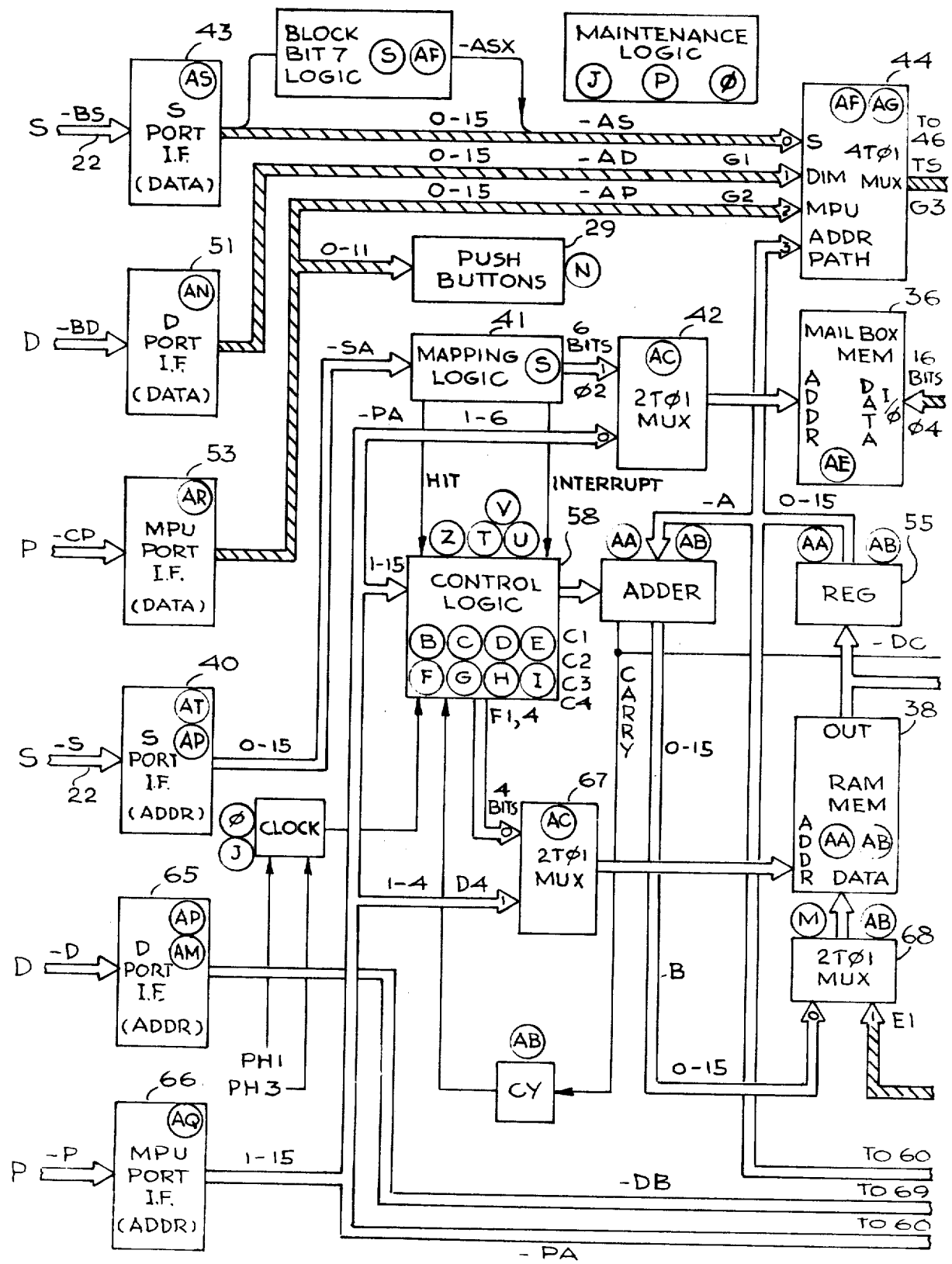
FIG. 3 is a functional block diagram of a configurable data path (CDP) in two parts, A and B.
Figure 3B:
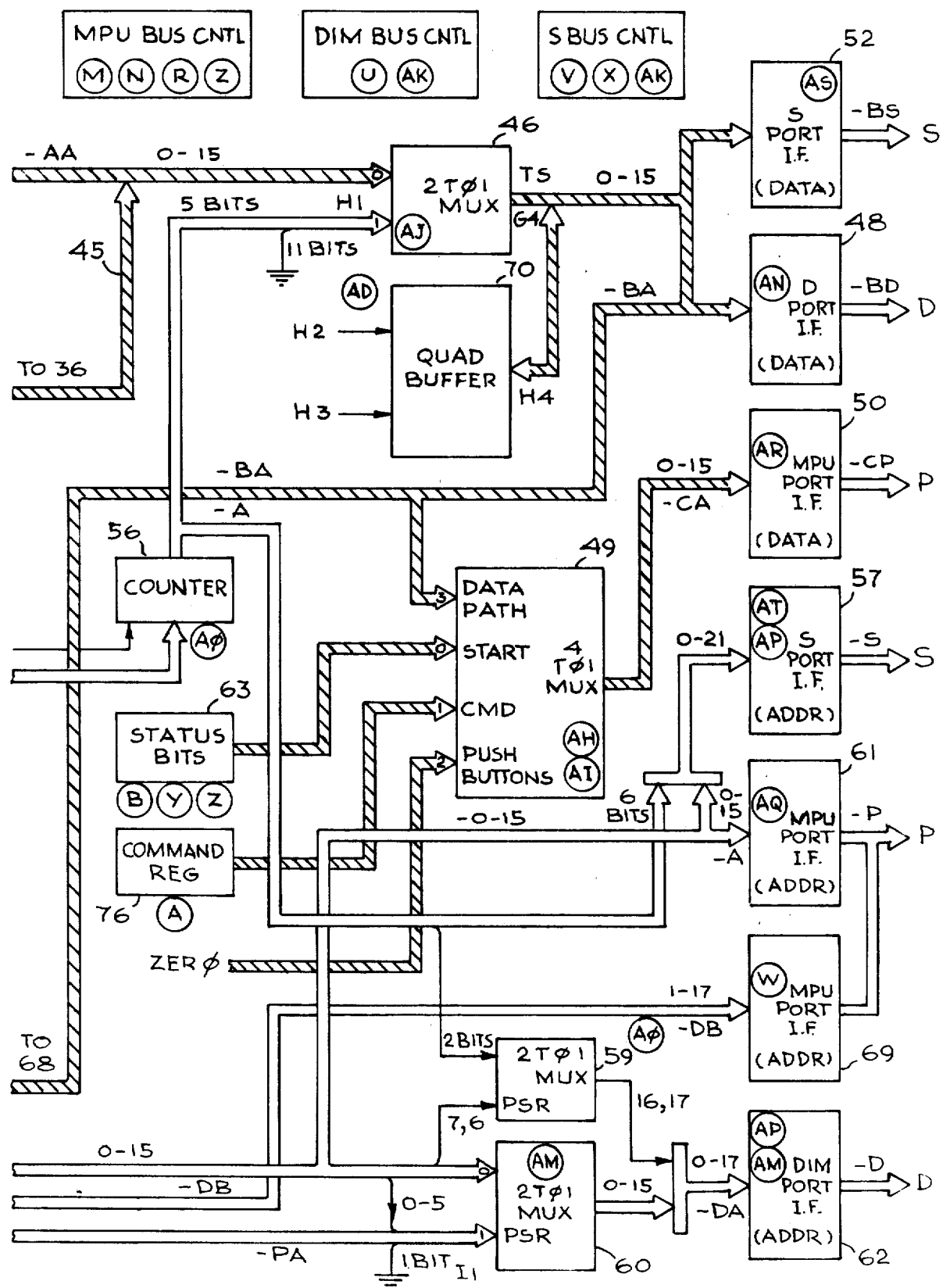

A functional block diagram of the CDP is shown in FIG. 3. Coming off the S bus through an interface 40 on the left-hand side of the diagram, the system address lines are converted into a 6-bit address by logic 41 and selected through a 2-to-1 multiplexer (MUX) 42 as the address for the mail box memory 36. Data from the system comes from data receivers 43 in the upper left-hand side of the diagram. Coming through a 4-to-1 MUX 44 at the top center of the diagram, data reaches the mail box memory through a bi-directional section 45 of the data path.

If the system writes into 776714 (octal) an odd number (i.e., one that has a one in the least significant bit), an interrupt flat will be set by the mapping logic 41 to interrupt the microprocessor. A read or write by the system to any of the 26 locations in the mail box memory will evoke a routine in microcode that will service the mail box access.

Data from the system during block transfers comes through the 4-to-1 MUX 44, through a 2-to-1 MUX 46 and into a quad buffer 47. If the transfer is being made to the external cache (optional core buffer memory 20), the data will be extraced from the quad buffer and presented to D data bus drivers 48. If the transfer is being made to the MPU memory, then the data from the quad buffer will go through the MPU's 4-to-1 MUX 49 and be presented to the MPU port data bus drivers 50. D bus transfers from data receivers 51 to the system bus through drivers 52 or to the MPU memory and MPU memory transfers from receivers 53 to the system follow the same basic routine.

Contained within the 16-word RAM 38, at the lower center of the block diagram, are the block transfer parameters. Locations F480 through F488 contain the C, P and S bus addresses. During a CDP transfer (i.e., one that does not involve a disk), any two of these locations must be used to designate a source and sink address. During such transfers, the CDP word count (F49A) is used. These parameters are loaded by the MPU according to the following table:

TABLE 6

| CDP Random Access Memory (RAM) | |
|---|---|
| MPU ADDRESS | |
| F480 | D/M ADDRESS 0-5 |
| F482 | D/M ADDRESS 16-17 |
| F484 | P ADDRESS 0-15 |
| F486 | S ADDRESS 0-15 |
| F488 | S ADDRESS 16-21 |
| F48A | DISK SLAVE ADDRESS 0-15 |
| F48C | DISK SLAVE ADDRESS 16-21 |
| F48E | (RESERVED) |
| F490 | (RESERVED) |
| F492 | (RESERVED) |
| F494 | INTERRUPT VECTOR FROM D/M |
| F496 | INTERRUPT VECTOR TO S |
| F498 | PAGE SELECT REGISTER (PSR) |
| F49A | CDP WORD COUNT |
| F49C | BIFURCATED WORD COUNT |
| F49E | (RESERVED) |

The S bus address is created from locations F486 and F488. The microcode accesses these two words as the fourth and fifth RAM locations. Address bits 0 to 15 are loaded into the register 55 that is located at the center of the block diagram. Address bits 16 to 21 are loaded into the upper address counter 56 just to the right of the RAM output buffer register. The two addresses are concatenated and used as the system address by the address bus driver 57 at the center right-hand side of the diagram.

During a transfer between the disk 12 and the external buffer memory 20, data and address paths are not routed through the CDP because both devices are on the same bus. However, the CDP control logic 58 does control hand-shake operations between the disk and the cache.

For a disk transfer between either the S or P port, the disk slave address registers in the RAM 38 are used in place of the disk controller's bus address register. For transfer between the disk and the system, 22 bits of address are created from F48A and F48C in a manner described earlier for S. For a transfer between the disk and the MPU, only the lower 16 bits are used (F48A).

The CDP may move data from one bus to another. The two bus addresses are contained in locations F480 through F488.

Instead of using the D address registers, the MPU uses its own 16-bit address together with the page select register (F498) when it is accessing the D bus. This is the mechanism whereby, for example, the MPU may read or write the actual disk controller registers (in which case F498 must contain 00FF).

For such an operation, the microcode must recognize an access to D memory space. In its service routine, the microcode will lead the output buffer of the RAM 38 with the page select register. The two sets of 2-to-1 MUXes 59 and 60 on the lower right-hand corner then will direct the six bits of the buffer register and the 10 least significant bits of the microprocessor address to the address driver 61 to form an 18-bit address.

Addresses for the MPU port 62 all come through the output buffer register 55. Depending on the type of transfer, the address will come either from the P address register or the disk slave address registers in the RAM 38. Block data transfer follows the basic path that the other block transfer do except that it goes through the MPU 4-to-1 data MUX 44 also.

RAM data for the MPU will be selected from port 3 of the 4-to-1 MUX 44 to the top of the block diagram, through the 2-to-1 MUX 46 into port 3 of the MPU 4-to-1 data MUX 49 and out to the MPU data drivers 50. The CDP status and command registers 63 and 64 are read by the MPU through ports 0 and 1 of the MPU data MUX 49.

In response to a stimulus from either the D, the S bus, or the P bus, a firmware routine will be executed to service it. For a transfer of data from the disk, address words are received through receivers 65, and for a transfer of data from the MPU (or its extended memory) address words are received through receivers 66. In the latter case, either the 2-to-1 MUX 60 is involved for a transfer to the D bus through drivers 62, or else the 2-to-1 MUX 42 where using the mail box memory 36 together with control logic 58. In either case the RAM 38 may be involved through a 2-to-1 MUX 67. Both data and address words may be entered into the RAM 38 through a 2-to-1 MUX 68. Drivers 57 are used for address words to the S bus, and either drivers 61 or drivers 69 are used for address words to the P bus. The following paragraphs describe the various stimuli and the responses that result. A particular microprogramming technique is used to handle these stimuli.

Before any type of data transfer can occur, a data source and a data sink point must be defined. In the CDP, six connection states are possible. The CDP connection states and the transfer of data are synchronous with the microprocessor clock. The CDP contains a four-word (Quad) buffer 70, and all data transfers are done either one or four words at a time, holding the appropriate port for the duration of the (one or four-word) transfer.

The CDP command and status registers are located in the microprocessor memory space and are accessed as F4A0, F4A2 and F4A4 (see tables 1, 2 and 3). Other memory locations which can be accessed by the microprocessor are located in the RAM 38 (tables 4, 5 and 6). Consequently, part of the memory addressing capability of the microprocessor is reserved for these registers in order to define the configurable data paths between ports.

For the CDP transfer mode registers F4A2 (table 2), the two least significant bits of the lower byte of F4A2 (14 and 15) are used, to determine the type of disk transfer (i.e., the connection states). The direction of the transfer is defined by the disk's RPCS register. For a bifurcated transfer, these two bits are set to ones. If, for this type of transfer, the word size of the disk word count (FICE) is larger than that of the bifurcated word count register, then, upon completion of the simultaneous transfer from the disk to the system and cache memory, these two bits will be cleared and the remaining portion of the transfer will take the form of a disk to cache memory transfer.

The three least significant bits of the upper byte of F4A2 (5, 6 and 7) are used to acquire a port during a CDP transfer.

The most significant bit of the upper byte of F4A2 (1) is set by the hardware on the CDP to indicate whether the S bus is a UNIBUS or a B bus (BR-1566). This bit is a read-only bit.

For the CDP status register (F4A0) (table 1), the least significant bit, when on (=1), indicates that the CDP is busy and that it is involved in a GET-PUT or CDP block transfer routine. Bits 14-12 indicate the various interrupt status of the MPU, D bus and S bus. Bits 11-9 are set according to the completion of those particular types of transfer. To detect writing of the least significant bit of MPCS (MPU Address=F404, System Address=776710), bit 8 is set. Bit 7 is a summation of error bits 5-0. Bits 3-0 are the PB and PA status for both the S bus and D bus. These bits indicate parity errors as defined by the CPU. Bit 5 indicates a parity error in the MPU memory during a CDP memory read. Bit 4 is set when the CDP does not exit a firmware routine within 21.5 microseconds. This usually indicates that an anticipated response was not received by the firmware. When the CDP times out, the CDP and the disk are reset.

For the CDP pushbuttons (F4A4) (table 3), bits 15-0 act like momentary pushbuttons. That is, each time the microprocessor outputs a one to bits 15-0, the activity or function associated with that bit is initiated. A one output to bit 14 will start the activity defined in the MPU bit 5-7 of table 2. To start the activity defined in MPU bit 15-14 of table 2, a proper disk command and a one in the least significant bit must be written into FICC (PSR=00FF).

Regarding transfer parameters, if the D port is involved in a CDP transfer, F480-F482 must contain the D port starting address (in byte). If the P or MPU port is involved in a CPD transfer, F484 must contain the starting address (in byte). If the S port is involved in a CDP transfer, F486-F488 must contain the S port starting address (in byte if on UNIBUS and in word if on B Bus). If the disk is involved in a transfer through the CDP, F48A-F48C must contain the bus address (in words if the B bus is involved, in bytes for all others). After an interrupt from the disk, F494 will contain the interrupt vector address from the disk. If an interrupt is sent to the system, F496 must contain the system's interrupt vector address.

The microprocessor may access indirectly any address space on the D bus. A paging scheme uses the PSR register to supply the eight most significant D bus address bits (n). The least significant nine-word address bits (X) are supplied by the microprocessor. (The byte select bit 15, is zero.) Using nine select bits gives a page size of 512 (CPU) words. The 512 words starting at F000 (microprocessor address) are paged through to the D bus. This feature normally is used to access I/O space control registers but it may be used to access any D bus address space also.

E-H—Service Disk On receiving an NPR from the disk and having secured the required port, the U ROM will post a SERVICE DISK flag to the PCL.

I-U—CDP Transfer Routines Writing a one into bit 14 of F4A4 will cause the CDP GO bit to set via MPU-

```
MICROPORCESSOR ADDRESS BITS  0 1 2 3 4 5 6 7 8 9 10 11 12 13 14 15
FOOO         1 1 1 1 0 0 X X X X X X X X X X
PAGE SELECT REGISTER         17 16 15 14 13 12 11 10 9 8 7 6 5 4 3 2 1 0
D BUS ADDRESS                n n n n n n n n X X X X X X X X X 0
```

For a F49A-CDP word count, F49A must contain the 2's complement of the number of words of a CDP transfer, and for a F49C-bifurcated word count, F49C must contain the bifurcated word count in 2's complement form. Regarding CDP microcode routines, microprograms shown in the following table 7 are the 21 firmware routines that are in the CDP. They can be put into six major groups. Each one of these programs is called up in response to a stimulus to the priority connect logic. These stimuli may come either from an external or internal source (i.e., one routine calling up another).

TABLE 7

| MICRO-PROGRAM | Program Function |
|---|---|
| A. | Connect S port CPU to mail box memory |
| B. | Send interrupt vector address to S port CPU |
| C. | Connect MPU to CDP for some activity |
| D. | Receive interrupt's vector address from disk |
| E. | Move data between disk and cache |
| F. | Move data between disk and S port memory |
| G. | Move data between disk and MPU memory |
| H. | Move data from disk to cache and S port memory |
| I. | Check for legal word count, initiate a GET routine |
| J. | Put four words to S port memory |
| K. | Put four words to cache |
| L. | Put four words to MPU memory |
| M. | Get four words from cache |
| N. | Get four words from S port memory |
| O. | Get four words from MPU memory |
| P. | Put one word to S port memory |
| Q. | Put one word to cache |
| R. | Put one word to MPU memory |
| S. | Get one word from cache |
| T. | Get one word from S port memory |
| U. | Get one word from MPU memory |

The following is a brief description of these program functions:

A—Connect S Port CPU to Mail Box Memory Upon detecting an attempt by the S port CPU to access a bus address assigned to the BR-1539, the FPLA will assert SYSHIT causing GOODHIT to assert. GOODHIT is the highest priority input to the priority connect logic.

B—Send Interrupt Vector Address to S Port CPU When the microprocessor writes a 40 (HEX) to F4A4, MPUPUSH6 will go low, causing a BR5 to go out to the system. Upon receiving a grant (S OUR BG5 Q1 S OS), that flag will be posted to the priority connect logic.

C—Connect MPU to CDP for Some Activity An MPU access of the addresses in the range F000 to F4A6 will cause a CDP SELECT flag to be posted to the PCL.

D—Receive Interrupt Vector from Disk On receiving a valid DM BR from the disk, a DM BR5 IN ANDOK flag, is posted to the PCL.

Figure 4:
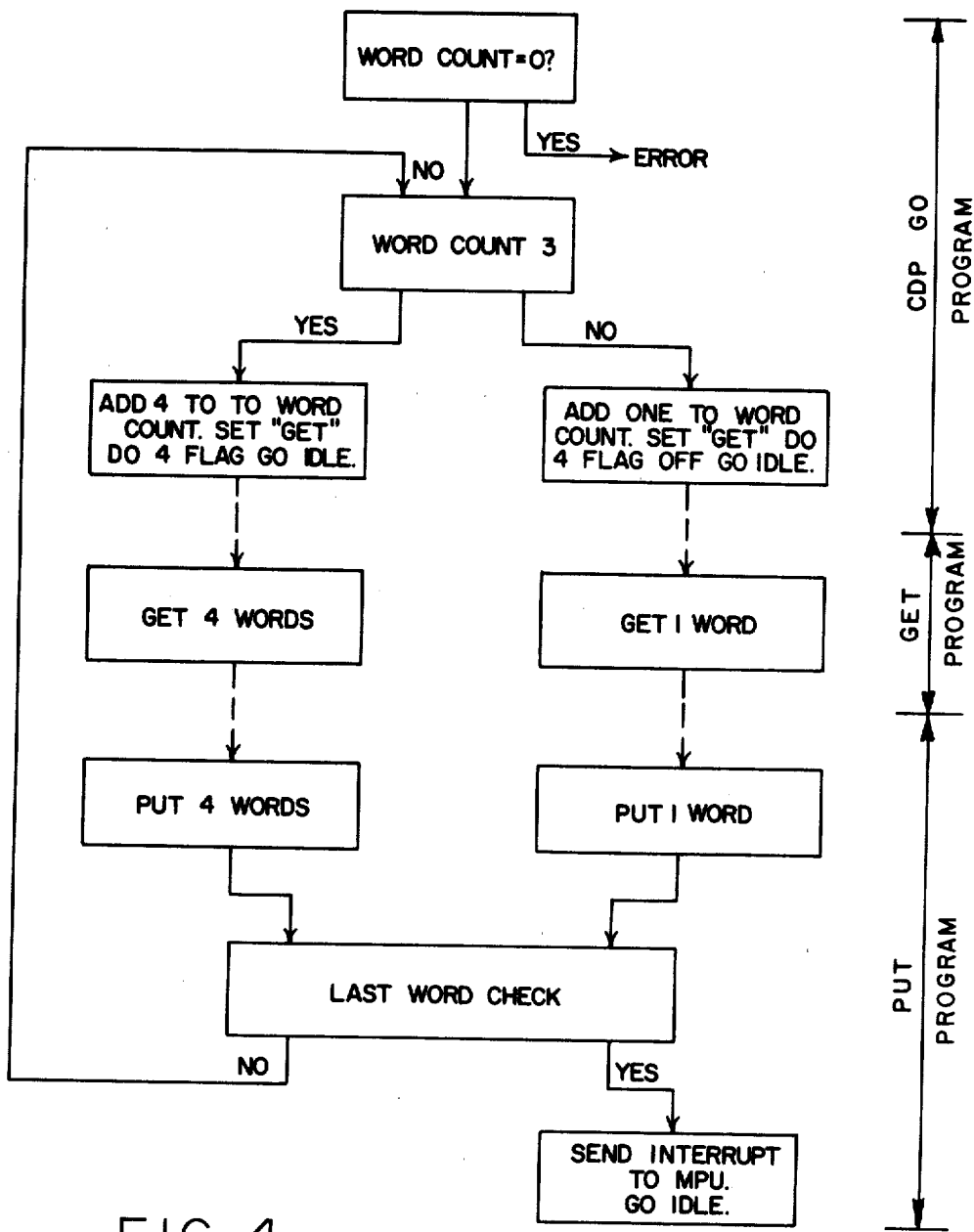
FIG. 4 is a program flow chart for GO, GET and PUT routines carried out in the CDP.

PUSH1. CDP GO then would call up the CDP GO routine via the PCL. At the end of this routine, a GET routine will be initiated. At the end of the GET routine, the PUT routine is initiated. FIG. 4 shows the flow. The GET and PUT flags are the lowest priority inputs to the PCL.

Referring now to FIG. 3 again for a further description, and recall that block transfer parameters are kept in the high-speed, bipolar, 16-word RAM 38 shown in the lower center.

The RAM may be accessed by either the MPU or the CDP firmware. When the MPU writes to any address within the F480-F49E block, a path is selected by the firmware such that the data from the MPU data receivers on the center left-hand side of FIG. 3 is steered through the 4-to-1 MUX 44, the 2-to-1 MUX 46, and finally through the 2-to-1 data MUX 62 of the RAM. The address is taken from the MPU address receivers 66 on the lower left of the diagram and steered through the 2-to-1 address MUX 42. If the MPU is reading the RAM, the output buffer register 55 is loaded with the output and steered through port 3 of the 4-to-1 MUX 44 at the top of the diagram. Coming out of the 4-to-1 MUX, the data makes its way through the 2-to-1 MUX 46 and through port 3 of the MPU data MUX 49, arriving at the MPU port data drivers 50.

When the firmware in the CDP accesses the RAM, the other port of the address MUX 67 and either port of the data MUX 68 may be selected to extract and update memory contents. If, for example, the S address registers were used, the contents of bits 0-15 would have left in the upper address counter 56. Support that the contents of the output buffer register 55 were FFFE (Hex). When the microcode wants to update the S address registers, a 2 will be applied to the other input of the adder 71. Consequently, the output of the adder will be all zeroes with a carry. Upon an increment command from the firmware, the carry will cause the counter 56 to increment. After bits 0-15 have been written back into the RAM, port 1 of the data MUX68 would be selected and the contents of the counter entered into RAM via the MUX 46.

Figure 5:
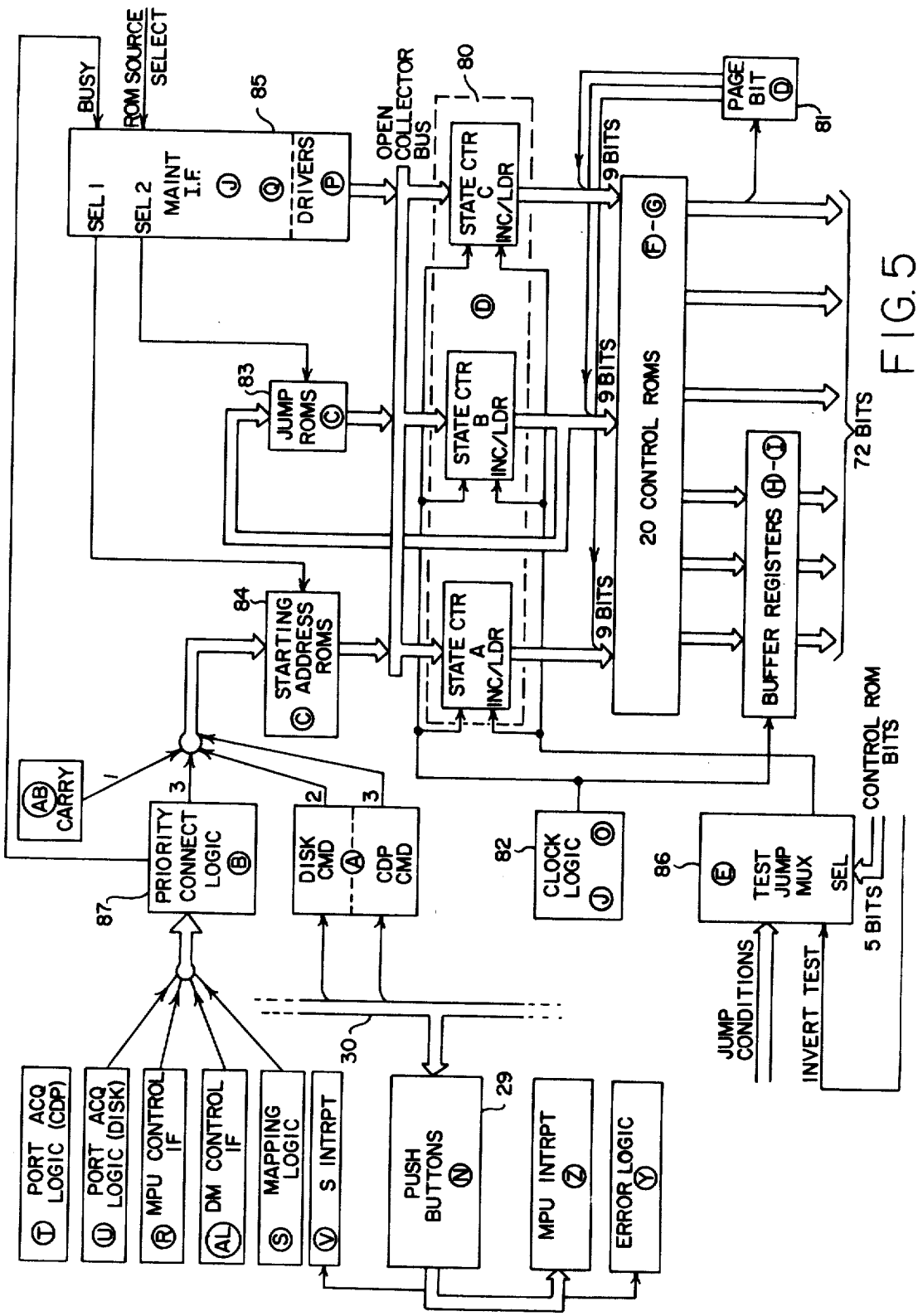
FIG. 5 is a block diagram of the control section for the CDP.

The CDP control logic 58 will now be described with reference to FIG. 5. In this diagram, as in the block diagram of FIG. 3, circled letters A through Z and circled letters AA through AT refer to logic diagrams in FIGS. A through Z and AA through AT, respectively. These logic diagrams are being included to teach the best made contemplated for practicing the invention, and not by way of limitation since the invention otherwise disclosed and claimed with reference to FIG. 1 may be implemented with other logic design configurations. The component type numbers refer to the 74 series of compatible TTL circuits, such as 74LS139 decoders and the 74LS03 drivers. A micro-state counter 80 is implemented using three sets of synchronous, parallel load, 8-bit counters A, B and C. Using 8 bits, the state counter is capable of 256 states. A page select bit 81 doubles that to 512. The state counter outputs are used as the address to 20 microprogram control ROMs. Each ROM is 512 words of 4 bits. (Three state counters are used in order to reduce switching noise by distributing the source switches over a large area.) The three counters are always in lock step. The 80-bit ROM word selected by the state counter controls the CDP.

There are four sources for the next content of the state counter 80. The present address +1 (incrementing from clock 82); the Jump ROMs 83 (branching); the starting address ROMs 73 (hardware branch to the start of a service routine); and maintenance input 85 (external toggle switches). The first two methods used to change the state counter contents are implemented by a test-/jump MUX 86 (logic diagram FIGS. D,E). The load (LD) and count enable inputs (P,T) are connected to term INCR. When INCR is high, the state counter will increment on the next up clock. When INCR is low, the state counter will assume the state present on the data input lines (CTR0-CTR7) on the next up clock.

The logic used to derive INCR (FIG. E) includes two 16-to-1 multiplexers K04 and K05 and several exclusive OR gates G1, G2 and G3. The logic reduces to an equivalent exclusive NOR gate. If the selected test condition is high and ROML3 (invert the test MUX) is low, the INCR will be high. If the selected test condition and ROML3 are high, invert the selected test condition. This allows a jump on yes or a jump on no for any selected test condition. With INCR low the state counter's next state will come from CTR0-CTR7.

The state of CTR0-CTR7 is determined by the logic on FIG. J. A 74LS139 decoder C07 is used to decode three terms and subsequently enable the Jump ROMs (JMP ROM CHP EN) or the starting address ROMs (S AD ROM EN). Both ROMs will be deselected if the maintenance input is high (MAN LOAD). A high maintenance term will enable the external state select switches through 74LS03 drivers M06-M07 located on FIG. P. In normal operation the BUSY term to the decoder C07 in FIG. J, when high, will enable the Jump ROMs, and the ROMA2 term high will enable the Starting Address ROMs. (The starting address ROMs are enabled when the state counter is in the Idle state, $337_8$.)

For the starting address, the address inputs to the 512-word Starting Address ROMs 84 (FIG. 5) are divided into three groups as shown in FIG. C. The disk command is input to address A0 and A1. The CDP command is input to address A2, A3 and A4. The CDP priority connect logic 87 is input to A5, A6 and A7. An input to A8 (STATUS FIG 3) determines where the CDP controlled transfers are done (one or four words at a time). The starting address location read is, therefore, a function of the CDP priority connect logic (A5, A6 and A7) and the specific CDP or disk transfer mode.

The following table 8 is a map of the Starting Address ROM.

TABLE 8
Starting Address ROM Map

| | | S CPU TO MAIL BOX | INTR TO S CPU | MPU | INTR FROM DISK | DISK DATA XFER | START CDP XFER | CDP "PUT" | CDP "GET" | | DISK COMMAND |
|---|---|---|---|---|---|---|---|---|---|---|---|
| | | 7 | 6 | 5 | 4 | 3 | 2 | 1 | 0 | | CDP COMMAND |
| STATUS FLG 3 | 0 0 | A | B | C | D | | | | | 0 | NOT USED |
| | 0 0 | A | B | C | D | | 1 | J | M | 1 | CACHE TO SYSTEM |
| | 0 0 | A | B | C | D | | 1 | K | N | 2 | SYSTEM TO CACHE |
| | 0 0 | A | B | C | D | | 1 | J | O | 3 | MPU TO SYSTEM |
| DO FOUR WORD TRANSFER | 0 0 | A | B | C | D | | 1 | L | N | 4 | SYSTEM TO MPU |
| | 0 0 | A | B | C | D | | 1 | L | M | 5 | CACHE TO MPU |
| | 0 0 | A | B | C | D | | 1 | K | O | 6 | MPU TO CACHE |
| | 0 0 | A | B | C | D | | | | | 7 | NOT USED |
| | 0 0 | A | B | C | D | E | 1 | | | 0 | BETWEEN DISK AND CACHE |
| | 0 0 | A | B | C | D | F | 1 | | | 1 | BETWEEN DISK AND SYSTEM |
| | 0 0 | A | B | C | D | G | 1 | | | 2 | BETWEEN DISK AND MPU |
| | 0 0 | A | B | C | D | H | 1 | | | 3 | BIFURCATED DISK TRANSFER |
| | 1 1 | A | B | C | D | | | | | 0 | NOT USED |
| | 1 1 | A | B | C | D | | 1 | P | S | 1 | CACHE TO SYSTEM |
| | 1 1 | A | B | C | D | | 1 | Q | T | 2 | SYSTEM TO CACHE |
| DO ONE WORD TRANSFER | 1 1 | A | B | C | D | | 1 | P | U | 3 | MPU TO SYSTEM |
| | 1 1 | A | B | C | D | | 1 | R | T | 4 | SYSTEM TO MPU |
| | 1 1 | A | B | C | D | | 1 | R | S | 5 | CACHE TO MPU |
| | 1 1 | A | B | C | D | | 1 | Q | U | 6 | MPU TO CACHE |
| | 1 1 | A | B | C | D | | | | | 7 | NOT USED |
| | 1 1 | A | B | C | D | E | 1 | | | 0 | BETWEEN DISK AND CACHE |
| | 1 1 | A | B | C | D | F | 1 | | | 1 | BETWEEN DISK AND SYSTEM |
| | 1 1 | A | B | C | D | G | 1 | | | 2 | BETWEEN DISK AND MPU |
| | 1 1 | A | B | C | D | H | 1 | | | 3 | BIFURCATED DISK TRANSFER |

CDP PRIORITY CONNECT STATE

Each letter represents the starting address of one of 21 microcode programs. The column select is the output of the CDP priority connect logic (what is to be done next). The row select is the present CP and disk transfer modes and STATUS FLG 3. STATUS FLG 3 indicates the number of words left in the present CDP transfer. STATUS FLG 3 is high if between one and three words are left to transfer and low if four or more words are to be transferred. As an example, assume that the present CDP transfer mode is cache to system (1), there are four or more words remaining to be transferred (STATUS FLG 3 is low), and the CDP priority connect logic determines that a PUT routine should be executed (1). The map shows that the starting address ROM should read out address J. Table 7 shows address J to be the microcode routine that moves (PUT) four words to the S port memory.

The CDP priority connect logic 87 (FIG. 5) is shown in FIG. B. It constantly monitors requests for activity. All requests are synchronized in the flip-flops D02 and D03. The flip-flop outputs are input to a priority encoder D04. If the CDP s not busy (i.e., no state latched at D05) clocks are allowed at a pin 9 of quadrupled type-D flip-flops D05. Any input to the priority encoder will cause SOME STATE to assert. SOME STATE is latched by the next clock into F/F BUSY. With BUSY asserted no more clocks are allowed to flip-flops D05. The priority connect logic will stay latched until the end of the microcode service routine, when ROMP4 is asserted causing INIZ to clear the present connect state and BUSY. Note that BUSY asserted will enable the CDP busy timer on FIG. Y.

A disk transfer is initiated when a one is written in bit 0 of location $776714_8$ (RPCS). Also, bit 7, the ready bit, is cleared to a zero when bit 0 is set to one. In order to emulate this practice, FPLA bit F7 (SYSINTERR, FIG. S) is asserted when the S port CPU writes a one to bit 0 of location 776714. Block 7 asserted will inhibit the bit 7 data path between the S port interface tranceivers and the 4-to-1 MUX 44 that inputs to the Mail Box memory 36 (see data path block diagram FIG. 3' and logic diagram FIG. AF). BLOCK 7 is ANDed with microcode ROM bit N1 (ROMN1Q, FIG. S) at gate CDP SYS INT PT. This term sets the INT S Q F/F (FIG. Z) which, in turn, sends an interrupt to the microprocessor (INT A WO).

There are eight different inputs to priority connect logic, each of which is described in detail in subsequent paragraphs. The inputs, in order of priority, are:

a. GOODHIT—This input requires the CDP to service an S port CPU to Mail Box function.
b. S OUR BG5 Q1 S OK—This input requires the CDP to send an interrupt vector address to the S port CPU.
c. CDP SELECT—This input requires the CDP to service a microprocessor request to read or write CDP memory space.
d. DM BR5 IN AND OK—This input requires the CDP to accept an interrupt vector address from the D bus (disk controller).
e. SERVICE DISK—This input requires the CDP to service a D bus master (disk) request to transfer data.
f. CDP GO—This input requires the CDP to initiate a DMA transfer.
g. PUT—This input requires the CDP to put four (or one) words to the destination specified by the CDP transfer mode.
h. GET—This input requires the CDP to get four (or one) words from the source specified by the CDP transfer mode.

GOODHIT—S Port CPU to the Mail Box. The S port 4K I/O address space may have up to 48 locations (words) mapped to the Mail Box memory 36 in the CDP (FIG. 3). The Mail Box address inputs come from a 2-to-1 MUX 42 on FIG. AC. The S port input to the 2-to-1 MUX 42 is an FPLA (FIG. S). The FPLA inputs are the S port address lines (FIGS. AT and AP). The FPLA is programmed to translate S bus address space to Mail Box addresses. FPLA output F6 (FIG. S, SYSHIT) is asserted when an S port address assigned to the CDP is detected. SYSHIT is ANDed with the delayed S bus master sync (DLZMSYNC) and addresses 15, 16 and 17 are asserted (UPPER ADDR) at P08 06 (GOODHIT). GOODHIT is asserted when the S port CPU accesses an address assigned to the CDP and is the highest priority input to the priority connect logic (FIG. B).

S OUT BGF5 Q1 S OK. This input requires the CDP to send an interrupt vector address to the S port CPU. When the microprocessor writes a one to bit 9 of address F4A4, MPU PUSH6 will assert (see FIG. V) resetting flip-flop SBR5Q. With SBR5Q asserted, bus request 5 is sent to the S port CPU (FIG. AK) and the D input to S OUR BG5Q flip-flop is high. The next bus grant 5(S GF5 IN page AK) assertion will cause S BG5 IN Q (FIG. V) to assert releasing the direct reset on S OUR BG5 Q flip-flop capture the grant) and S BF5 OUT Q (pass the grant). The next clock (after the one that clocked S BG5 IN Q) will cause S BG5 INQ1 to assert, clocking the capture or passing the grant flip-flops. With S OUR BG5 Q set, the grant is captured (for the CDP) and passed to S OUR BG5 Q1 F/F. The captured grant is ANDed with S BUSY 1 (S bus not busy) at S OUR BG5 Q1 SOK and input to the priority connect logic (FIG. B).

CDP SELECT (service MPU request). MPU memory spaces F000 through F4A6 (Hex) have been assigned to the CDP. A ROM (CDP hit ROM) C04 in FIG. R is programmed to identify CDP memory space. The ROM chip enables inputs (FSEL, B11 SEL) to assert when the MPU accesses memory space F000 through F7FE (15-14-13-12-11). MPU address lines 10 through 3 go to the ROM address inputs. Any access to addresses in the range F000 through F4A6 will cause MPU HIT to assert (low). The next PH3 clock will cause flip-flop D07 (CDP SELECT) to assert. CDP SELECT is input to the priority connect logic (FIG. B) in the control logic 60 (FIG. 3). The MPU memory space assigned to the CDP is divided into four groups. These groups are identified by three CDP HIT ROM outputs (MPU 64, MPU 16, MPU 4). These terms are tested by the microprogram routine called by CDP SELECT.

DM BR5 IN AND OK (Service D Bus Interrupt Request). A D bus resident initiates an interrupt sequence by asserting the bus request line (DM BR5 FIG. AL). D/M BR5 IN is ANDed with MPU PUSH 10 Q. The MPU allows an interrupt cycle from the D bus by writing bit 5 to location F4A4, asserting MPUPUSH10, thus setting flip-flop C13 (MPU PUSH 10Q.) DM BR5 IN AND OK inputs to the priority connect encoder D04 (FIG. B). The microprogram that services the D bus interrupt request will assert ROM J2 resetting MPU PUSH 10Q, thus blocking further interrupt request until specifically allowed by the MPU.

SERVICE DISK (Data Transfer Request). Disk data transfers are done in one of four modes. (FIG. 3) the transfer mode is determined by the contents of a disk command register 76 in the CDP implemented as shown in FIG. A. The disk command register is accessed as byte F4A3 by the microprocessor. The disk controller initiates a data transfer by asserting NPR (DM NPR FIG. AL). NPR is synchronized as DMNPR Q (FIG. H) and input to A2 of a ROM E02 (FIG. U). If the specified disk transfer mode requires the S port (disk/system or bifurcated transfer), the ROM (FIG. U) will output GETs in response to a disk NPR. If the specified disk transfer mode requires the MPU port (disk/MPU memory), the ROM will output D to MPU in response to a disk MPR. The ROM will output SERVICE DISK when the appropriate port has been acquired (HOLD ACK for the MPU port or S OUR NPG A1 S OK for the S port). (See ROM equations in FIG. U, where the equations are written in terms of ROM input pins for convenience).

CDP GO (Initiates a CDP Controlled Transfer of a Data Block from One Port to Another). The transfer mode is determined by the contents of the CDP command register 76 (FIG. A). The CDP command register is accessed as byte F4A2 by the microprocessor. Prior to initiating a CDP controlled transfer, the command register must contain the desired transfer mode, and the CDP RAM must contain the starting addresses for the source and destination port as well as the transfer word count (in 2's complement form). The CDP RAM is accessed by the microprocessor as the 16 memory locations from F480 to F49E (see table 6). After loading the appropriate transfer mode and parameters the microprocessor initiates a CDP transfer by writing bit 14 to F4A4, causing the assertion of MPU PUSH 1 (FIG. N). MPUPUSH1 will set the CDP GO flip-flop L05 (FIG. A). The CDP GO flip-flop is input to the priority connect logic (FIG. B). The CDP GO routine will check the word count for zero (not allowed) and, if it is not zero, another check is made to determine if four or more words are to be transferred. If the nubmer of words to transfer is between one and three, flip-flop STATUS FIG. 3 is set (FIG. AB) and input to the starting address ROM (FIG. C). The CDP GO routine also initiates activity that will result in the acquisition of the desired source part. It does this by outputting ROMP1 and ROMP2 to the latches on page T. ROMP1Q, ROMP2Q and the ROM at MQ5 (see FIG. T) are used to acquire the source (or destination) port required for a CDP transfer.

PUT [Four (or One) Words to the Destination Port]. The CDP transfers a block of data by fetching four (or one) words from the source port and then transferring the same four (or one) words to the destination port. This operation continues until the transfer is complete. The data path block diagram (FIG. 3) shows that data from any port (upper center of block diagram) by an appropriate combination of ROM bits (G1, G2, G3, 04, H1, G4, H4, H2 and H3) the last three of which are applied to the Quad buffer as shown in FIG. AD, while the rest are applied at various points as shown in FIG. 3. Data may also be output from the Quad buffer to the data interface drivers for any port by an appropriate combination of ROM bits G4, H2, H3, H4 and 11. In order to move data to or from the Quad buffer, 13 separate microcode routines are used. They are fetch one word from any port (3 each), put four words to any port (3 each), and a common word count update routine.

The starting address ROM (FIG. C) and a random logic ROM (FIG. T) are responsible first for acquiring the required port and then for calling the appropriate microcode service routine. The ROM at MO5 (FIG. T) is responsible for acquisition of the required port and notification of the priority connect logic (FIG. B into the control logic 60) of the acquisition. The CDP command (CDPCMDA, CDPCMDB, CDPCMDC) is input to A6 as ROMP2Q, a microcode bit. The enabling term, ROMP1Q, is input to A7. Outputs 01 (DM NPR OUT), 02 (PHOLD) and 03 (SNPR) are requests to acquire the D, MPU and S ports. Inputs A3 (VCC), A4 (HOLD ACK) and A5 (S OUR NPG 01 S OK) are acknowledgement of acquisition from the D, MPU or S ports. Output 04 (GOT IT) is interpreted as "the requested port has been acquired." ROMP2Q (GET if it is on, PUT if it is off) steers the 04 term (GOT IT) to GET or PUT. GET and PUT input to the priority connect logic (FIG. B). The equations determining the nature of the port acquisition ROM are shown on FIG. T.

GET [Four (or One) Words from the Source Port]. The port acquisition logic for a GET is the same as is used for a PUT, except that a different microprogram is called by the priority connect logic and the starting address ROMs after the desired port has been acquired.

Figure 6:
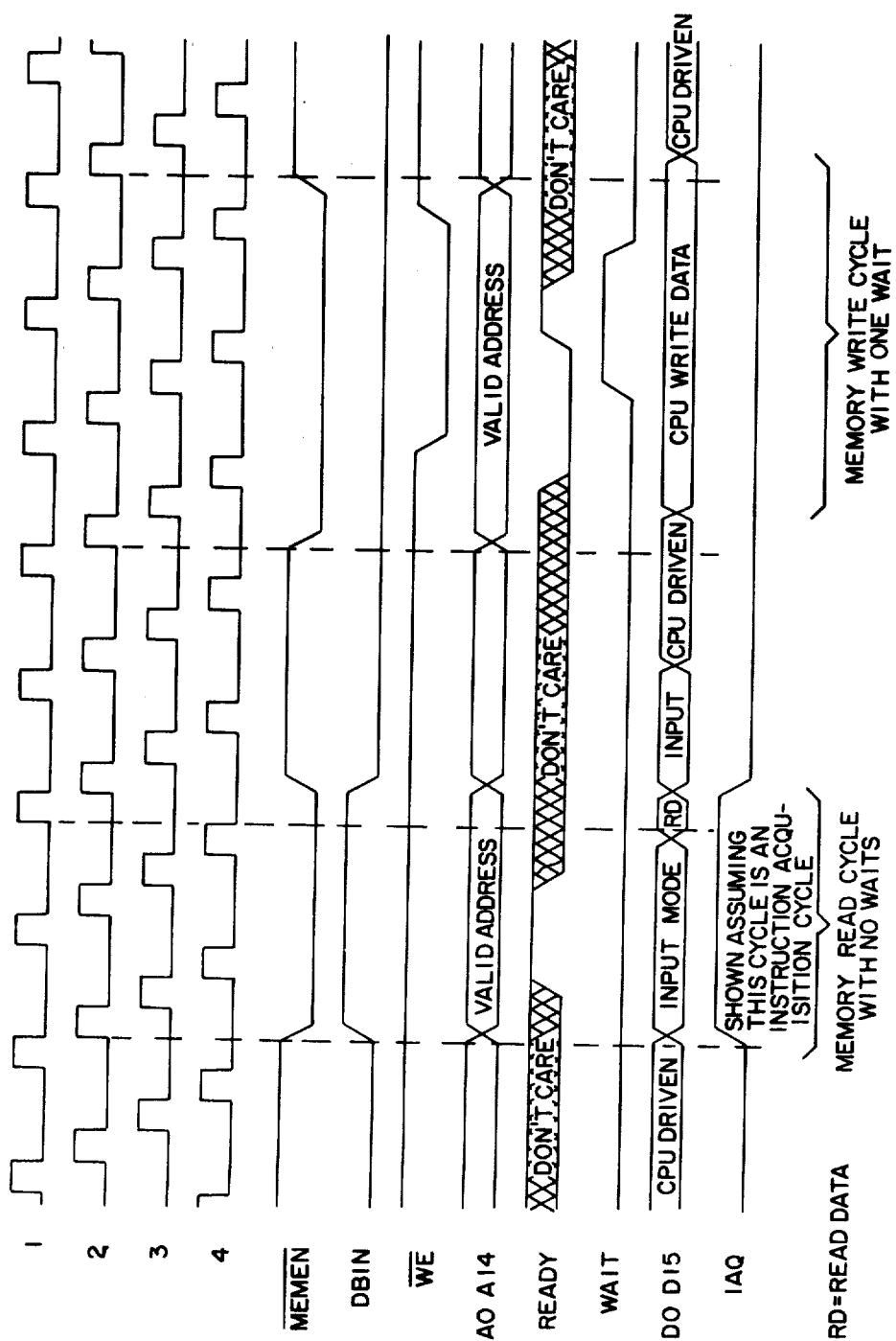
FIG. 6 is a timing diagram for MPV bus timing in FIG. 1.
Figure 7:
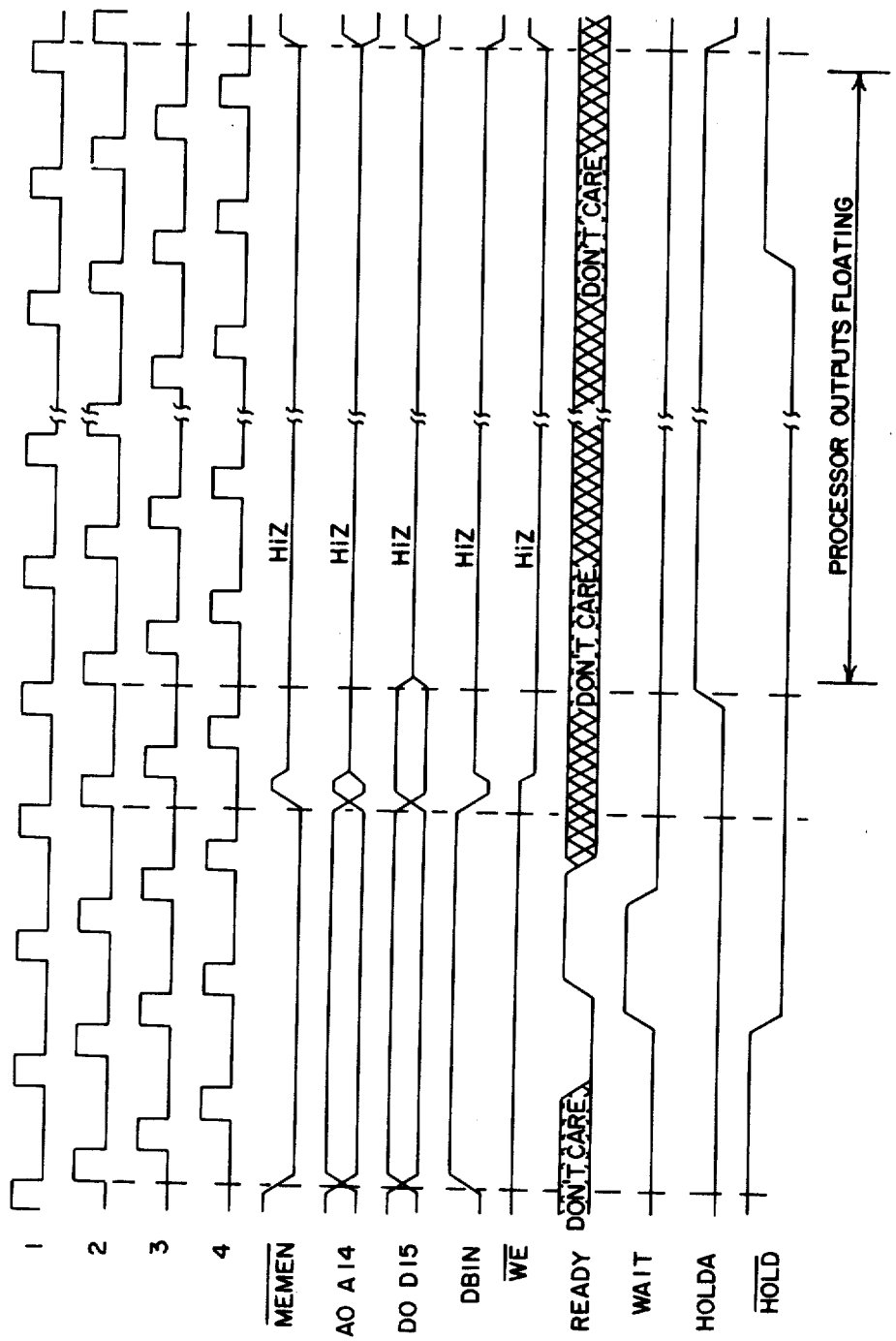
FIG. 7 is a diagram for the MPU hold timing.

The MPU-CDP interface will now be described. The CDP 32 (FIG. 1) communicates with the MPU 26 via a synchronous bus 30. Information on the bus is sampled at clock edges that are defined by timing diagrams shown in FIGS. 6 and 7. The MPU derives its timing from a 4-phase nonoverlapping clock. Phase 1 and phase 3 are inverted and presented on the bus. The CDP uses the inverted and noninverted forms of these two phases to do all of its timing. In the following discussion PH1 and PH3 will be used to denote phase 1 and phase 3; the inverted versions of phase 1 and phase 3 (PH1 and PH3) will be denoted, respectively. The period of any given phase is about 333 nanoseconds.

CDP as a Slave (refer to FIG. R of the logic diagrams for the MPU Bus Control). The CDP will repond to block of addresses starting at F000 (Hex) to F4A6 (Hex). Within this block, the CDP interface to the MPU further distinguishes memory accesses that are made to the F000-F3F3 (512 words) block, the F400-F47E (64 words) block, the F480-F49E (16 words) block, and the F4A0-F4A6 (4 words) block. Accesses to any of these blocks by the MPU will cause the first output of the ROM at C04, MPUHIT, to go low. At the positive edge of PH3, MPUHIT will be sampled and, if it is low, CDPSELECT of F/F D07 will go high causing the MPU memory service routine to be called up. If the MPU is attempting to read the CDP's memory, then READ OPR will be low and at the next PH1 clock after CDP SELECT has gone high, CDP READ will go high causing the output of gate A07 to go low (DATAENB), thus enabling the data drivers to drive data onto the data bus. If the MPU is attempting to write to the CDP memory, then MPUWE (on page M) will go high at the leading edge of PH1 after CDP SELECT has gone high, causing STRBDATA to go high and thus strobe data into the data latches.

Meanwhile, having been vectored to the microcode routine which services MPU memory accesses, CDP must determine which of the four blocks of memory actually is being addressed by the MPU. The microcode routine first looks at ADDRESS10PA, the A7 input to ROM C04. If ADDRESS10PA is low, then the routine knows that the 512 block is being addressed and proceeds to service it. If ADDRESS10PA is high, then the second output of ROM C04, MPU 64, is examined. If MPU 64 is high, then the routine will treat the memory access as a read or write to the block of 64 words (also known as the Mail Box). Once access to a particular block of addresses has been determined, the read/write control line of the MPU bus is examined and the appropriate read or write sequence for that memory is executed. If MPU 64 is not high, then MPU 16 is examined. If it is true, the microcode will service the access to these 16 words of memory in a manner similar to the 64 word memory. If MPU 16 is found to be low, then access to the three remaining locations is assumed (F4A6 is not being used). By virtue of the fact that these three memory locations are hardware registers and are not part of the major address and data paths, read and write operations are transparent to the microcode. The write pulse, MPUWE, is gated with MPU4SEL and used to generate FOURENB to the strobe pulse to decoder C07. Then, depending on what is present on the least significant two bits of the address, the appropriate pulses are sent out of C07 to accomplish the write.

After the MPU has presented its address and data, if any, on the bus at the trailing edge of PH1, it will sample, at the next trailing edge of PH1, the READ line. If the processor sees a READY at this time, it will assume that data has been written into memory (if it was doing a write to memory) or that valid data is on the bus. In either case, it will terminate its memory cycle by the next PH1 clock. It is apparent from the description of the preceding paragraphs that the CDP cannot respond to the MPU without entering a WAIT state. A WAIT state occurs when the MPU sees READY low at the trailing edge of PHL. When the MPU sees this not ready condition, it will assert the WAIT signal on the bus. The MPU will remain in this state until the memory responds with a READY. Since the CDP cannot respond in so short a time, when it sees that it is being addressed, it will respond with READY low until the microcode asserts the MPU GO bit (ROMM2). When the MPU GO bit is asserted, it is synchronized first through 2 flip-flops D07 and D08. BUS READY goes low at the leading edge of PH3 and is inverted at the drivers on FIG. N. When the processor samples READY at the trailing edge of the next PH1 clock, it will start to remove the memory address from the bus. This, in turn will, cause MPUHIT to go high. MPUHIT will get clocked into flip-flop D07 and READYENB will go high. READYENB going high will set the ENDMEMCYC flip-flop D08 and disable the driver for the READY signal on page N. The microcode, having issued MPU GO, will wait for ENDMEMCYC to go true. After detecting that ENDMEMCYC has gone true, the microcode yhen will assert ROMM3, thus causing gate A06 to output a low (ENDCYCRESET). This will reset the ENDMEMCYC flip-flop and the memory service routine will have been completed.

CDP as a Master (refer to FIG. M). To do a DMA the CDP must first acquire the bus. This requires that either PHOLD or D TO MPU be asserted by the port acquisition ROMs. These signals, once having been asserted, will cause CDPHOLD to go high at the next PH3 clock. The MPU then will enter a hold state at the next available non-memory cycle and respond with HOLDACK asserted. The microcode is then called to initiate a DMA transfer. If a write to memory is required, ROMM4 is asserted. To start a transfer, the MPU GO bit is asserted. At PH1, DMADRVENB goes low, driving address, data (if any) and the control lines onto the bus (see FIG. N). When the memory responds with a READY, MPUREADY and MPURDY will go low since BLKRDY is quiescently low. If the CDP is writing memory, CDPWE will go high on the leading edge of PH1 after address and data have been presented on the bus on the trailing edge of the previous PH1. When MPURDY is clocked in at PH1, WRITE will go low. After receiving MPUREADY, CDPWE will go off at the leading edge of PH1 while DMADRVENB will go high at the leading edge of PH1. This means that the write pulse will be negated before the address and data lines are removed by a width of the PH1 clock pulse, which is about 45 nanoseconds. Regardless of whether the CDP is reading or writing the MPU memory, data will be strobed in at the leading edge of PH1 after READY ACK goes true. DMADRVENB going high will set the DMAEND flip-flop A08, blocking further DMA activies via gate P08 and reporting to the microcode that a DMA cycle has ended. The microcode will assert ROMM3, causing ENDCYCRESET to go low and reset DMAEND. At this point, another DMA transfer may be initiated. If all DMA activity has been completed, the microcode may terminate by asserting ROMQ4, which will reset the CDPHOLD flip-flop B08. The MPU on the trailing edge of the next PH1 clock will see that the hold request has been negated and, on the subsequent PH1 clock, will drop HOLDACK and again assume control of the bus.

T ROM (refer to FIG. T). The equations for this ROM are:

$$01 = DMNPROUT = A7.\overline{A6} \quad (\overline{A2}.A1.A0 + A2.A1.\overline{A0}) + A7.A6 \; (\overline{A2}.\overline{A1}.A0 + A2.\overline{A1}.A0) \tag{1}$$

$$02 = PHOLD = A7.\overline{A6} \quad (A2.\overline{A1}.\overline{A0} + A2.\overline{A1}.A0) + A7.A6 \; (\overline{A2}.A1.A0 + A2.A1.\overline{A0}) \tag{2}$$

$$03 = SNPR = A7.\overline{A6} \quad (\overline{A2}.\overline{A1}.A0 + \overline{A2}.A1.A0) \; * \; A7.A6 \; (\overline{A2}.A1.\overline{A0} * A2.\overline{A1}.\overline{A0}) \tag{3}$$

$$04 = GOTIT = DMNPROUT.A3 + PHOLD.A4 + SNPR.A5 \tag{4}$$

This ROM is used to acquire a source or destination port for a CDP transfer. Inputs A0-A2 are the CDP transfer mode bits of F4A2. Inputs A3-A5 are the bus grants from each of the three ports. A3 is always asserted because in the present configuration, arbitration for the use of the D/M bus is not required. A6 is the GET-PUT flip-flop output with A6 asserted being interpreted as a GET and A6 negated being interpreted as a PUT. A7 is the GO flip-flop output which enables the outputs of the ROM (this should not be confused with the chip enable inputs of the ROM).

Take, for example, the acquisition process of the D and the S port. If the CDP transfer mode specifies a cache to system transfer, A2 and A1 will be low with A1 asserted. The GO routine would set the GO and DET flip-flops. Consequently, according to the second term of equation (1), DMNPROUT will be asserted. Since A3 is high GOT IT will go high, causing GET to go true. GET then will call up a microcode routine to get "n" number of words and store it in the Quad buffer. Upon entering the GET routine, the GO flip-flop is cleared and the bus request is withdrawn. Near the end of the GET routine, with the GET flop-flop cleared, the GO flip-flop then is set. Thus, according to equation (3), SNPR will be asserted. Eventually the system will respond with an NPC. According to the third term of equation (4), GOT it will again go true. But since ROMP2Q is low, PUT will go true this time. PUT then will call up a microcode routine to transfer "n" number of words into the system memory from the Quad buffer.

U ROM (refer to FIG. U). The three equations for the U ROM are:

$$O1 = GETS = A4 + A2.A9 \quad (4)$$

$$O2 + DTPMPU = A2.A2.\overline{A0} \quad (5)$$

$$O3 = SERVICE\ DISK = A5.A2.A0 + A3.A2.A1.\overline{A0} + A2.\overline{A1}.\overline{A0} \quad (6)$$

The U ROM operates in a manner similar to that of the T ROM. Since the transfer is handled partially by the disk controller, the GET-PUT logic is not required. Inputs A0-A1 are the disk transfer mode bits of F4A2. A2 is the NPR from the disk. A3 is bus grant from the microprocessor port. A4 is the NPR output of the T ROM. A5 is the system bus grant.

Except for the ORing function for the system NPR (A4), the U ROM is only activated by a disk bus request from the disk, a port is requested according to A0-A1. Upon receiving a grant from that port, SERVICE DISK is asserted. SERVICE DISK will evoke a firmware routine which will issue a DM NPG and an S SACK, causing the disk eventually to drop A2 and the system to drop NPG (for the case of disk to/from S port). For a disk to cache transfer, for example, SERVICE DISK will be asserted immediately upon receiving DMNPRQ (equation 6).

X ROM (refer to FIG. X). This ROM controls the issuing of the master sync signals on both the DM and the S bus. It also generates the write pulses to the Quad Buffer. The inputs to the ROM are the master sync request (ROM12 and ROMK1), the synchronized slave sncys (DM MEM SSYNQ and S SSYNQ), the read/write controls (ROMJ1Q and ROMK4Q), a delaying input (DELAY) and the ALLOW AUTO RESET (ROME4Q) control. There are four outputs from the ROM: MCLR, QWRT, BFIN and DELAY.

$$O1 = MCLR = A7\ (A4.A3 + A1.A0) = \overline{A7}.\overline{A6}.\overline{A3}.\overline{A0} \quad (7)$$

If ALLOW AUTO RESET (A7) is high, then MCLR will be asserted when the master sync request and the slave sync for any given bus are asserted according to the first term of equation (7). If ALLOW AUTO RESET is low, MCLR will be asserted only when A6 (DELAY) is asserted, indicating that a slave sync has been received, and when both master sync requests have been withdrawn. A7 is low only during bifurcated transfers. Depending on the type of transfer being done, DELAY will be asserted either before or at the time that MCLR is asserted, causing the inputs to Ell's pin 10 and 15 (the J inputs) to be low. Thus, on the next clock, the master sync flip-flops will get cleared.

$$O2 = QWRT = A7.\overline{A6}.\overline{A2}.A1.A0 + A7.\overline{A6}.\overline{A5}.A4.A3 \quad (8)$$

According to the first term of equation (8), QWRT will be asserted when A7 is high (implying that a bifurcated transfer is not taking place), when the read/write line A2 is low (read), when A6 (DELAY) is low, and when a D/M slave sync has been received when the D/M master sync request is high (A1.A0). QWRT will be asserted only for a short period of time because DELAY (A6) will become true shortly after A1 A0 become true. The second term, which involves the S bus, can be analyzed in the same manner.

$$O3 = BFIN = \underline{A7\ A6} \\ (\overline{A4.A3} + \overline{A1.A0}) = \overline{A7}.\overline{A3}.\overline{A1}.\overline{A0} \quad (9)$$

BFIN is used by the firmware in the control logic to determine when a master slave cycle has been completed. In the first term, A7 is high, indicating a non-bifurcated transfer. A6 only becomes true if a slave sync has been issued in response to a master sync. Thus, if A6 is true and there is no slave sync (A4 or A1 being low) with the master sync request still high (A0 or A3), the bus cycle has finished. During a bifurcated transfer, when both the D/M and the S bus has responded with slave syncs and both master sync requests are high, BFIN is asserted also.

$$O4 = DELAY = A1.A0 + A4.A3 + A7.A6(\overline{A1}.A0\ + \overline{A4}.A3) + \overline{A7}.A6(A1.\overline{A0} + A4.A3) \quad (9)$$

The first two terms of equation (9) means that DELAY will be asserted when either bus responds with a slave sync to its particular master sync request. If it is not a bifurcated transfer, the third term of equation (9) will keep DELAY on even after the slave syncs have gone away if the master sync request are still on. During a bifurcated transfer, the fourth term will keep delay on as long as the Slave Syncs are still asserted. This will keep the A6 term in the second term of equation 1 asserted until the master sync flip-flops are cleared, eventually causing the slave syncs to be negated. Note also that there is a capacitor on the output of pin 9 of the ROM. This guarantees a finite delay in the rise time of DELAY, giving QWRT a finite pulse width.

HIT ROM (refer to FIG. R). Access by the microprocessor to any of the following address blocks will cause MPUHIT to be asserted: F4A0-F4A6, F480-F49E, F400,-F47E, F000-F3F1.

FPLA (refer to FIG. S). The FPLA (Field Programmable Logic Array) monitors S bus address lines 1-14. If the least significant address line is ignored, access by the system to the block of address X76710 to X76772 will cause SYS HIT to be asserted. If X76714 is accessed, SYS INTERR will also be asserted. Gating these signals with the information that bits 15-17 are on will cause GOOD HIT to be asserted and, if ROMNIQ is asserted, will post an interrupt to the MPU. Address X76710 to X76772 also will be translated into 26 Mail Box memory addresses starting at zero.

A maintenance interface and logic will now be described. This set of logic is intended as a tool for troubleshooting and as a means for field engineering personnel to isolate and correct failures. It is presented here solely to complete a description of an exemplary implementation of the best mode contemplated for practicing the invention.

The logic in the maintenance interface works in conjunction with an external piece of hardware known as the test box. The test box provides two ribbon cables which attaches to the CDP at locations S08 and R08. Through these cables, power is brought from the CDP to power the test box. In addition, these cables are the means by which the CDP maintenance control logic and the Test Box exchange control signals. The test box contains a display which monitors the output of the state counter in the CDP, a set of address switches whose values may be loaded into the state counters, and a group of control switches. Contained within the test box is logic which can compare the output of the state counter with the setting of the address switches and indicate a match via a light emitting diode (LED). In addition, this logic will output a pulse every time a match occurs. This pulse can be used as a reference for viewing other signals on the CDP. This signal is available at a test point on the box. There are four switches that control the operation of the interface:

CMP/CLR. When in the compare mode, a LED will light and remain lit when an output of the state counter matches that in the address switches. Placing the switch in the CLR position will clear the LED. The position of this switch in no way inhibits the outputting of a compare pulse from the test point.

NORM/LOAD. In the NORM mode, the CDP either will increment or branch on the next clock, depending on the state of the output of the test-/jump MUX logic (FIG. 3). In the LOAD mode, the contents of the address switches are enabled and are loaded into the state counter on a subsequent clock (though not necessarily the next clock).

RUN/STP. In the RUN mode, the CDP system clock free runs. In the STP position, the clock is stopped and clock control is taken over by the SINGLE STEP switch. SINGLE STEP. When the RUN/STP switch is placed in the STP position, the SINGLE STEP switch is enabled and, when pressed, will cause a single clock to be generated in the CDP.

Maintenance logic (refer to FIG. J, P and Q). The clock for the CDP is obtained by ORing the PH1 and PH3 clocks on the MPU bus. This clock then is gated with CLKSTP (FIGS. J and Q). When the RUN/STP switch is put in the STP mode, SYNC STP CLK will go high after the trailing edge of the system clock, gating the clock off.

With SYNC STP CLK high, depressing the SINGLE STEP button will cause END ONE STEP to go low for one clock period after the trailing edge of the clock. Since SYNC STP CLK is low, CLK STP will go high for one clock period, allowing a clock pulse to be generated.

When the NORM/LOAD switch is in the LOAD position, MANLOAD will be high, disabling decoder C07. This will force all the output of C07 high and, thus, turn off the outputs of the Starting Address and Jump ROMs. MANLOAD also will enable the open collector gates M07 and M06, thus, placing the switch settings of the test box at the inputs of the state counters. However, in order for these values to be loaded, the load input of the counters must be low. When a microcode routine is stopped during its execution, via the RUN/STP switch, the operator must somehow cause the load input of the counters to go low. When a routine in microcode wants to increment to the next state, the 1 input of K05 (FIG. E) is selected. Normally, MLD would be low and the state counters would be incremented on the next clock. But the setting of MANLOAD low causes MLD to be high and thus, the counters would be loaded on the next clock. If, on the other hand, the microcode happens to be doing a test on one of the inputs of the MUXes, then the output of the XOR gate, INCR, may or may not be low. If INCR happens to be high, the state counters will increment; otherwise, the switches will get loaded. Therefore, unless one stops the microcode in segments of code where two or more conditions are tested consecutively, one generally can load a state from the test box within two clocks.

MICROPROGRAMS

The CDP microcode is detailed in the following section by function. Each function has two levels of explanation. The two levels of documentation are: a general description of the function performed by the microcode routine; and a "quick look" flowchart where only the test and jump conditions are noted. A state looped back on itself indicates a "wait" for the condition indicated.

ROM Coding. The CDP microcode ROMs are each 512 words of 4 bits. The CDP microengine is implemented using 20 of these ROMs. Each word (or state) is 80 bits long.

a. The microcode form is 32 words by 80 bits. Sixteen forms are used to document all of the CDP microcode routines.

b. Each form is divided into two pages of 16 words each. The 8-bit CDP state counter identifies the present page position and one of the ROMs (ROM Al) selects between high and low page. The state counter steps (increments) from line to line (166 ns per state) unless a jump condition is satisfied. If a jump condition is met, the state counter will be loaded with the contents of the jump ROMs shown on the far right of the form. Those bits marked with a triangle are flip-flop buffered. That is to say, that the bit so marked will be submitted to the CDP logic on the clock subsequent to the clock that caused the state to be entered. ROM bits that are not triangle marked take effect about the center of the clock period. The bottom row of the form identifies the logic diagram sheet on which the ROM/bit is used. As a further aid to comprehension, the ROM bits that control the CDP data path are shown on the data path block diagram (FIG. 3). For example, The Quad buffer output is enabled by ROM H4 and selected by ROM H2 and ROM H3.

Test Routines. On entering this routine from the idle state, the RAM output buffer register (OBR) should contain a zero. Using this information, R1 and R3 are loaded with the value in OBR. R3 then is incremented via the adder until R3=FF. At that point, OBR=R3 and the condition (OBR+1) are forced in the adder and a carry output should be present at the adder. The STATUS FLAG 3 flip-flop is then clocked and the output should go high. R3 (=11111111) then is stored in R2 and the OBR is clear using R1. R3 also is cleared and STATUS FLAG 3 flip-flop is clocked again. Since the carry output now should be low, the flip-flop should go off and the process is repeated. During this time, the data and address drivers of both the D and S ports are enabled. If the basic data path from RAM to these ports is correct, a divide by 2 square wave should be observed at the output of the drivers. For example, if the frequency of DATA00BS is 1 MHz, then DATA01BS should be observed to be changing at 500 kHz. This routine sets up values in R1 and R2 that are used in subsequent exercises.

Upper Address Counter Increment. This routine starts by loading all ones, via R2, into the OBR. The condition (OBR+1) then is forced in the adder and the upper address counter (UAC) is enabled for counting. The UAC then should be observed to count.

Upper Address Counter Load. The UAC is loaded alternately with ones and zeroes via R2 and R1.

All Ones/All Zeroes Test. First, the OBR is cleared, condition (OBR+1) is forced in the adder, and the carry flip-flop is clocked. No carry should be observed during this time. Then, condition (OBR+FF) is forced and the carry flip-flop is clocked. Also, no carry should be observed during this time. The OBR then is loaded with FF, condition (OBR+0) is forced in the adder, and the carry flip-flop is clocked. Again, the flip-flop should not set, Finally, (OBR+1) is forced and the carry flip-flop is clocked. The flip-flop should set. Condition (OBR+0) is forced in the adder and the flip-flop is clocked; consequently, STATUS FLAG 3 should go to zero.

TABLE 9

Test Routines Program States

| STATE | INSTRUCTION |
|---|---|
| | INITILIZ/INCR |
| 4 | Write the contents of the RAM output buffer register into R1 (RAM 01) |
| 5 | R1 write completed |
| 6 | Write the contents of the RAM output buffer register into R3 |
| 7 | R3 write completed |
| 10 | Load RAM output buffer register (OBR) with R3 |
| 11 | Add 1 to the contents of the RAM OBR |
| 12 | Jump to 15 if carry is detected |
| 13 | Add 1 to the contents of the RAM OBR |
| 14 | Write the result into R3. Jump to 10 |
| 15 | Load the carry flag. (Status Flag 3) |
| 16 | Write the contents of the RAM OBR into R2 |
| 17 | R2 write complete |
| H,0 | Load RAM OBR with R1 (clear R1) |
| H,1 | Write the contents of the RAM OBR into R3 (R3 0). Load carry flag. |
| H,2 | R3 write completed. Jump to 10. |
| | UPPER ADDR CTR INC TEST |
| H,4 | Load RAM OBR with R2 (11 ... 1). Add 1 to the contents of RAM OBR. Include the upper address counter. Jump on self |
| | UPPER ADDR CTR LOAD TEST |
| H,6 | Load upper address counter (UAC) with R2 (1 ... 1) |
| H,7 | Load UAC with R1 (ZERO). Jump to H,6 |
| | QUAD BUFFER TEST |
| H,11 | Load RAM OBR with R2. Jump to H,13 |
| H,12 | Load RAM OBR with R1 |
| H,13 | Write RAM OBR into location 1 of the Quad buffer |
| H,14 | Complete of write |
| H,15 | Read location 1 of the Quad Buffer |
| H,16 | Finish read. Jump to H,13 |
| | 4 to 1/2 to 1 DATA PATH MUX |
| H,0 | load R2 into UAC and RAM OBR. Jump to H,2 |
| H,1 | Load R1 into UAC and RAM OBR |
| H,2 | Write UAC into R4 |
| H,3 | Write completed |
| H,4 | Write RAM OBR into R5 |
| H,5 | Write completed. Jump to H,2 |
| | PSR MUX |
| H,7 | Load R2 into UAC and RAM OBR. Jump to H,11 |
| H,10 | Load R1 into UAC and RAM OBR |
| H,11 | Select PSR address lines |
| H,12 | Select N-PSR address lines (=PSR*). Jump to H,11 |
| | ALL 1s/ALL 0s TEST ON ADDER |
| H,14 | Load R1 into RAM OBR. Load carry flag |
| H,15 | Add 1 to RAM OBR |
| H,16 | Load carry flag |
| H,17 | Add 1 ... 1 to RAM OBR. Jump to H,0 |
| | ADDRESS: 1111XXXX |
| H,0 | Load carry flag |
| H,1 | Load RAM OBR with R2 (ones) |
| H,2 | Add zero to RAM OBR. Load carry flag |
| H,3 | Add 1 to RAM OBR |
| H,4 | Load carry flag |
| H,5 | Idle. Remove all inputs to adder |

TABLE 9-continued

Test Routines Program States

| STATE | INSTRUCTION |
|---|---|
| H,6 | Idle. Wait for carry (if any) to go away. Jump H,14 |

Figure 8:
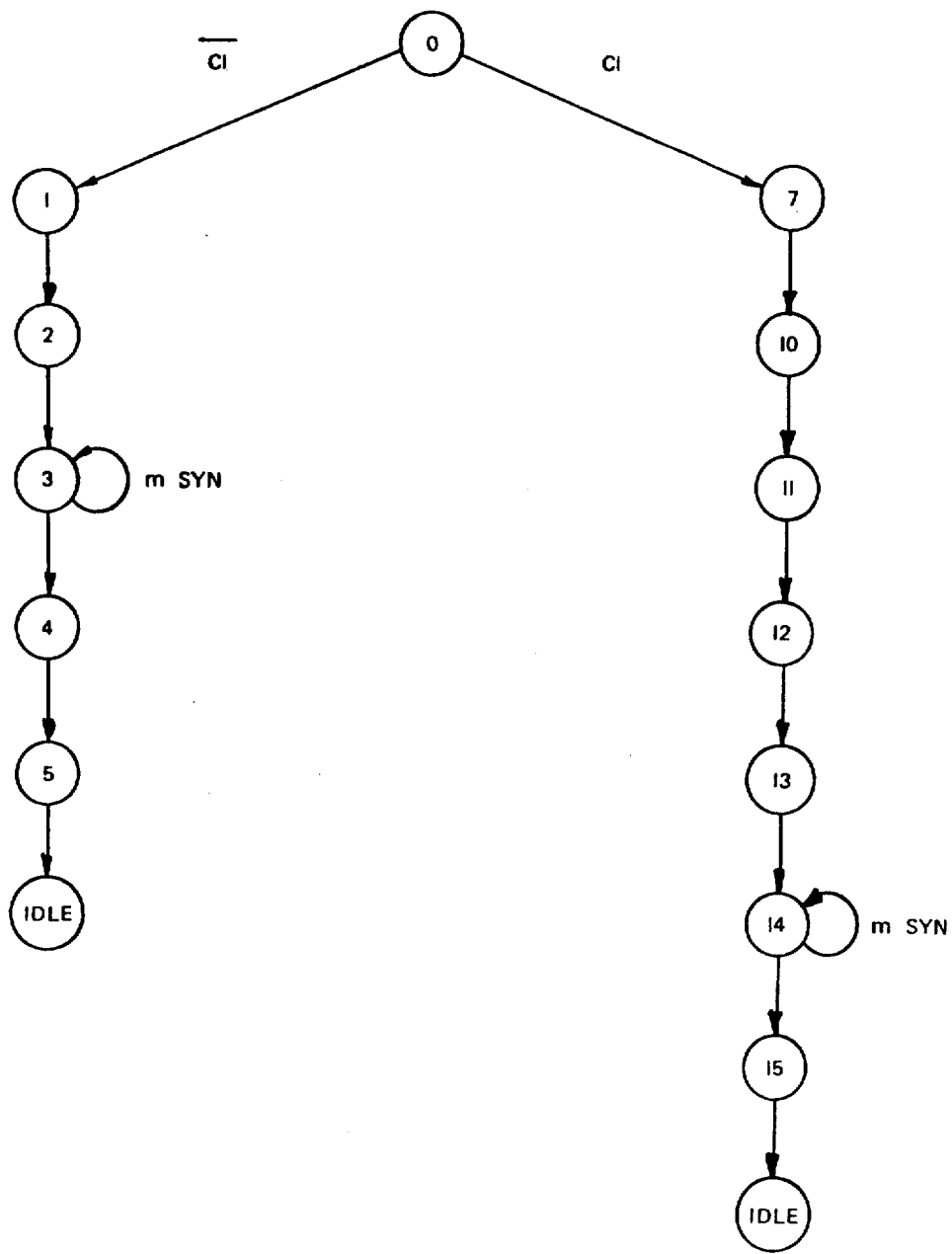
FIGS. 8 through 23 are flow diagrams of CDP microprogrammed routines, as follows:
8. S to Mail Box
9. Service MPU (part 1)
10. Service MPU (part 2)
11. Interrupt D/M port
12. Disk cache
13. Disk/System
14. Disk-MPU
15. Disk-Bifurcated
16. Interrupt to S port
17. S PUT
18. D/M PUT
19. MPU PUT
20. S GET
21. D/M GET
22. MPU GET
23. CDP GO

S To Mail Box. The microcode routine starting at 0 0001 0000 will connect the S port (processor) to the mail box. The mail box may be read or written by the S port master. If the S port master reads (DATI) the mail box, the microcode will step from location 1 through 5. Several states are repeats of a previous state in order to meet mail box (TMS 4036-2) timing requirements. If the S port master writes (DATO) the mail box, the microcode will step from location 7 through 15. Several stated are repeats of a previous state in order to meet mail box (TMS 4036-2) timing requirements. At location 7, ROMN1 is asserted. ROMN1 is ANDed with a term (BLOCK 7, FIG. S) that detects an attempt to write data bit zero at a location identified by an FPLA flay (SYSINTERR). The resulting term (CDPSYSINTP) will set a flag that interrupts the MPU (INT S Q, FIG. Z) FIG. 8 and the following table apply to the S to mail box microcode routines.

TABLE 10

S to Mail Box State Instructions
Program Location: X 0001 XXXX

| STATE | INSTRUCTION |
|---|---|
| 0 | If "SC1" high jump to DATO (state 7) If "SC1" low step to DATI (state 1) Select FPLA as source for mail bos address (ROM 02) |
| | DATI |
| 1 | If data to S CPU, enable mail box memory output. Enable data path 2 to 1 MUX output. Enable 8838 drivers to S bus |
| 2 | Repeat state 1 |
| 3 | Repeat state 1. Initiate slave sync to S CPU. Wait here for S Master sync to negate. (Step to state 4 when) |
| 4 | Service complete. Negate data to S bus. Send END PULSE to priority connect logic |
| 5 | Jump to Idle. Select starting address ROM. Negate slave sync |
| 6 | RSVD |
| | DATO |
| 7 | If data from S CPU, enable data path 4 to 1 MUX. FPLA as source for mail box address. Send interrupt to MPU if location is flagged |
| 8 | Repeat 7 |
| 11 | Repeat 7 |
| 12 | Repeat 7. Initiate write to mail box |
| 13 | Repeat 12 |
| 14 | Repeat 7. Send slave sync to S CPU. Wait here for S Master sync to negate |
| 15 | Negate slave sync to S CPU, End pulse. Select starting address ROM |

Figure 9:
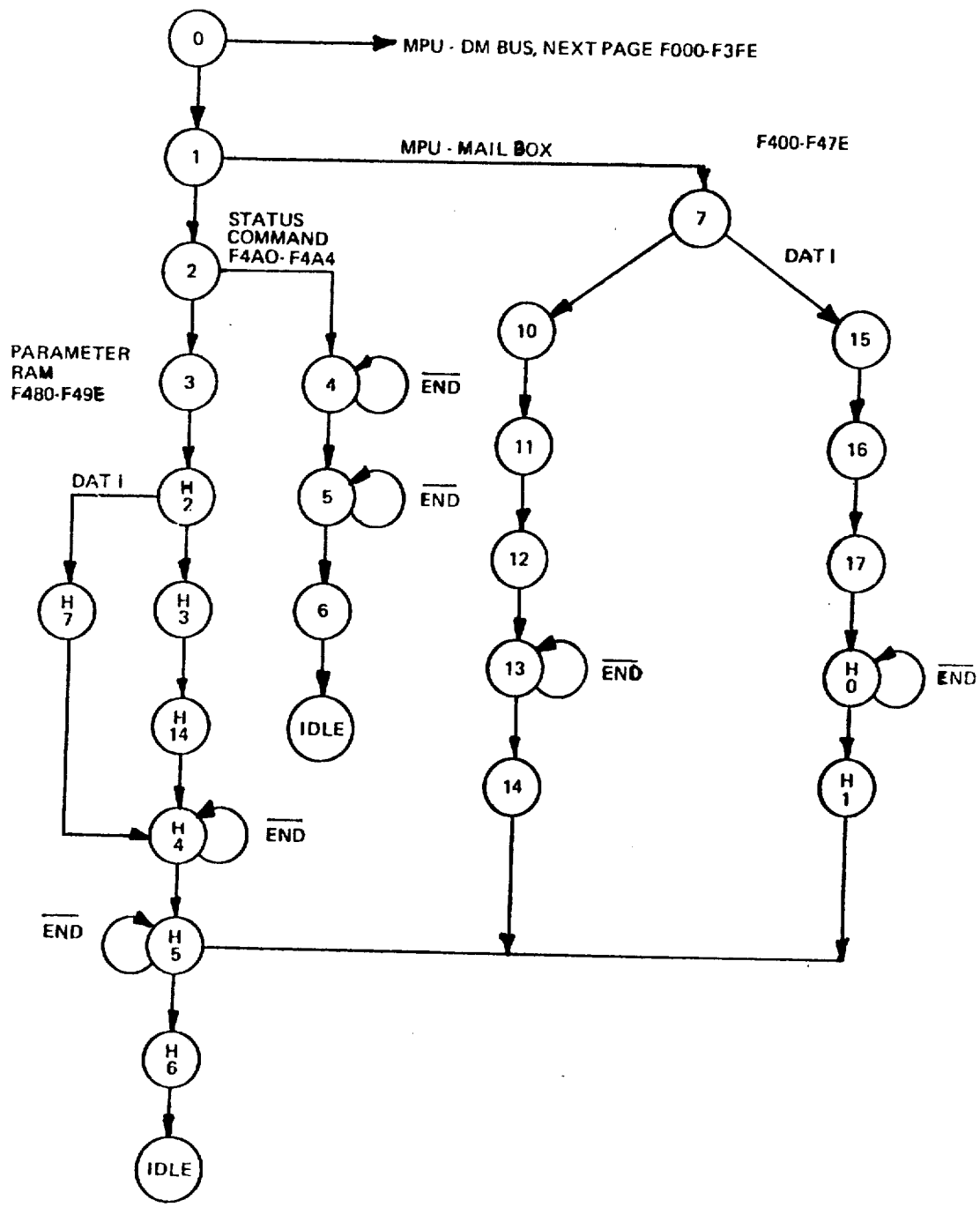
Figure 10:
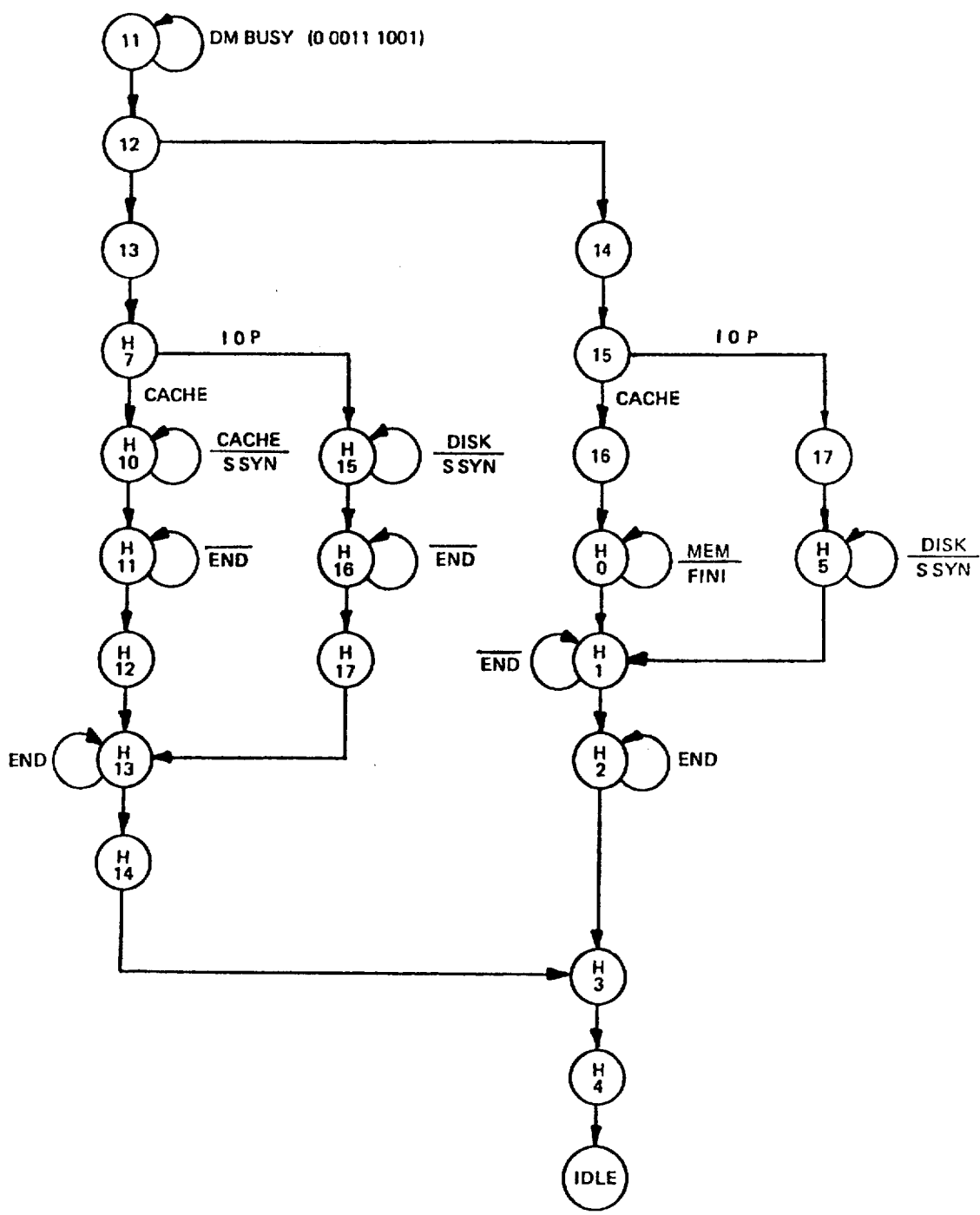

Service MPU. The microcode routine starting at location 0 0010 0000 will service an MPU access to memory space assigned to the CDP. The CDP address space is divided into four distinct groups. An MPU access to locations F000 to F3FE (512 words) will cause the CDP to connect the MPU bus to the D bus. The D bus most significant address bits, A17-A10, are supplied by bits 7-0 of RAM location 14 (F498); the D bus least significant address bits, A9-A1, are supplied by the associated MPU address bits, 6-14. An MPU access to locations F400 to F47E will cause the CDP to connect the MPU to the mail box. An MPU access to locations F480 to F49E will cause the CDP to connect the MPU to the parameter RAM. An MPU access to locations F4A0 to F4A4 will cause the CDP to connect the MPU to the command registers, pushbuttons and status bits. FIGS. 9 and 10 and table apply to the microcode routine.

TABLE 11
Service MPU State Instructions

| STATE | INSTRUCTION |
|---|---|
| | Program Location: X 0010 XXXX |
| 0 | If MPU is accessing the 512 memory space, jump to address 071 (octal). Apply MPU data to data path |
| 1 | If MPU is accessing mail box, jump to 7 |
| 2 | If MPU is accessing status and command registers, jump to 4 |
| 3 | Jump to H,2 |
| 4 | Assert MPU GO bit (tell MPU CDP is ready). Wait for ENDMEMCYC to go true |
| 5 | Assert MPUEND bit (acknowledge the receipt of ENDMEMCYC). Wait for ENDMEMCYC to negate |
| 6 | Jump to Idle |
| 7 | If MPU is doing a read operation, jump to 15 |
| 10 | Idle (NOP). (Memory set up time) |
| 11 | Write mail box |
| 12 | Finish the write here |
| 13 | Assert MPU GO (tell MPU CDP is ready). Wait for ENDMEMCYC to go true |
| 14 | Jump to H,5 |
| 15 | Read mail box (Assert ROM04) |
| 16 | Idle (NOP) (Wait for valid data) |
| 17 | Jump to H,0 |
| H,0 | Assert MPU GO. Wait for ENDMEMCYC to go true |
| H,1 | Jump to H,5 |
| H,2 | Set up MPU data and address to RAM memory. If MPU is doing a read, jump to H,7 |
| H,3 | Write RAM memory. (Assert ROM E2.) Jump to H,14 |
| H,4 | Complete write and assert MPU GO. Wait for ENDMEMCYC to go true |
| H,5 | Assert MPU END (ROM M3). Wait for ENDMEMCYC to go true |
| H,6 | Jump to Idle |
| H,7 | Assert ROM I1 (force MPU data MUX to select data path). Load RAM memory output data register. Jump to H,4 |
| H,14 | Complete the write here and jump to H,4 |
| | PROGRAM: MPU to D/M Bus   Location: 0011 1001 |
| 11 | READ PSR. Wait here if D/M Bus is still busy |
| 12 | If XFER is DATO, go to state 14 |
| 13 | DATI so go to State H,7 |
| 14 | DATO so connect data path from MPU to D/M bus. PSR address bit on. Make D/M bus busy. D/M C1 on |
| 15 | If D/M address is I/O page, go to state 17 |
| 16 | Set MEM MSYC. Jump to H,0 allow MSYN auto reset |
| 17 | Set Disk MSYSNC. Jump to H,5 |
| H,0 | Wait for MEM FINI |
| H,1 | Bus cycle complete. Send MPU go. Wait for end cycle |
| H,2 | Negate MPU GO. Wait for END CYCLE*. Send MPU END |
| H,3 | Send END PULSE |
| H,4 | Send END PULSE. Go Idle select SA ROM |
| H,5 | Disk MSYN on. Wait for disk SSYN |
| H,6 | Disk SSYN, go to H,1 |
| | DATI |
| H,7 | Connect data path D/M to MPU. If D/M address is IO page, go to H,15. Send address, bus busy out |
| H,10 | It is cache so send MSYN to cache and no auto reset of MSYN. Wait here for cache SSYN |
| H,11 | Send MPU GO. Wait for END CYCLE |
| H,12 | Negate MSYN to cache |
| H,13 | Negate MPU GO and wait for END CYCLE*. Send MPU END |
| H,14 | Jump to H,3 |
| H,15 | Send MSYN to disk and wait for disk SSYN |
| H,16 | Send MPU GO and wait for END CYCLE |
| H,17 | Jump to H,13 and drop MSYN |

Figure 11:
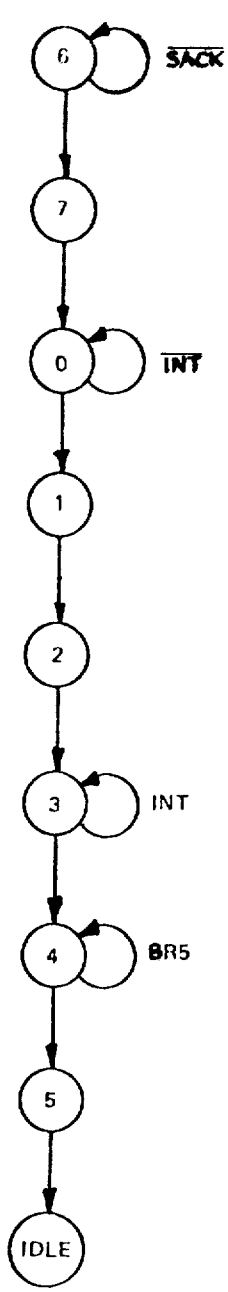

Interrupt from D/M. The microcode routine starting at 0 0011 0110 accepts an interrupt vector address from a D bus master and stores it in location (MPU address) F494. When an interrupt vector address is received from the D bus master, an interrupt is sent to the MPU. FIG. 11 and the following table apply to the routine.

TABLE 12
Interrupt D Bus State Instructions
Location: 0011 XXXX

| STATE | INSTRUCTION |
|---|---|
| 0 | Select RAM location for disk interrupt vector. Enable data path 4 to 1 and 2 to 1, select D data. Wait here for D bus interrupt |
| 1 | Now have D/M bus interrupt by initiating write to RAM. Send INT to MPU (ROMNZ) |
| 2 | RAM write complete. Send slave sync (ROM I3) to D bus |
| 3 | Wait here for interrupt to negate slave sync still on |
| 4 | Wait here if BR5 still on. Negate slave sync |
| 5 | END PULSE. SA ROM, jump to Idle |
| 6 | Send BG5 to the disk. Wait for SACK drom disk |
| 7 | Jump to 0011 0000. Drop BG5 to the disk |

Figure 12:
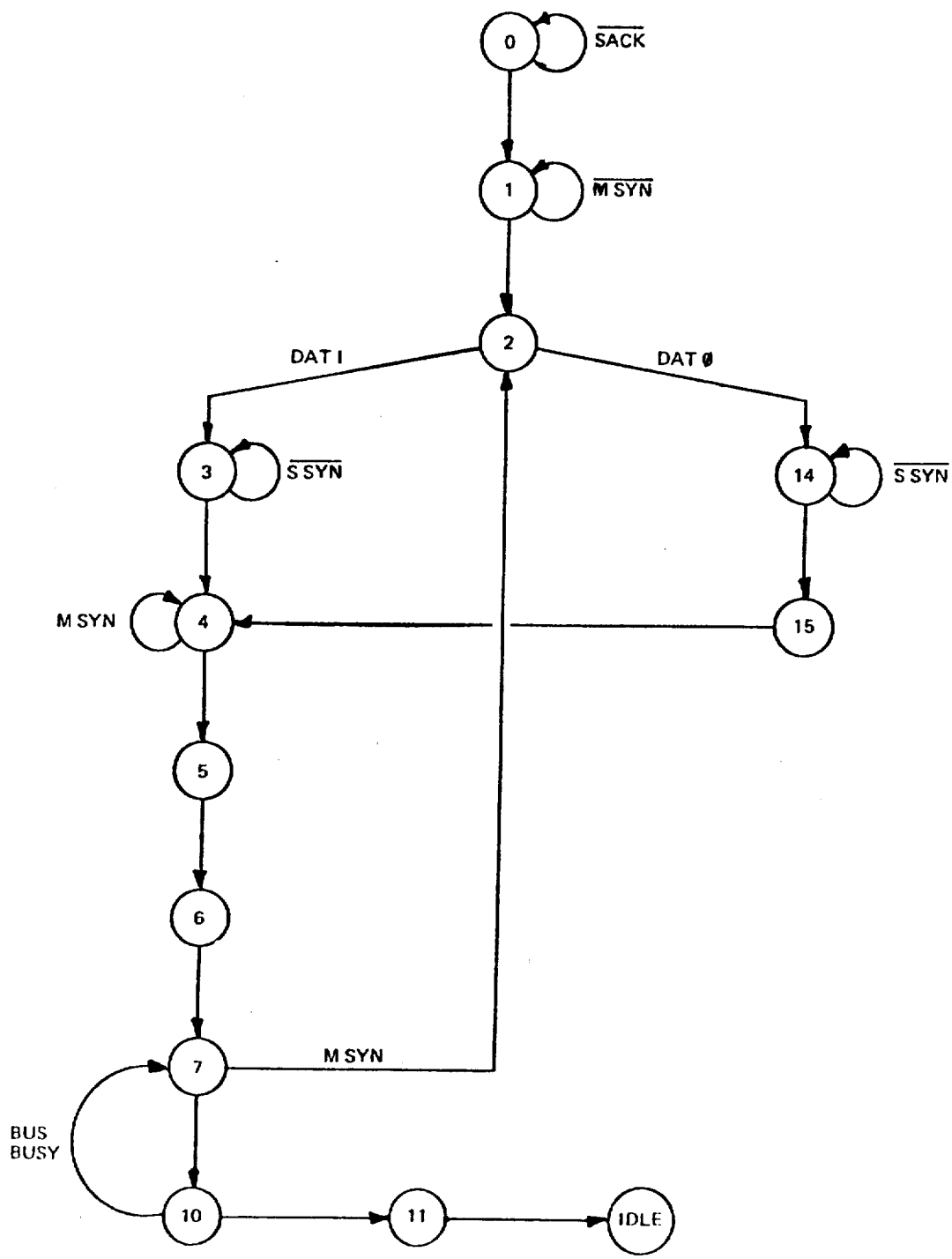

Disk-Cache. The microcode routine starting at 0 0100 0000 will connect the disk to the cache (external, D bus) for a data transfer. The CDP must do this because the master/slave syncs are unique for the disk controller and the D bus memory. FIG. 12 and the following table apply to this routine.

TABLE 13
Disk-Cache Program States

| STATE | INSTRUCTION |
|---|---|
| 0 | Wait here for SACK from the disk. Send NPG to the disk (ROM M1) |
| 1 | Wait here for disk M sync |
| 2 | Jump on C1 (DISK DATO) to state 14 |
| 3 | C1 not on so XFER is DISK DATI. Send MSYN to memory (ROM I2). Wait here for memory slave sync |
| 4 | Slave sync from memory so send slave sync to disk (ROM I3). Wait for disk to drop M sync |
| 5 | Negate M sync to memory. Step to 6 |
| 6 | Negate slave sync to disk. Step to 7 |
| 7 | Jump disk MSYN to 2 |
| 10 | Jump busy to 7. Send END PULSE (ROM P4) |
| 11 | Exit to Idle |
| | DISK TO MEMORY |
| 14 | Send MSYN to memory (ROM I2). Wait for memory slave sync. Allow auto reset to MSYN (ROM E4) |
| 15 | Jump to 4 |

Figure 13:
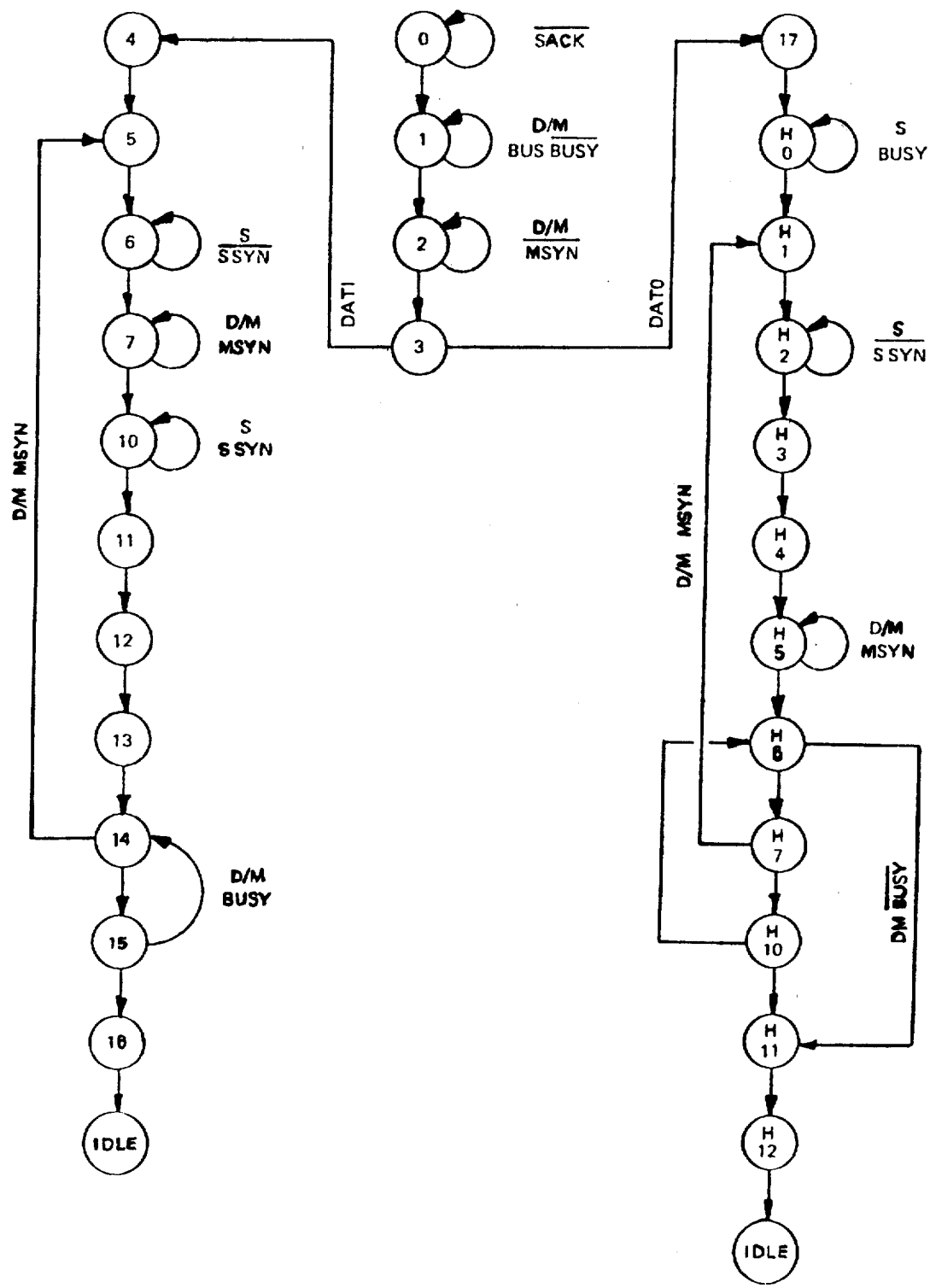

Disk/System. The microcode routine starting at 0 0101 000 will connect the D port bus master to the S port bus for an NPR (data) transfer. The S port address is maintained in CDP RAM locations 5 (LSB) and 6 (MSB). These RAM locations are accessed by the MPU as locations F48A and F48C. The routine will service disk data transfers until the disk controller relinquishes bus mastership. The CDP does not maintain a word count and no CDP interrupt is generated by a disk data transfer. FIG. 13 and the following table apply to the Disk/System microcode routine.

a. Disk/System Flow Diagram, FIGS. 6–19
b. Disk/System Coding Form, FIGS. 6–20
c. Disk/System State Instructions, table 6-14.

TABLE 14
Disk/System State Instructions
Location: 0101 XXXX

| STATE | INSTRUCTION |
|---|---|
| 0 | Load least significant portion of disk slave address. Send NPG to disk (ROM M1) |
| 1 | Load most significant portion of disk slave address. Send NPG to disk. Wait here for disk bus busy |
| 2 | Wait here for disk bus M sync. Drop NPG to disk |
| 3 | Jump on C1 (DISK DATO) to 17 |
| 4 | C1 is off so XFER is disk DATI. Wait for S bus to go |

TABLE 14-continued

Disk/System State Instructions
Location: 0101 XXXX

| STATE | INSTRUCTION |
|---|---|
|  | not busy. Select S port for data path 4 to 1 MUX and 2 to 1 MUX (ROM G3, ROM G4) |
| 5 | S bus is not busy so send address out (S busy, ROM K3). Add two to adder (ROM C2) and initiate write back of next S bus address (ROM E2). Enable data path to DM bus C |
| 6 | Send master sync to S bus. Wait here for slave sync. Write initiated at step 5 completed here |
| 7 | Send slave sync to disk. Wait here for disk MSYN to drop |
| 10 | Disk MSYN off so drop MSYN to S bus. Wait here for S SSYN to drop |
| 11 | Drop SSYN to disk. Increment upper address bits. Initiate write back of upper address bits |
| 12 | Complete upper address write initiated here |
| 13 | If not busy, exit step 15. Load lower address anyway, just in case we should do another word |
| 14 | If D/M MSYN back on, go to step 5 |
| 15 | Generate END PULSE. Jump D/M bus busy to 14 |
| 16 | Jump to Idle |
| 17 | Go to high page. Disk XFER is DATO so connect disk data lines to S bus (ROM G1, G3, G4) |
| H,0 | Wait here if S bus is still busy |
| H,1 | S not busy so enable data (ROM K4) and address (ROM K3) to S. Write next address to ROM |
| H,2 | Send M sync to the S bus. Wait for slave sync. Write from 1 complete here |
| H,3 | Slave sync back from S bus so negate S M sync (ROM K1) |
| H,4 | Assert slave sync to the disk bus. Write upper address to RAM and clock upper address bits (ROM D2, ROM E2) |
| H,5 | Assert slave sync to the disk bus wait for M sync to drop. Next address write completed here (upper bits) |
| H,6 | If D/M bus not busy, go to 11 and exit; but load lower address bits just in case |
| H,7 | Disk M sync back on so go to state 1 |
| H,10 | Go back to 6 |
| H,11 | Send S SACK END PULSE |
| H,12 | Send S SACK. Jump to Idle |

Figure 14:
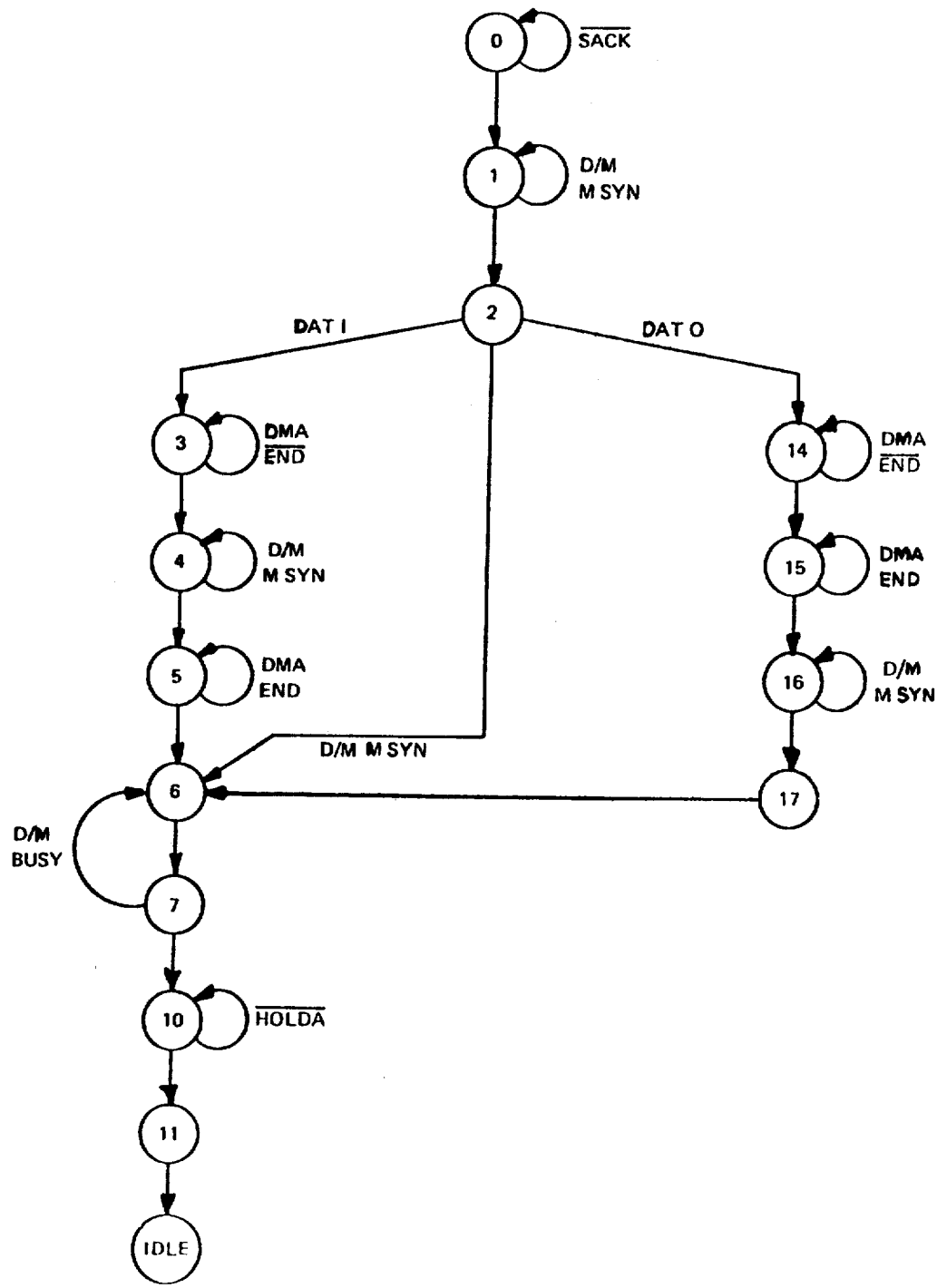

Disk-MPU. The microcode routine starting at 0 0110 000 will connect the D port bus master to the MPU port for an NPR (data) transfer. The MPU port address is maintained in the CDP RAM location 5. RAM location 5 is accessed by the MPU as location F48A. This routine will service disk data transfers until the disk controller relinquishes bus mastership. The CDP does not maintain a word count and no CDP interrupt is generated by a disk data transfer. FIG. 14 and the following table apply to this routine.

TABLE 15

Disk-MPU Program States

| STATE | INSTRUCTIONS |
|---|---|
| 0 | Wait here for SACK. Read MPU address (RAM 5). Send NPG to the disk. Wait SACK |
| 1 | Wait for disk MSYN |
| 2 | If C1 on XFER is disk DATO, go to state 14. WRITE back next address (RAM 5) |
| 3 | C1 is off so XFER is disk DATI. Connect data path MPU to disk. Assert MPU GO and wait for DMA END. Output data to the disk (ROM J1). Next address update complete here |
| 4 | Send SSYN to the disk. Wait for disk MSYN to negate |
| 5 | Send MPU END to MPU. Wait for DMA END. Read next address (RAM 5) |
| 6 | Disk MSYN on, go to 2 |
| 7 | Busy on, go to 6 |
| 10 | Clear HOLD REQ. Wait for HOLDA to negate. END PULSE |
| 11 | END PUSLE. Jump to Idle |
| 12 | RSVD |
| 13 | RSVD |

TABLE 15-continued

Disk-MPU Program States

| STATE | INSTRUCTIONS |
|---|---|
| 14 | C1 is on so XFER is disk DATO. Connect data path disk to MPU. Assert MPU WRITE and MPU GO. Wait for DMA END. Next address write complete here |
| 15 | Assert MPU END and wait for DMA END to negate |
| 16 | Send SSYN to the disk. Wait for MSYN to negate |
| 17 | Jump to 6. Read next address (RAM 5) |

Figure 15:
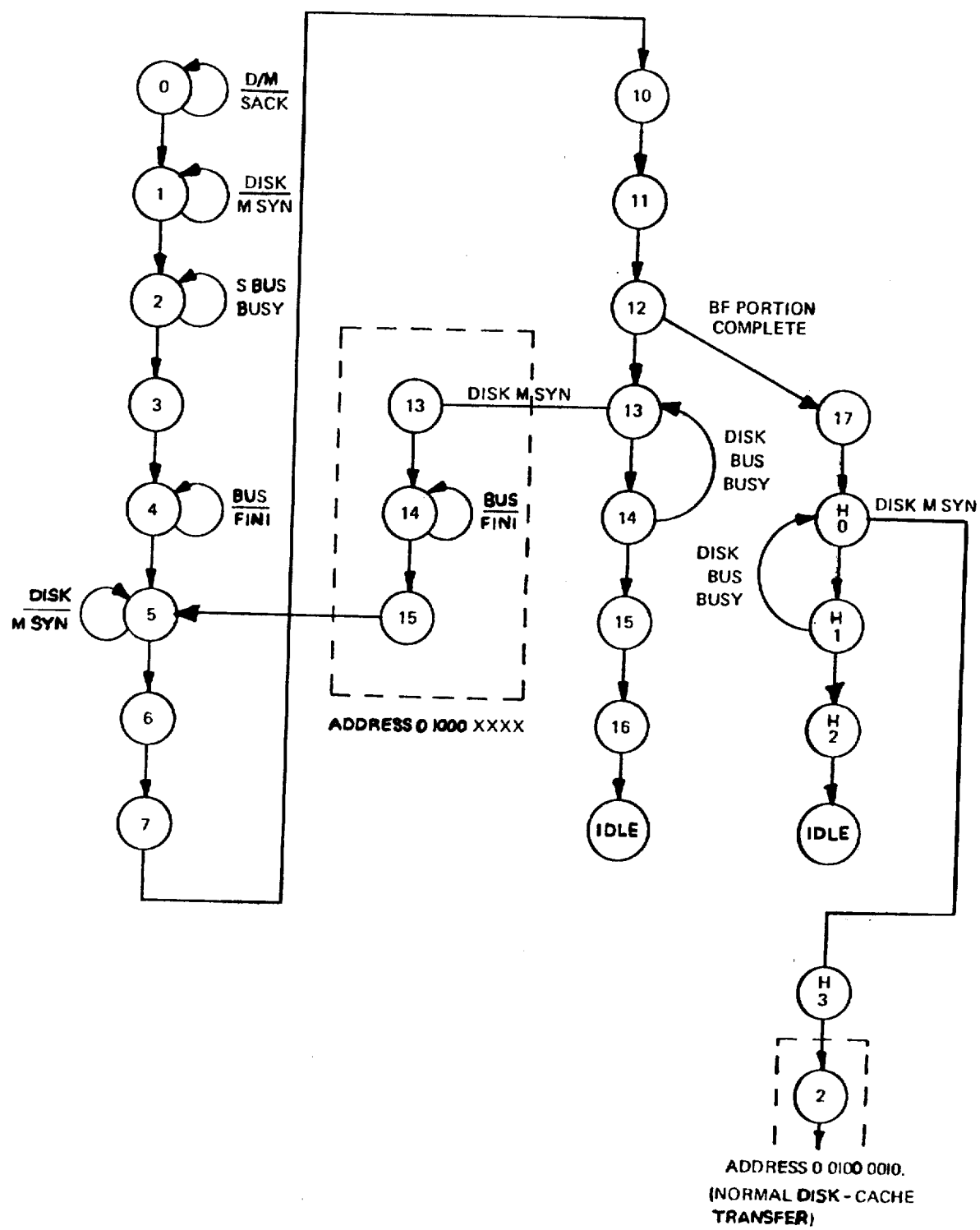

Disk-Bifurcated. The microcode routine starting at 0 0111 000 will connect the D bus master (disk controller) to the external cache and the S port bus for a DATA (data out from the disk controller). The external cache address and transfer word count is maintained in the disk controller. The system address is maintained in CDP parameter RAM locations 5 (F48A) and 6 (F48C). A word count (in 2's complement) is maintained in RAM location $16_8$ (F49C). The word count (F49C) is decremented as each word is transferred. When (if) the word count goes to zero, the disk transfer mode (F4A3) is reset and an interrupt (BF transfers complete, F4A0 bit 11) flag is set. When the disk transfer mode is set to zero, subsequent disk DATOs will be to the external cache only. If the BF word count (F49C) is equal to or less than the disk transfer word count, a bifurcated transfer complete interrupt is generated. If not, it is not. FIG. 15 and the following tables apply to this routine:

TABLE 16

Disk-Bifurcated Transfer Program States
Location: 0111 XXXX

| STATE | INSTRUCTION |
|---|---|
| 0 | Get upper address bits. (RAM 6) NPG to the disk |
| 1 | Get lower address bits (RAM 5). Wait here for the disk MSYN. Data path to the system |
| 2 | Wait here if S bus busy. Write next address (lower bits) to RAM 5. Two to the adder |
| 3 | Set S bus busy. Data and address out |
| 4 | Set S MSYN. Set cache MSYN. Wait for bus fini |
| 5 | Both bus cycles complete. Assert slave sync to the disk. Wait here for the disk to negate MSYN |
| 6 | Increment upper address bits and write them back to RAM 6 |
| 7 | Write complete here |
| 10 | Read BF word count, RAM 16. One to the adder |
| 11 | Write next word count back to RAM 16 |
| 12 | Write complete here. If CY on that was the last BF XFER go to state 17 |
| 13 | Is disk MSYN on? Go to 1 |
| 14 | Is disk busy on? Go to 13 |
| 15 | Disk busy off so END pulse. SACK to S bus |
| 16 | SACK to S jump to Idle END pulse |
| 17 | Jump to H,0. Reset BF transfer mode (ROM Q1) |
| H,0 | Is disk MSYN on? Go to H,3 SACK to S |
| H,1 | Is disk busy on? SACK to S |
| H,2 | Go Idle |
| H,3 | Go cache XFER (0100 0010) |
| | S BUS CONTROL |
| H,10 | Assert allow MSYN reset (AMR) |
| H,11 | Assert SSYN |
| H,12 | Allow enough time for MSYN to go high |
| H,13 | Wait for MSYN to drop |
| H,14 | Drop SSYN |
| H,15 | Wait for BUSFINI to go low. Drop AMR |
| H,16 | Wait for BUSFINI to go high. Jump to H,0 |

Figure 16:
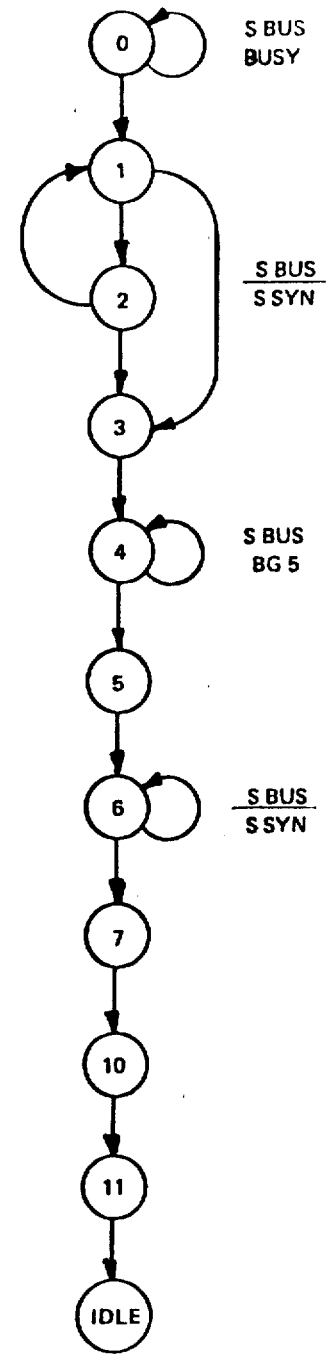

Interrupt to S. The microcode routine starting at location 0 1000 000 will transfer the interrupt vector address (IVA) located in CDP parameter RAM location $13_8$ (F496) to the CPU resident on the S bus. FIG. 16 and the following table apply to this routine.

TABLE 17

Interrupt to S Program States
Location: 1000 0000

| STATE | INSTRUCTIONS |
|---|---|
| 0 | Read RAM location 13 (S interrupt vector address) to its output reg. Wait here if S bus is busy |
| 1 | Jump to state 3 if slave sync off from previous cycle |
| 2 | Jump to state 1 - slave sync still on from previous cycle |
| 3 | Set bus busy and vector to S CPU (ROM K3, ROM K4). Send SACK to S CPU (ROM L2) |
| 4 | Repeat state 3. Negate bus requirest to S CPU (ROM L4). Send interrupt to S CPU. Wait here until bus grant negates. |
| 5 | Continue to send bus busy, data, and interrupt to S CPU. Drop SACK |
| 6 | Continue to send bus busy, data, and interrupt to S CPU. Wait here for S SSYN to assert |
| 7 | Continue to send interrupt and bus busy to S CPU. Negate data |
| 10 | Hold bus busy, but negate interrupt. Send interrupt to S CPU |
| 11 | Drop bus busy. Jump to Idle, starting address ROM |

Figure 17:
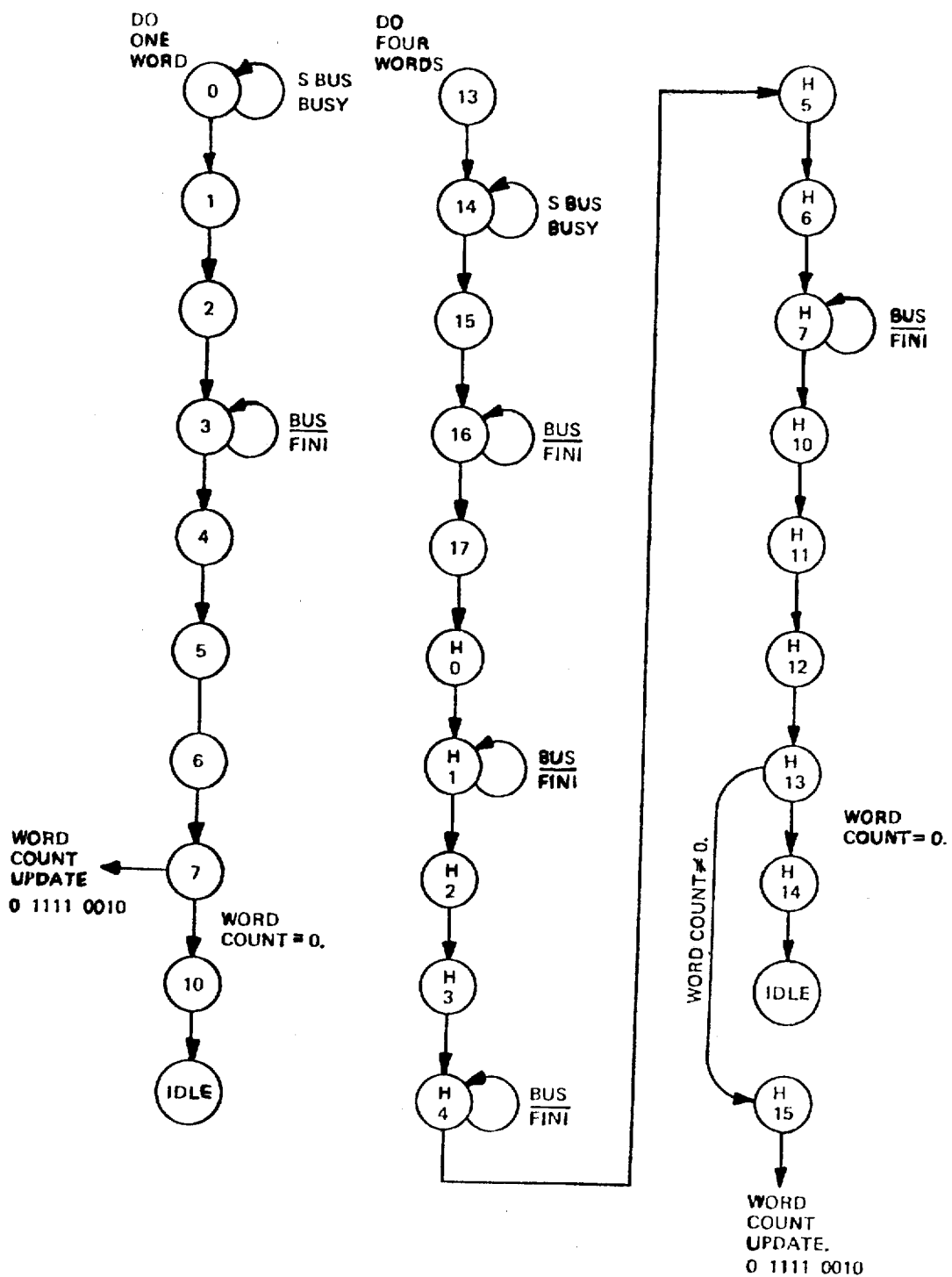

S PUT. The microcode routine starting at location 0 1001 0000 will transfer one data word from the CDP Quad buffer to an S bus address determined by the contents of parameter RAM location 3 (F486) (LSB) and 4 (F488) (MSB). After the word is transferred to the system memory, parameter RAM location 15 (F49A) is checked for zero. If F49A is zero, the transfer is complete and interrupt (F4A0, bit 10) is sent to the MPU. If F49A is not zero, an exit is made to the word count update portion of the CDP GO routine (location 0 1111 0010). The microcode routine starting at location 0 1001 1011 will transfer four words from the CDP quad buffer to an S bus address in the same manner as the S PUT ONE routine. An exit is made to the word count update routine if more words are to be transferred. If the transfer is complete (word count equal zero), the MPU is interrupted and the routine is exit. FIG. 17 and the following table apply to this routine.

TABLE 18

S PUT Program States
Location: 1001 XXXX

| STATE | INSTRUCTIONS |
|---|---|
| | *Do One* |
| 0 | Load upper address bits (RAM 4). Wait here if S port still busy |
| 1 | Load lower address bits (RAM 3). Two to the adder. Select quad buffer to S port data (ROM H4) |
| 2 | Set S bus busy and C1 (ROM K3, ROM K4). Write next address back (RAM 3) |
| 3 | Set S bus M SYNC (ROM K1) and SACK (ROM L2). Clear arbitration logic (ROM D3). Wait here for S SYNC. Allow auto reset of M SYNC (ROM E4) |
| 4 | Increment upper address bits and write them back (RAM 4) |
| 5 | Write complete here |
| 6 | Read word count (RAM 15), and all ones to the adder |
| 7 | If CY ON more to go, jump to word count update of CDP GO routine (1111 0010). END pulse |
| 10 | Count is zero so we did the last word. Set INT to the MPU (ROM N3). Jump to Idle |
| | *Do Four* |
| 13 | Read upper address bits (RAM 4) |
| 14 | Load. Read lower address bits. Wait here if S bus busy. Quad buffer zero and enable adder 2 |
| 15 | Write. Set S bus busy data out. Initiate write back of next address |
| 16 | Wait. Set MSYN - wait for BUSFINI. Send SACK to S (ROM L2). Clear GET PUT logic |
| 17 | Load. Increment upper address bits. Load next lower address. Jump to H,0. Quad buffer one |
| H,0 | Write. Same as 15 |
| H,1 | Wait. Same as 16 |
| H,2 | Load. Same as 17 quad buffer 2 |
| H,3 | Write. Same as 15 quad buffer 2 |
| H,4 | Wait. Same as 16 quad buffer 2 |
| H,5 | Load. Same as 17 quad buffer 3 |
| H,6 | Write. Same as 15 quad buffer 3 |
| H,7 | Wait. Same as 16 quad buffer 3 |
| H,10 | Increment upper address bits and write them back (RAM 4) |
| H,11 | Write complete here |
| H,12 | Read number words (RAM 15), all ones to the adder |
| H,13 | If CY on more to do, jump to CDP GO routine via H,15 |
| H,14 | Done, so set MPU interrupt No. 5. Jump to Idle |
| H,15 | We are not done, so go to word count update portion of CDP GO routine (1111 0010) |

Figure 18:
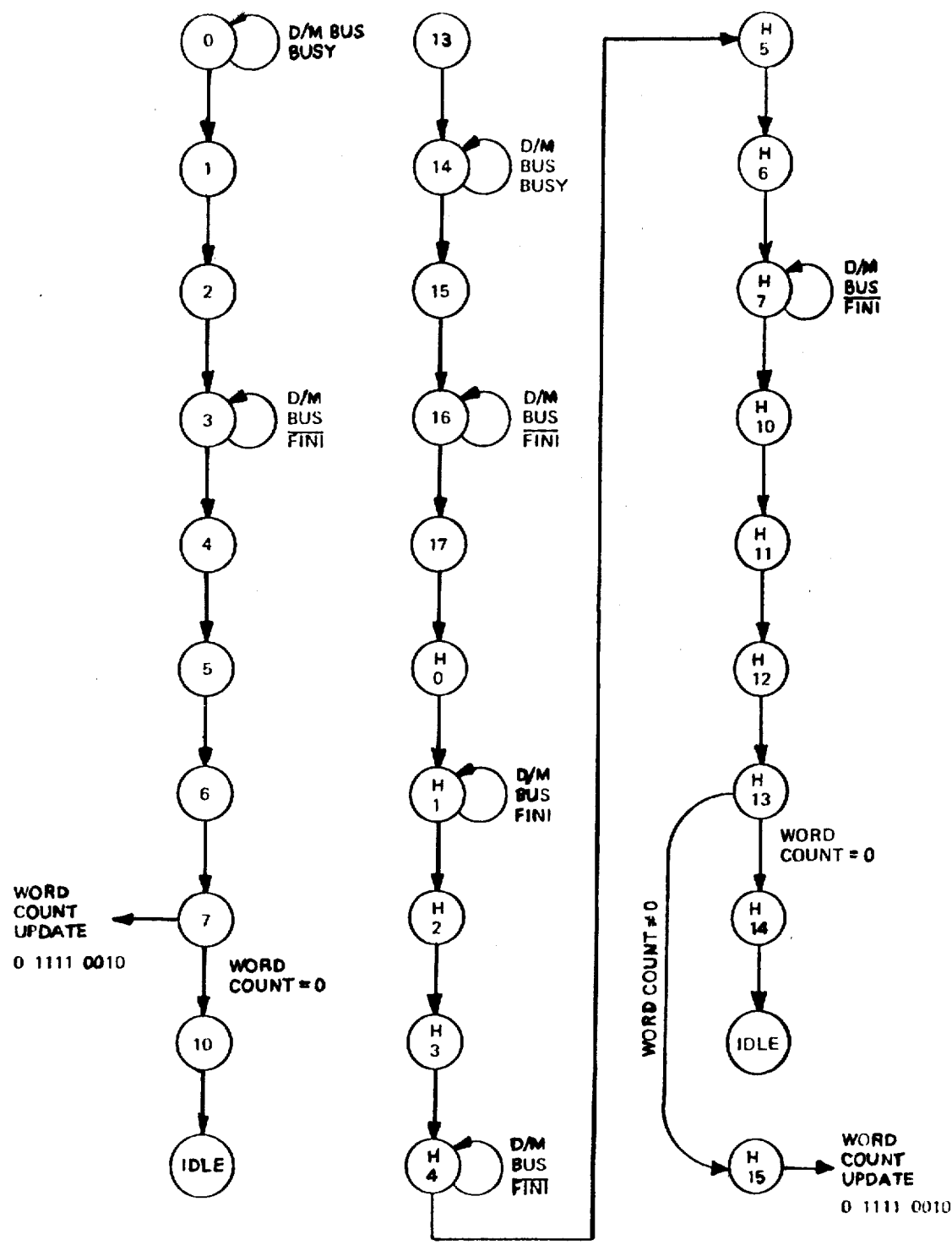

D/M PUT. The microcode routine starting at location 0 1010 000 will transfer one data word from the CDP quad buffer to a D bus address determined by the contents of parameter RAM locations 0 (F480, LSB) and 1 (F482, MSB). After the word is transferred to the system memory, parameter RAM location 15 (F49A) is checked for zero. If F49A is zero, the block transfer is complete and an interrupt (F4A0, bit 10) is sent to the MPU. If F49A is not zero, an exit is made to the word count update portion of the CDP GO routine (location 0 1111 0010). The microcode routine starting at location 0 1010 1011 will transfer four words from the CDP quad buffer to a D bus address in the same manner as the D PUT ONE routine. An exit is made to the word count update routine if more words are to be transferred. If the transfer is complete (F49A=0), the MPU is interrupted (F490, bit 10) and the routine is exited. (The D PUT routine is near identical to the S PUT routine so use the microcode statements for S PUT. Change all S PUT functions to D port.) FIG. 18 and the last table above thus apply to this routine.

Figure 19:
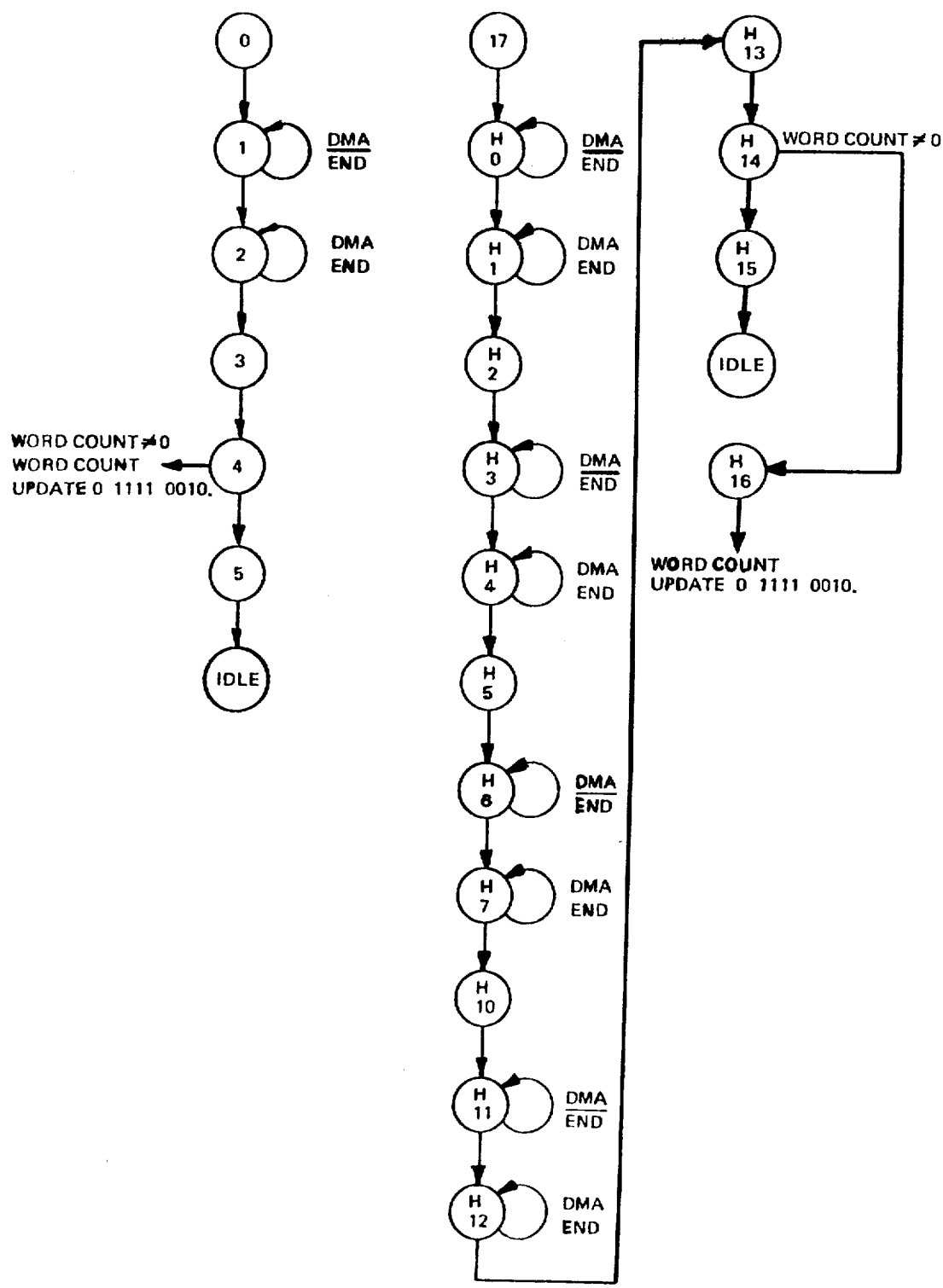

MPU PUT. The microcode routine starting at location 0 1011 0000 will transfer one data word from the CDP Quad buffer to an MPU bus address determined by the contents of parameter RAM location 2 (F484). After the word is transferred to the system memory, parameter RAM location 15 (F49A) is checked for zero. If F49A is zero the block transfer is complete and an interrupt (F4A0, bit 10) is sent to the MPU. If F49A is not zero, an exit is made to the word count update portion of the CDP GO routine (location 0 1111 0010). The microcode routine starting at location 0 1011 1111 will transfer four words from the CDP quad buffer to an MPU bus address in the same manner as the MPU PUT one routine. An exit is made to the word count update routine if more words are to be transferred. If the block transfer is complete (F49A=0), the MPU is interrupted (F4A0, bit 10) and the routine is exited. FIG. 19 and the following table apply to this routine.

TABLE 19

MPU PUT Program States
Location: 1011 XXXX

| STATE | INSTRUCTION |
|---|---|
| | *Do One* |
| 0 | Load MPU address (RAM 2). Enable quad buffer location 0. Set write mode to MPU |
| 1 | Assert MPU GO. Wait here for DMA END. Write next address |

TABLE 19-continued
MPU PUT Program States
Location: 1011 XXXX

| STATE | INSTRUCTION |
|---|---|
| 2 | Assert MPU END. Wait for DMA END*. Write complete here |
| 3 | Read number words to go (RAM 15). All ones to the adder. Reset arbitration logic |
| 4 | If CY is on more to go so jump to CDP word count update (1111 0010) ROM Q4. Clear hold to MPU |
| 5 | End of transfer. Send interrupt to MPU (ROM N3). Jump to Idle. END PULSE |
| 6 | |
| 7 | |
| | Do Four |
| 17 0 | Load MPU address (RAM 2) enable quad buffer location 0. Set write mode to MPU. Jump to H,0 |
| H, 01 | Assert MPU GO. Wait here for DMA END. Write next address to RAM 2 |
| H, 1 | Assert MPU END. Wait here for DMA END. Next address write complete here |
| H, 2 | Same as 17 quad buffer 1 |
| H, 3 | Same as H, 0 quad buffer 1 |
| H, 4 | Same as H,1 quad buffer 1 |
| | Do One |
| H, 5 | Same as 17 quad buffer 2 |
| H, 6 | Same as H, 0 quad buffer 2 |
| H, 7 | Same as H, 1 quad buffer 2 |
| H, 10 | Same as 17 quad buffer 3 |
| H, 11 | Same as H, 0 quad buffer 3 |
| H, 12 | Same as H, 1 quad buffer 3 |
| H, 13 | Read number of words to go (RAM 15). All ones to the adder. Clear GET/PUT logic |
| H, 14 | If CY on, go to 16 and do more. ROMQ4, clear hold |
| H, 15 | CY off so INT MPU (ROM N3). Go Idle. END PULSE |
| H, 16 | Go to word count portion of CDP GO routine (1111 0010) END PULSE |

S GET. The microcode routine starting at location 0 1100 0000 will move one word from an S bus address determined by the contents or parameter RAM locations 3 (F486) (LSB) and 4 (F488) (MSB) to the Quad buffer. The S bus pointer is incremented and placed back in the parameter RAM.

Figure 20:
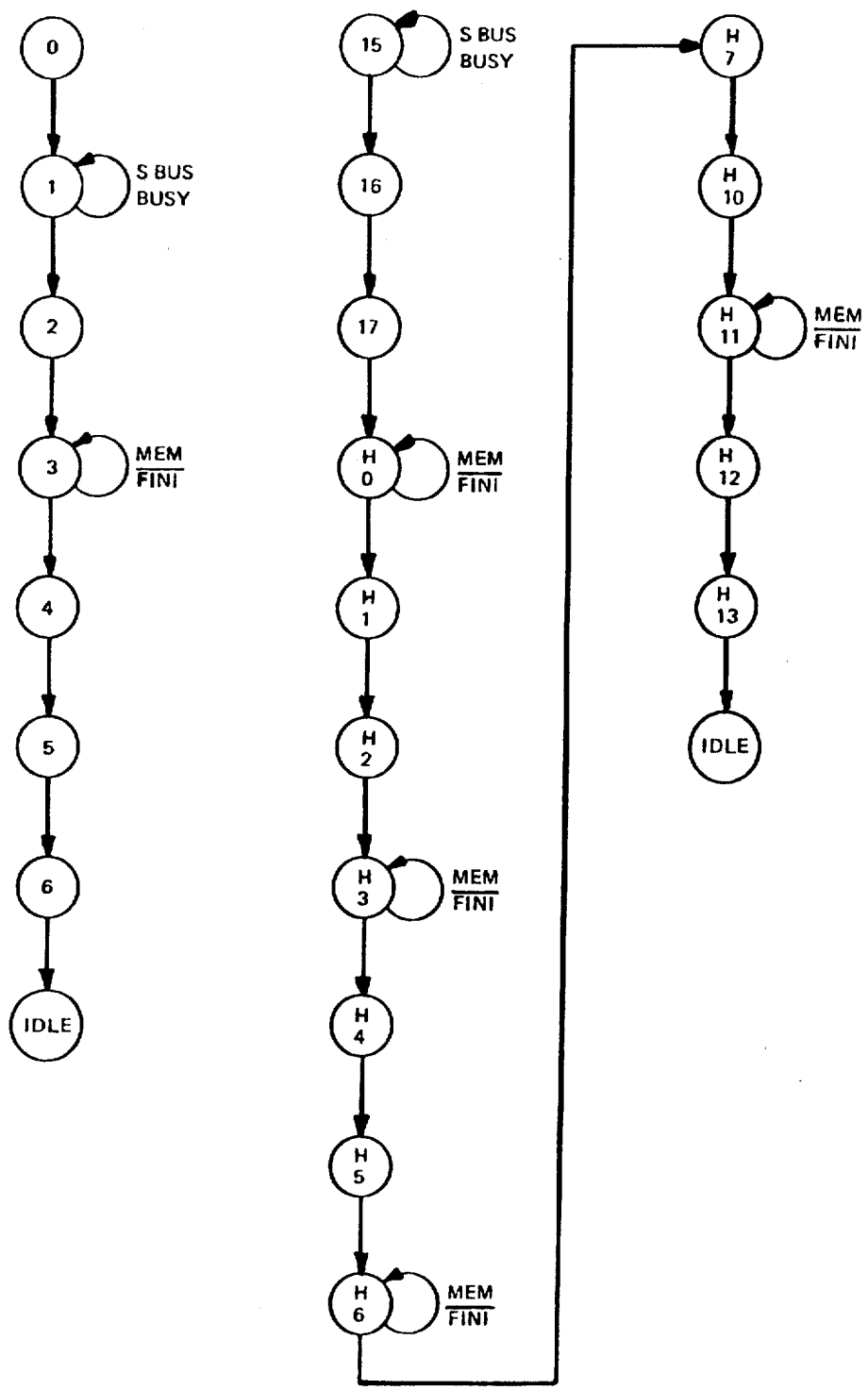

The microcode routine starting at location 0 1100 101 will move four words from S bus addresses starting at the location determined by the contents of parameter RAM locations 3 and 4 (same as S GET, one word) to the Quad buffer. As each word is read, the S bus pointer is incremented and placed back in the parameter RAM. FIG. 20 and the following table apply to the routine.

TABLE 20
S GET Program States
Location: 1100 XXXX

| STATE | INSTRUCTIONS |
|---|---|
| | Do One |
| 0 | Read S bus address MSB (RAM 4) |
| 1 | Read S bus address LSB (RAM 3). Wait here if S bus still busy. Connect data path S to quad buffer |
| 2 | Set S bus busy (ROM K3). Write next address LSB to RAM 3. Reset ARB logic |
| 3 | State 2 write complete here. Set MSYN to S bus. Allow auto reset to MSYN. Wait here for BUSFINI. Send SACK to S CPU (ROM L2) |
| 4 | Increment upper address bits. Write new upper bits to RAM 4 |
| 5 | State 4 write complete here. Initiate PUT logic and END PULSE |
| 6 | Select starting address ROM. Jump to Idle |
| | Do Four |
| 15 | Read upper address bits (RAM 4). Wait here if S bus still busy |
| 16 | Read lower address bits (RAM 3). Set S bus busy. Data path S to quad buffer |
| 17 | Two to adder. Write next address (RAM 3). Set S MSYN. Jump to High Page. Allow auto reset of MSYN |
| H, 0 | Wait here for S MEM SSYN. Quad buffer zero write |
| H, 1 | Increment upper address bits and load next address from RAM 3 |
| H, 2 | Set S MSYN. Write next address back (RAM 3). Quad, BUF WRT ONE. SACK to S bus (ROM L2) |
| H, 3 | Wait for S SSYN. SACK to S bus |
| H, 4 | Same as H, 1 |
| H, 5 | Same as H, 2 |
| H, 6 | Same as H, 3 quad buffer 2 |
| H, 7 | Same as H, 1 |
| H, 10 | Same as H, 2 |
| H, 11 | Same as H, 3 quad buffer 3 |
| H, 12 | Write upper bits back to RAM 4. Arbitration logic GO, PUT. END PULSE |
| H, 13 | Jump to Idle |

Figure 21:
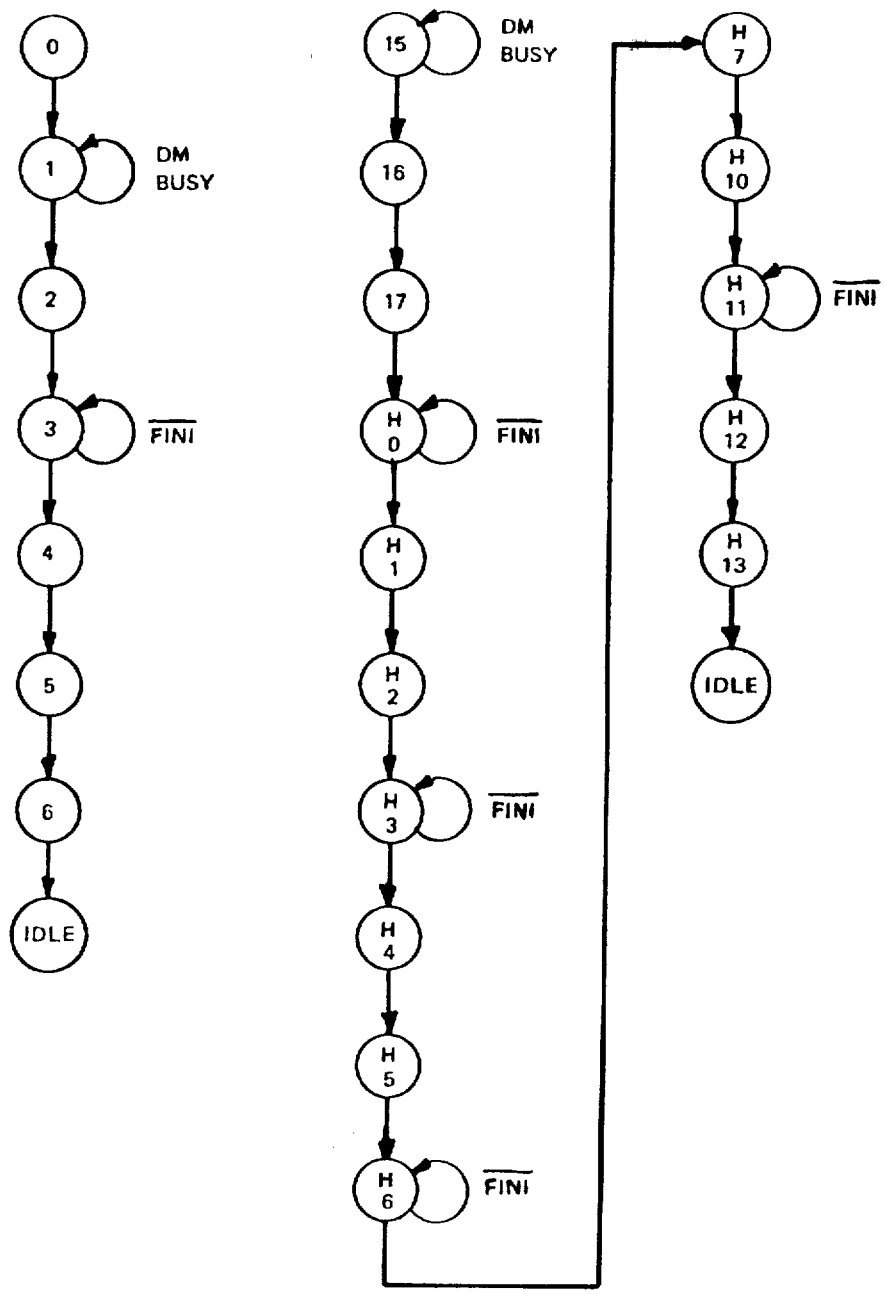

D/M GET. The microcode routine starting at location 0 1101 0000 will move one word from a D bus address determined by the contents of parameter RAM location 0 (F480) (LSB) and 1 (F482) (MSB) to the quad buffer. The D bus pointer is incremented and returned to the parameter RAM. The microcode routine starting at location 0 1101 1101 will move four words from D bus addresses starting at the location determined by the contents of parameter RAM locations 0 and 1 (same as D GET one word) to the Quad buffer. As each word is read, the pointer is incremented and placed back in the parameter RAM. FIG. 21 and the following table apply to this routine.

TABLE 21
D/M GET Program States
Location: 1101 XXXX

| STATE | INSTRUCTION |
|---|---|
| | Do One |
| 0 | Read D/M Bus address MSB (RAM 1) |
| 1 | Read D/M Bus address LSB (RAM 0). Wait here if D/M bus is still busy. Connect data path from D/M bus to quad buffer (ROM G), two to the adder |
| 2 | Set D/M bus busy (address out). Write next address LSB to RAM 0 |
| 3 | Set D/M mast SYNC, allow auto reset of D/M MSYN (ROM E4). Wait here for BUSFINI |
| 4 | Increment upper address bits. Write new upper address bits to the RAM |
| 5 | RAM write complete here. Initiate PUT cycle (ROM P1) and END PULSE |
| 6 | Jump to Idle |
| | Do Four |
| 15 | Read upper address bits (RAM 1). Wait here if D/M bus still busy |
| 16 | Read lower address bits. Set D/M bus busy |
| 17 | Two to adder, write back next address. Set cache MSYNC. Jump to high page. Allow auto reset of cache MSYNC |
| H, 0 | Wait here for cache response. Quad buffer 0 written |
| H, 1 | Increment upper address bits and load next address from RAM 0 |
| H, 2 | Set cache MSYN. Write back next address to RAM 0. Quad buffer address to one |
| H, 3 | Wait here for cache SSYN |
| H, 4 | Same as H, 1 |
| H, 5 | Same as H, 2 |
| H, 6 | Same as H, 3 quad buffer 2 |
| H, 7 | Same as H, 1 |
| H, 10 | Same as H, 2 |
| H, 11 | Same as H, 3 quad buffer 3 |
| H, 12 | Write upper bits back to RAM 1. Arbitration GO, PUT, END PULSE |

TABLE 21-continued
D/M GET Program States
Location: 1101 XXXX

| STATE | INSTRUCTION |
|---|---|
| H, 13 | Jump to Idle |

Figure 22:
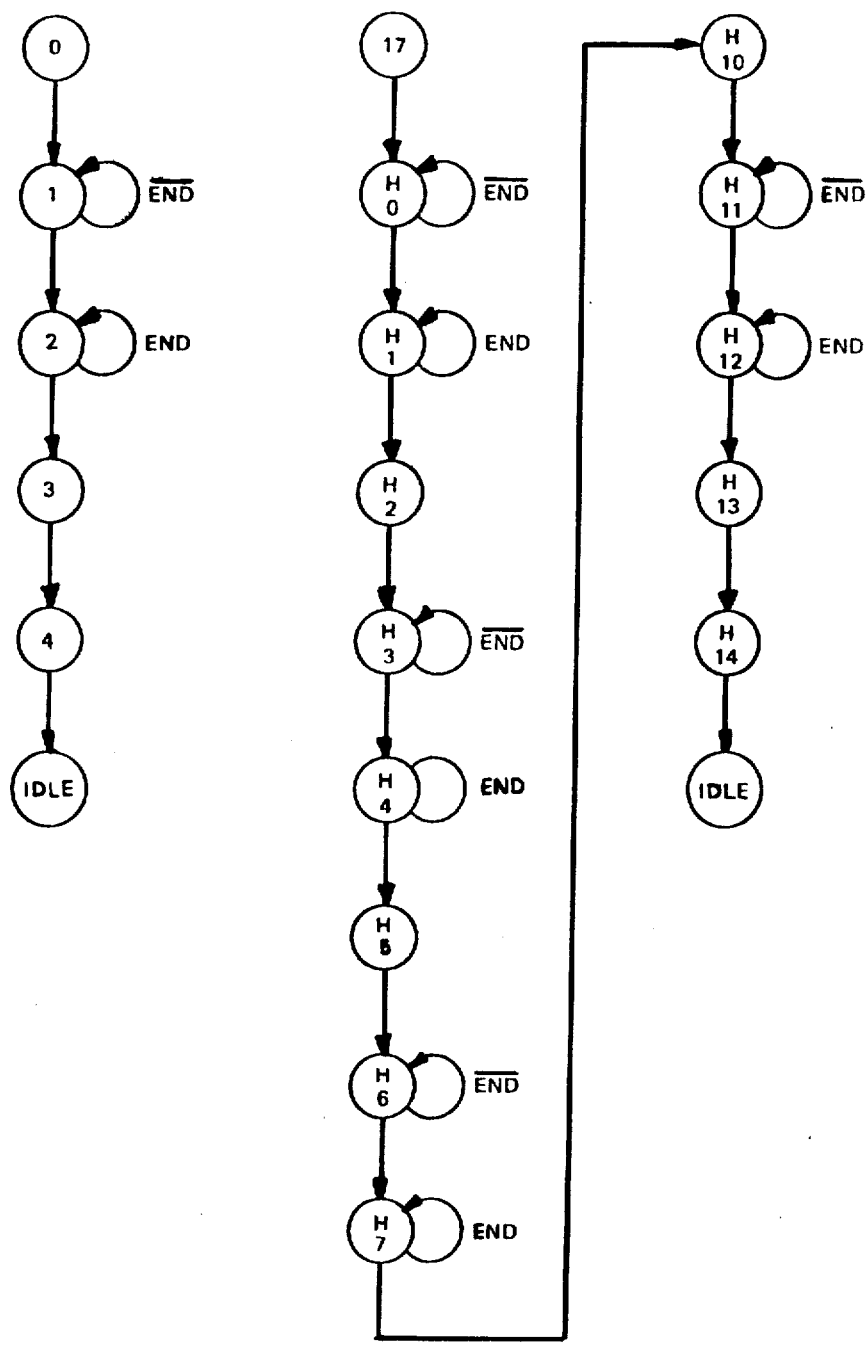

MPU GET. The microcode routine starting at location 0 1110 0000 will move one word from a MPU bus address determined by the contents of parameter RAM location 2 (F484) to the quad buffer. The MPU bus pointer is incremented and returned to the parameter RAM. The microcode routine starting at location 0 1110 1111 will move four words from MPU bus addresses starting at the location determined by the contents of parameter RAM location 2 (same as MPU GET one word) to the quad buffer. As each word is transferred, the pointer is incremented and placed back in the parameter RAM. FIG. 22 and the following table apply to this routine.

TABLE 22
MPU GET Program States
Location: 1110 XXXX

| STATE | INSTRUCTIONS |
|---|---|
| | Do One |
| 0 | Get MPU address from RAM 2. Connect data path MPU to quad buffer |
| 1 | Assert MPU GO. Two to the adder and initiate write of next address. Wait here for DMA END. Write quad buffer |
| 2 | Assert MPU END. Next address write complete. Wait for DMA END*. Clear GET/PUT logic |
| 3 | END PULSE. ROM Q4, clear hold |
| 4 | Initiate PUT CYCLE. Jump to Idle. Continue END PULSE |
| | Do Four |
| 17 | Get MPU address from RAM 2. Connect data path MPU to quad buffer zero. Jump to H, 0 |
| H, 0 | Assert MPU GO, two to the adder and initiate write of next address. Wait here for DMA END. Write quad buffer zero |
| H, 1 | Assert MPU END. Next address write complete here. Wait for DMA END* |
| H, 2 | Same as 17 quad buffer 1 |
| H, 3 | Same as H, 0 quad buffer 1 |
| H, 4 | Same as H, 1 quad buffer 1 |
| H, 5 | Same as 17 quad buffer 2 |
| H, 6 | Same as H, 0 quad buffer 2 |
| H, 7 | Same as H, 1 quad buffer 2 |
| H, 10 | Same as 17 quad buffer 3 |
| H, 11 | Same as H, 0 quad buffer 3 |
| H, 12 | Same as H, 1 quad buffer 3 |
| H, 13 | END PULSE. ROM Q4 clear hold (Clear GET PUT logic) |
| H, 14 | END PULSE. Set GET logic. Jump to Idle |

Figure 23:
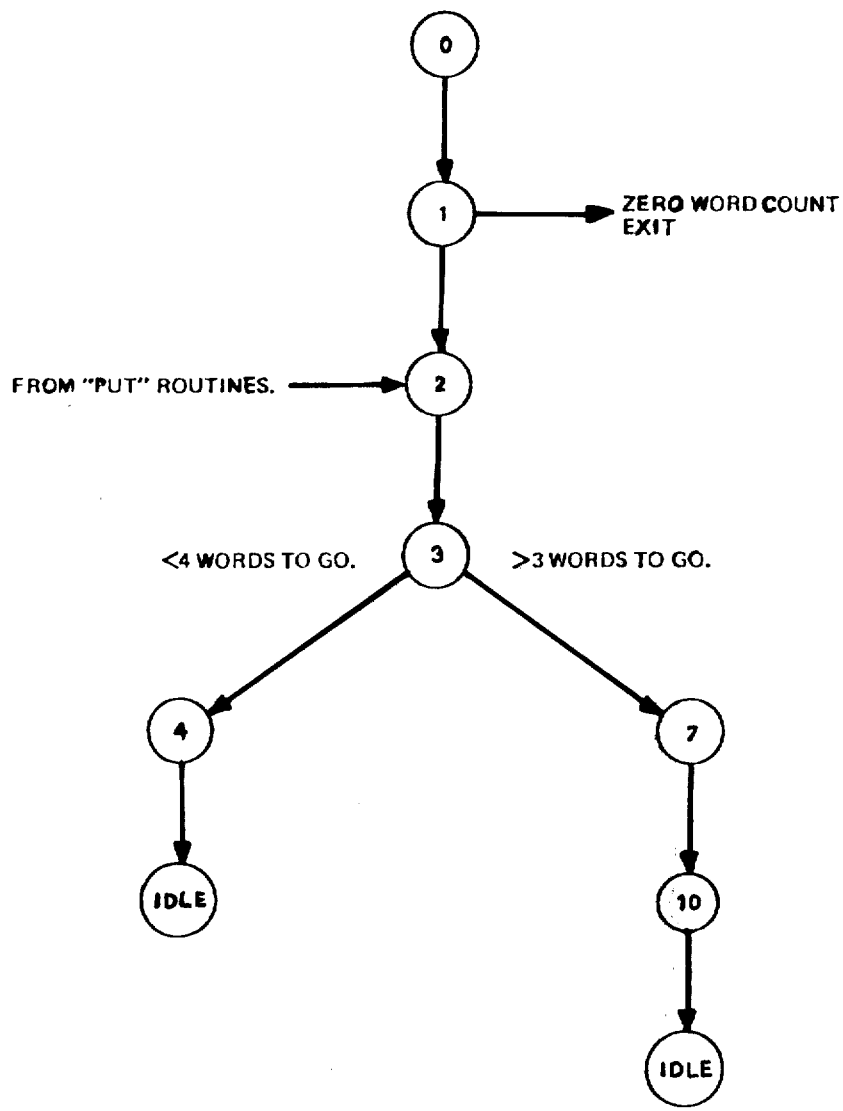

CDP GO. When the MPU initiates a CDP-controlled transfer the microcode routine at 0 1111 0000 is entered. If the starting word count [parameter RAM location 15 (F49A)] is zero, an error exit is made at state 1. If the word count is not zero, it is tested. If less than four words remain to be transferred, the DO ONE flag is set, the bus arbitration logic for a GET cycle is initiated, and the routine is exited. If more than three words remain to be transferred, the DO ONE flag is reset, the arbitration logic for a GET cycle is initiated, and the routine is exited. At the completion of each PUT cycle, if the word count is not zero, the CDP GO routine is entered at state 2 direct from the PUT microcode. FIG. 23 and the following table apply to the routine.

TABLE 23
CDP GO Program States
Location: 1111 XXXX

| STATE | INSTRUCTIONS |
|---|---|
| 0 | Read CDP word count (RAM 15). All ones to the adder. Reset the CDP GO bit (ROM A3) |
| 1 | If CY is off, jump to zero and send interrupt to MPU (ROM M3) |
| 2 | Word count not zero so add three to the adder, read word count (RAM 15). Enter here from last word count. Check portion of PUT routine |
| 3 | Clock CY flag (ROM 01). Jump to C4 (State 7) if CY is 1 |
| 4 | Four or more words to go so add four to the adder. Initiate write of new word count to RAM 15. END PULSE |
| 5 | Write complete here. Set arbitration logic go, get (ROM P1, P2). Jump to Idle |
| 6 | |
| 7 | Less than four words to go so add one to adder. Initiate write to word count (RAM 15). END PULSE |
| 10 | Write complete here. Set arbitration logic go, get and jump to Idle |
| H, 10 | Assert allow MSYN reset (AMR). Assert MSYN |
| H, 11 | Assert S SYN |
| H, 12 | Allow enough time for MSYN to go high |
| H, 13 | Wait for MSYN to drop |
| H, 14 | Drop S SYN |
| H, 15 | Wait for BUSFINI to go low. Drop AMR |

CACHING PROGRAM

Before presenting the caching program in detail, the general operations which the program implements will be briefly described, first as to transfer of data from the disk to the CPU, and then from the CPU to the disk.

For a transfer from the CPU to the disk, the first operation is to transfer parameters intended for the disk controller, but intercepted by the CDP. Then the CPU initiates the transfer with a command, again intended for the disk controller. The CDP recognizes the initiate command and interrupts the MPU which proceeds to examine the parameters and make the decision as to whether the transfer is to be (1) from the disk (because the data called for is not in cache memory) (2) from the cache memory, or (3) to simply transfer data from the disk to the data processing system.

For the last two cases, the MPU transfers the parameters to the disk and sets the transfer mode and distinction address in the CDP. It then sets the GO bit, and the disk reads out data to be transferred. While the transfer takes place, the MPU updates a cache memory directory if the data transferred is from the cache memory. The other case of transferring from disk to the CPU without a transfer into cache memory allows the data processing system some control over caching, such as when it is known that the data block will not be called for again, or for a very long time.

When the transfer is complete, the disk controller interrupts the MPU via the CDP, and the MPU updates transfer parameters in the mailbox to conform the disk register in the controller so that the CPU can look to the CDP and effectively see the controller. This is necessary because mailbox is first set by the CPU with the starting parameters of the transfer, and the mailbox is not updated during the transfer process. Then the MPU sends an interrupt to the data processing system via the CDP to signal that the transfer is complete.

For the first of the three cases of transfer from the disk to the CPU and to cache memory because the data called for is not in cache memory, the procedure is the same through the transfer of parameters to the disk from the MPU to the CDP and the setting of the transfer made, except that now the transfer includes the cache memory as a data sink, and four additional consecutive blocks of data are transferred there with the block of data called for by the CPU. This implements the "look-ahead" feature of the invention. The tranfers are then made and when complete, the CDP interrupts the MPU which updates the transfer parameters in the mailbox for just the block of data to the CPU. Finally the CDP interrupts the MPU.

Figures 24, 25:
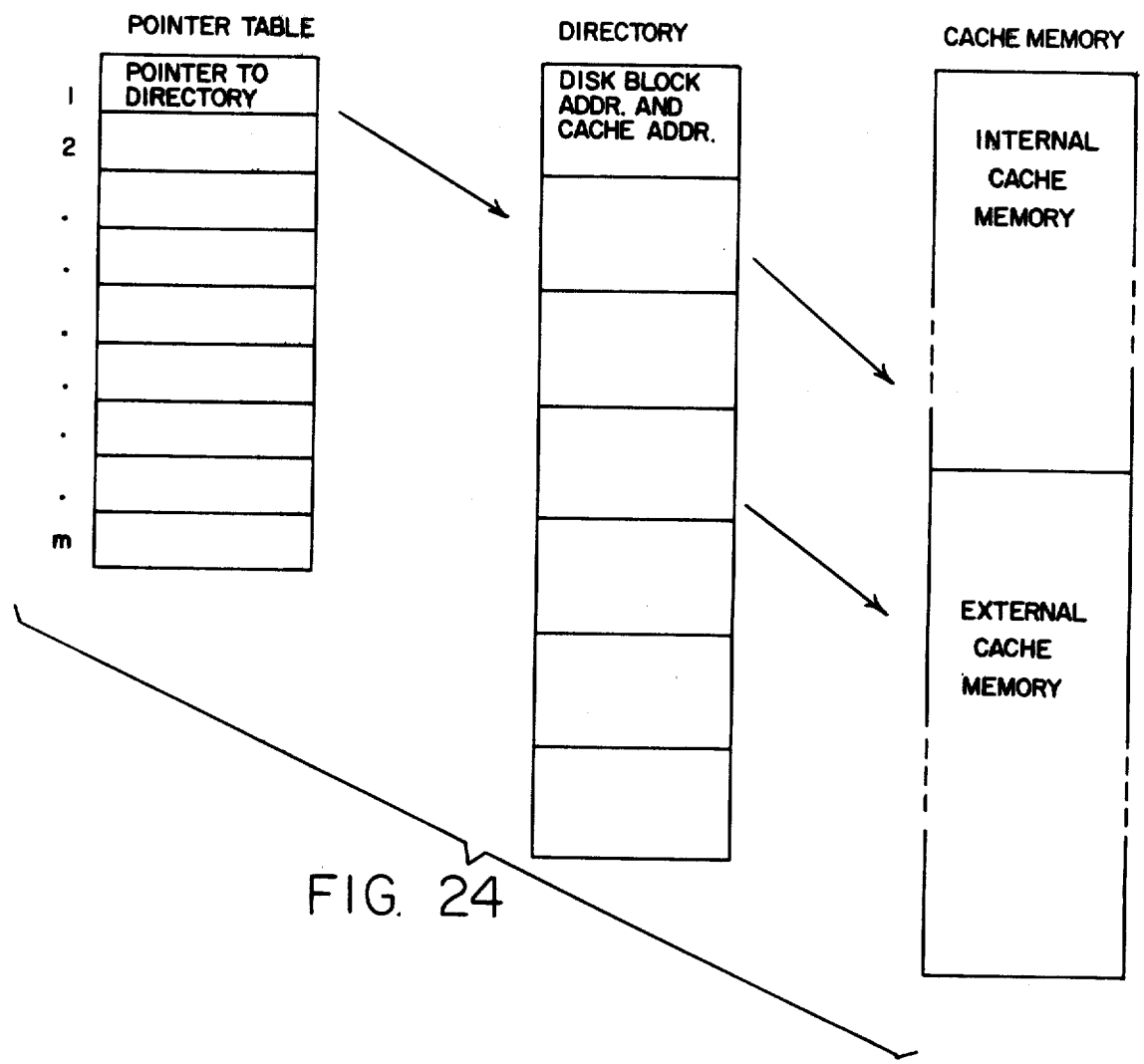
FIG. 24 illustrates schematically the organization of the disk cache memory directing and pointer table.
FIG. 25 illustrates the format of a cache directory entry.

During the transfer of data to the cache memory, the MPU updates the cache memory directory shown schematically in FIG. 24 to contain the disk block address and cache memory address for every block of data stored in the internal cache memory 28 or the external cache memory 20 shown in FIG. 1. A cache directory address is shown in FIG. 25. The entry "hit count" is a running count of the times the block of data in cache memory is accessed. For each block entry in the directory, there is also maintained a pointer in a table. Each time a block of data is addressed, the directory is searched to determine whether or not it is stored in cache memory. The pointer arranged in ascending order by block address is used for that purpose to facilitate a search. Once the address of the block called for is found in the pointer table, the pointer to the directory is read out to address the entry in the directory to read out the parameters and increment the hit count. In that manner the caching program maintains a copy of the selected disk sectors in the cache memory for first access by read operations.

The caching program is microcoded in the MPU. The routines and calling sequence are as follows.

| CALL | MEANING |
|---|---|
| BLWP at CPINIT | Initiate cache program |
| BLWP at CPFIX | Fix disk blocks in cache |
| BLWP at CPREAD | Read disk blocks |
| BLWP at CPSØRT | Order the pointer table |
| BLWP at CPHØLE | Make a space in the dynamic cache area for future disk READ |
| BLWP at CPWRITE | Write disk blocks |
| BLWP at CPDFIX | Deallocate fix in cache |
| BLWP at CPDLTE | Deallocate READ from disk in the cache |
| BLWP at CPSBLK | Search cache for disk block number |

| SUBROUTINE WORKSPACE REGISTER DEFINITION |
|---|
| WR4 - HOLE POINTER |
| WR5 - HOLE ADDRESS HIGH |
| WR6 - HOLE ADDRESS LOW |
| WR7 - CACHE TABLE POINTER |
| WR8 - CACHE ADDRESS - HIGH |
| WR9 - CACHE ADDRESS - LOW |
| WR10 - CACHE STATUS |

| STATUS WORD DEFINITION | | |
|---|---|---|
| BIT-00 | '1' | FIXING DISABLED |
| BIT-01 | '1' | INVALID DISK ADDRESS |
| BIT-02 | '1' | CACHE IS FULL |
| BIT-03 | '1' | NO DYNAMIC CACHE EXIST |
| BIT-15 | '1' | ADDRESS FOUND |

| DESCRIPTION OF INPUTS TO ROUTINES | |
|---|---|
| INITIALIZE | Parameters Supplied: Initialization Factor Retention Factor Read Ahead Factor Cache Size Internal and Ext. Cache |
| FIX | Parameters Supplied: Disk block address, number of blocks to be fixed. |
| READ | Parameters Supplied: Disk block address, number of blocks to be read. |
| SØRT | Parameters Supplied: Pointer to the directory, disk block address, number of blocks to be read. Hole pointer. |
| HØLE | Parameters Supplied: None |
| WRITE | Parameters Supplied: Disk block address, number of blocks to be written. |
| DEFIX | Parameters Supplied: Disk block address, number of blocks, no. entries made to the directory. |
| DELETE | Parameters Supplied: Disk block address. Number of blocks to be deleted. Hole pointer. |
| CPSRBK | Parameters Supplied: Disk drive number. |

| DESCRIPTION OF OUTPUT | |
|---|---|
| INITIALIZE | No output |
| FIX | Parameters Returned: Cache memory address. |
| SØRT | Cache memory address of the next available space in dynamic cache, hole pointer. |
| HOLE | Cache memory address of the next available space in dynamic cache, hole pointer. |
| READ | Parameters Returned: Address match detected status, corresponding cache address. Cache address for reading data from disk |
| DEFIX | Parameters Returned: None |
| WRITE | Parameters Returned: Address match detected status, corresponding cache address, number of blocks to be written. |
| DELETE | Parameters Returned: None |
| CPSRBK | Parameter Returned: Disk block numbers. |
| FILES USED | None |

| STATUS AND RESTRICTIONS | |
|---|---|
| INITIALIZE | Status Returned: None |
| FIX | Status Returned: Fixing Disable Cache is full, match found |
| READ | Status Returned: Dynamic cache does not exist, match found |
| SORT | Status Returned: None |
| HOLE | Status Returned: None |
| WRITE | Status Returned: Match found |
| DEFIX | Status Returned: Match found |
| DELETE | Status Returned: Match found |
| CPSRBK | Status Returned Disk block number found. |

| DESCRIPTION OF PROCESSING |
|---|
| Once the caching program is loaded into the RAM 28, the CDP calls the caching program to initialize the cache directory pointer table and other related flags. Once initialized, the caching program accepts calls to fix disk sectors in the cache. Fixing is disabled when the first read is received. |

INITIALIZE (See FIG. 26)
a. Initialize thirty memory locations beginning symbol TFIXB.
b. Compute actual total cache memory available for fixing cache.
c. Initialize directory pointer table.
d. Initialize directory size of the pointer table -continued and directory as determined in step c.
e. Workspace registers used for input/output between caching program and handler.
f. Entry point to the cache directory is stored in (NAHP).

Figure 27:
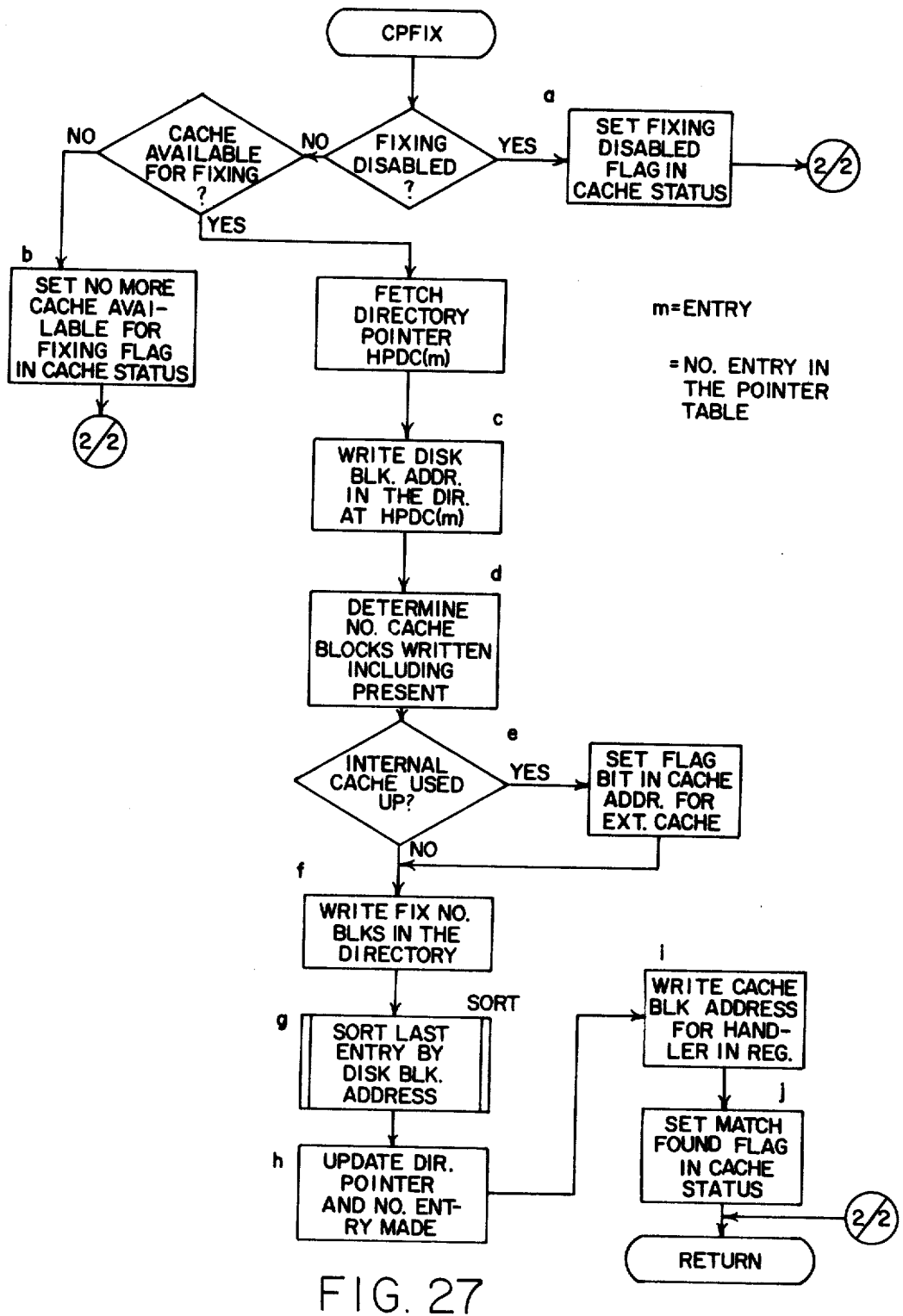

FIX (see FIG. 27)
a. If fixing is disabled, set fixing disabled flag in the cache status and return.
b. If all cache memory is used up then set cache memory full and fixing disabled flags in the cache status. Return.
c. Write disk block address in to the directory both upper and lower boundaries.
d. Update number cache blocks fixed.
e. Determine whether the disk blocks will be written in internal or external cache memory and set appropriate flag.
f. Write cache block number in the directory.
g. Order pointer table by disk block address.
h. Update hole pointer and number entries made.
i. Write cache block address in the register for handler.
j. Set match found flag in cache status and return.

Figure 28:
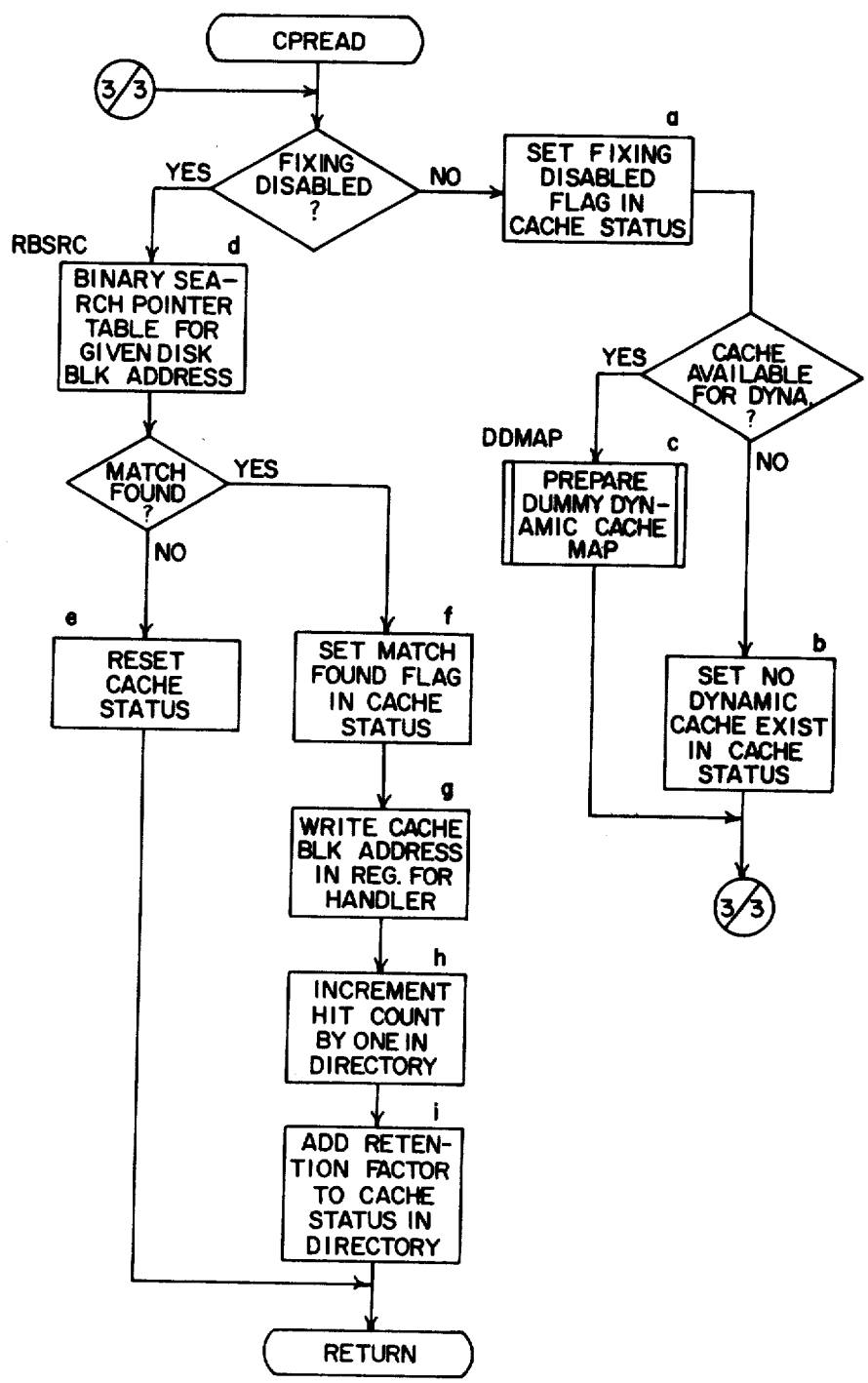

READ (See FIG. 28)
a. If fixing is not disabled, set fixing disabled flag.
b. If cache memory is completely used up for fixing, fix diskblocks, set no dynamic cache memory exist, and do binary search to find given disk block address in the directory.
c. If cache memory is available for dynamic cache mapping prepare dummy dynamic cache map using read ahead factor and default initialization factor of one. Do binary search to find given disk block address in the directory.
d. Binary search for the disk block address through the pointer table. If match found store the pointer and entry no. of table.
e. If match not found reset cache status and return.
f. If match found set flag in the cache status.
g. Write corresponding cache block address in the registers for handler.
h. Increment hit count in the directory by one.
i. Add retention factor to the cache status in the directory for additive accounting. Return.

Figure 29:
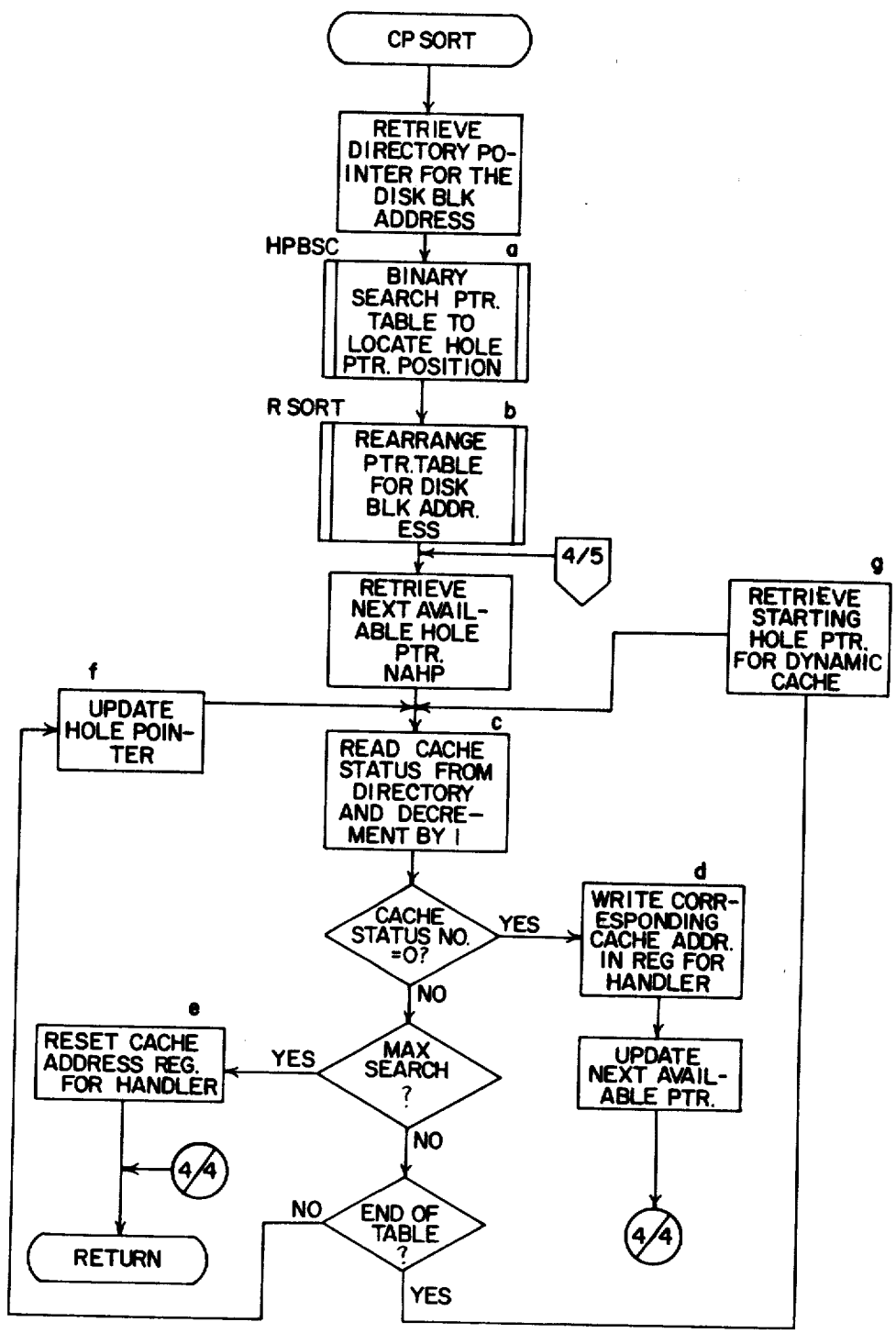

SORT (see FIG. 29)
a. Binary search pointer table for hole pointer and determine location in the table.
b. Rearrange pointer table between location for the disk block address during read and location for the hole pointer.
c. Fetch cache status from the directory corresponding to next available hole pointer and decrement by one.
d. If cache status is zero, hole found, write corresponding cache address into registers for the handler to be used in future. Update next available pointer and return.
e. If cache status is not zero and maximum search made, reset cache address registers indicating the handler no hole found. Return.
f. If maximum search is not made through directory and the pointer is not at the end of directory map, then update pointer and repeat steps c through f.
g. If the pointer to the directory reached end of the directory then begin search for the hole by using starting hole for the dynamic cache. Repeat steps c through g.

HOLE (See FIG. 30)
a. Fetch next available hole pointer to the directory and follow steps c through g of SORT routine.

Figure 31:
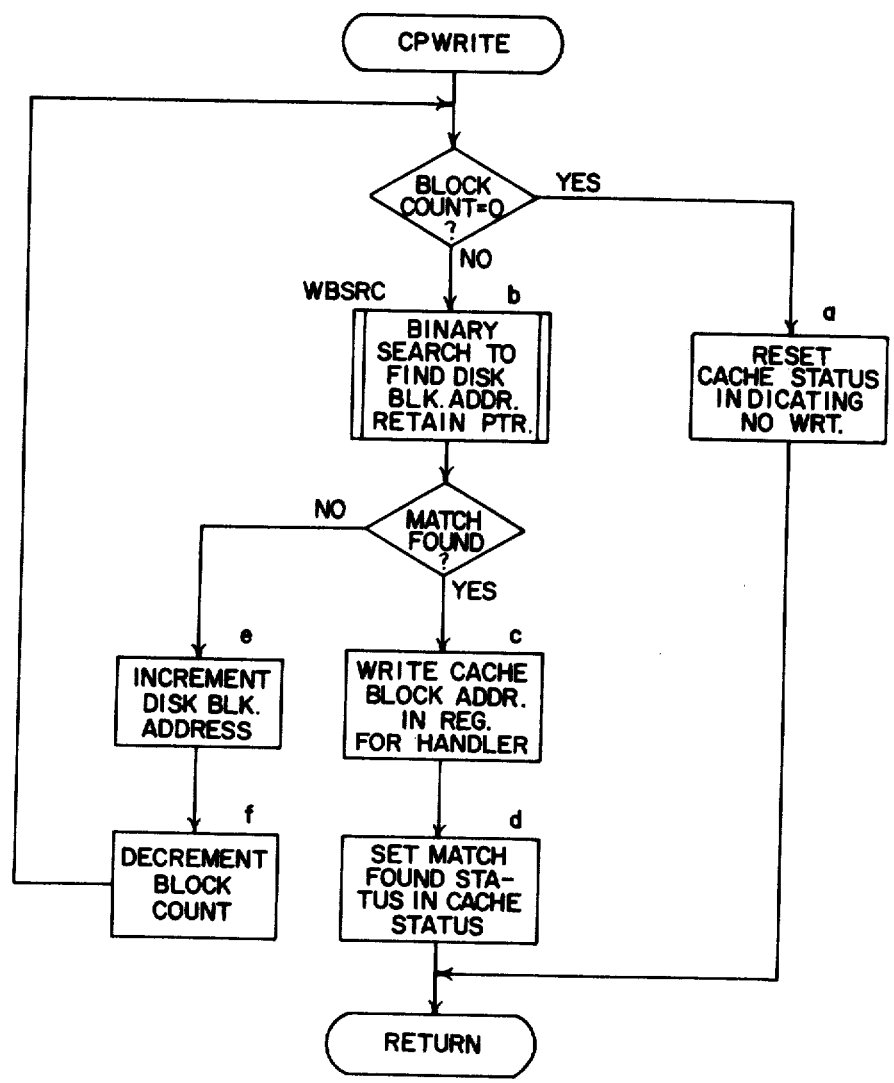
Figure 32:
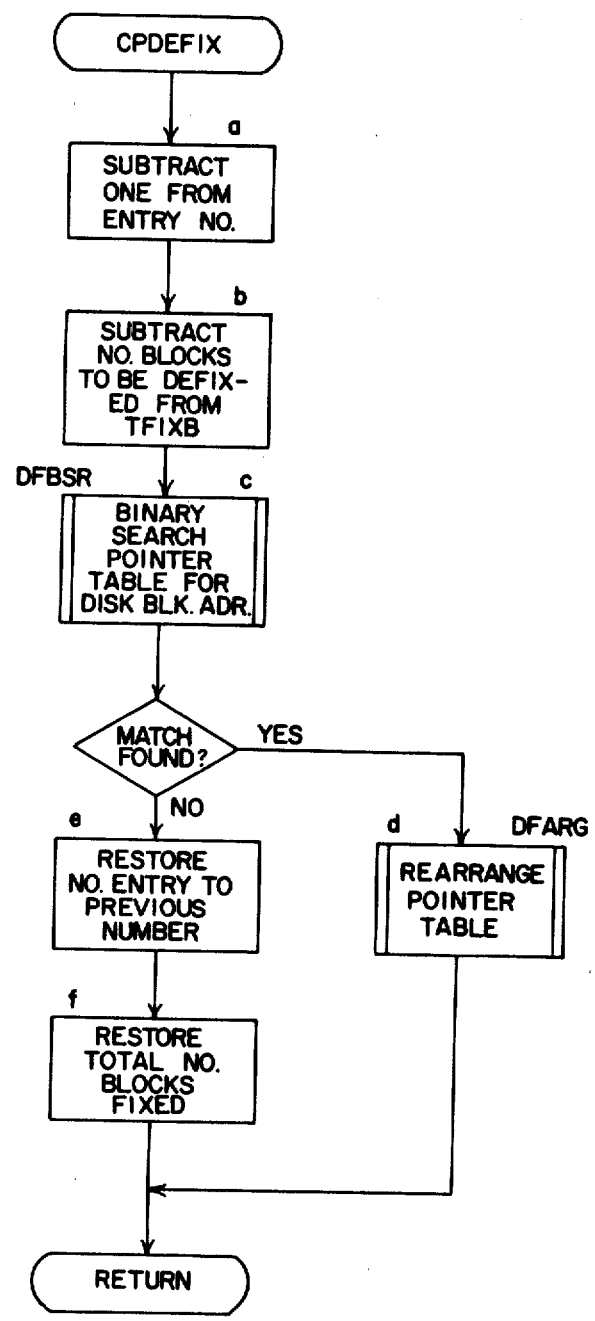
Figure 33:
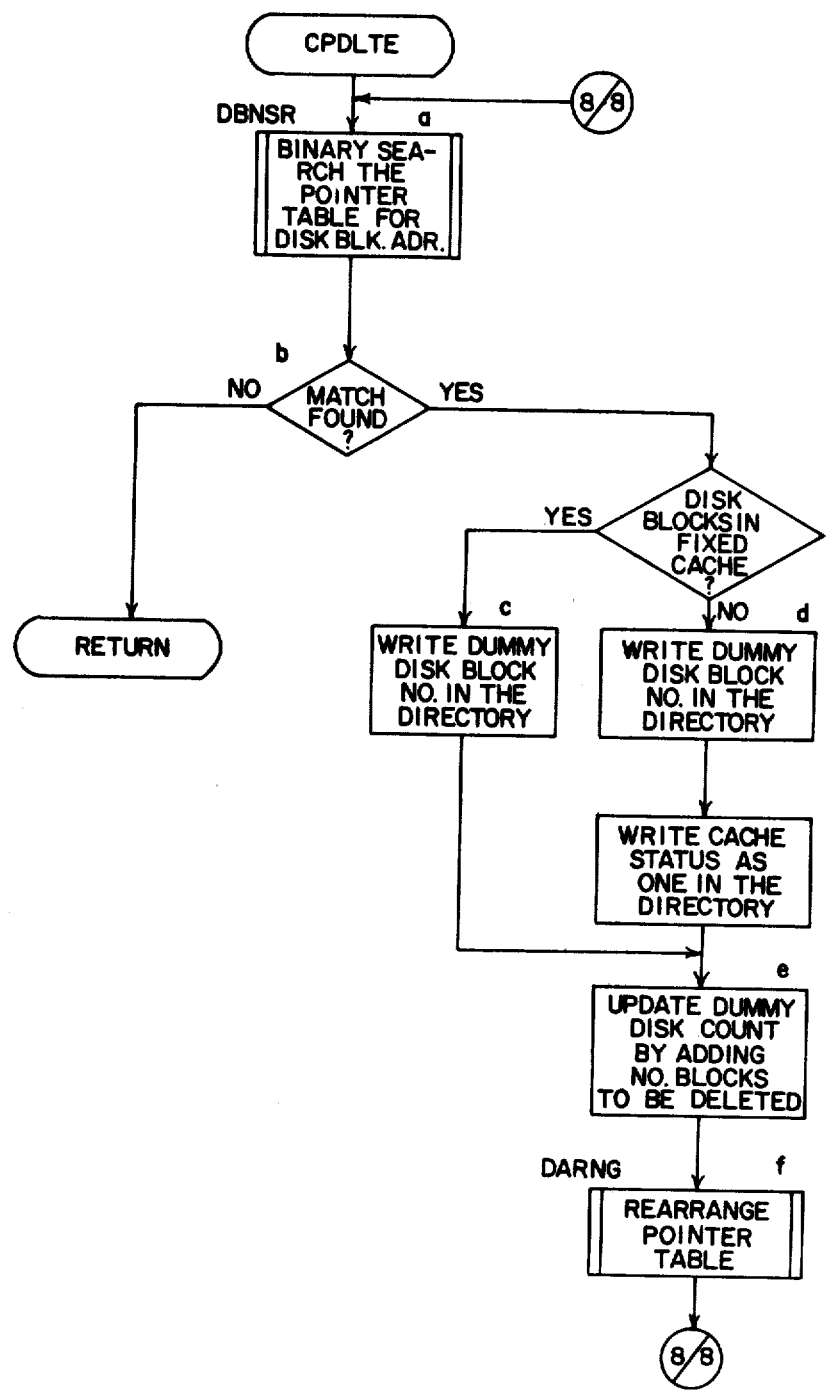

WRITE (See FIG. 31)
a. If block count is zero, reset cache status indicating handler no more blocks in the cache to be written.
b. If block count is non zero binary search the pointer table. If match found and the pointer is not to end of the table then retain that pointer for next binary search.
c. If match found write cache block address for the handler.
d. Set match found flag in to cache status indicating handler a block to write.
e. If match not found increment disk block address.

-continued f. Decrement block count by one.

Figure 34:
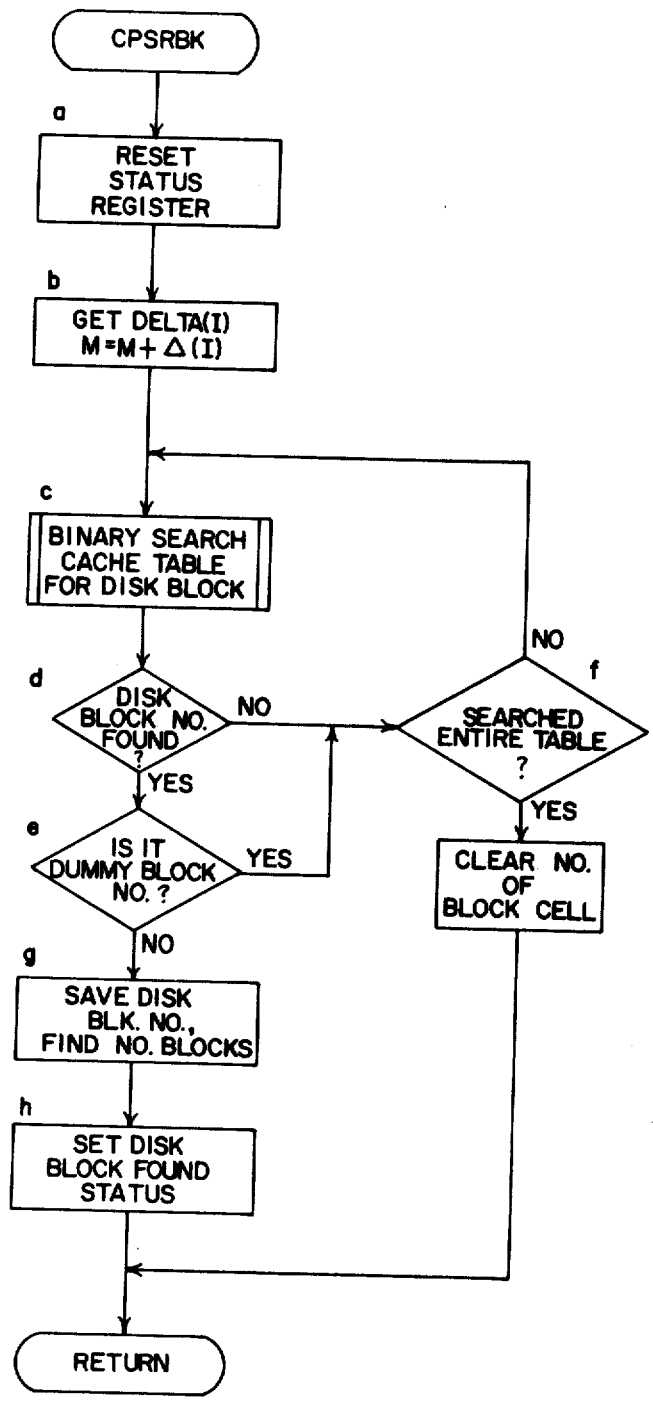
Figure 35A:
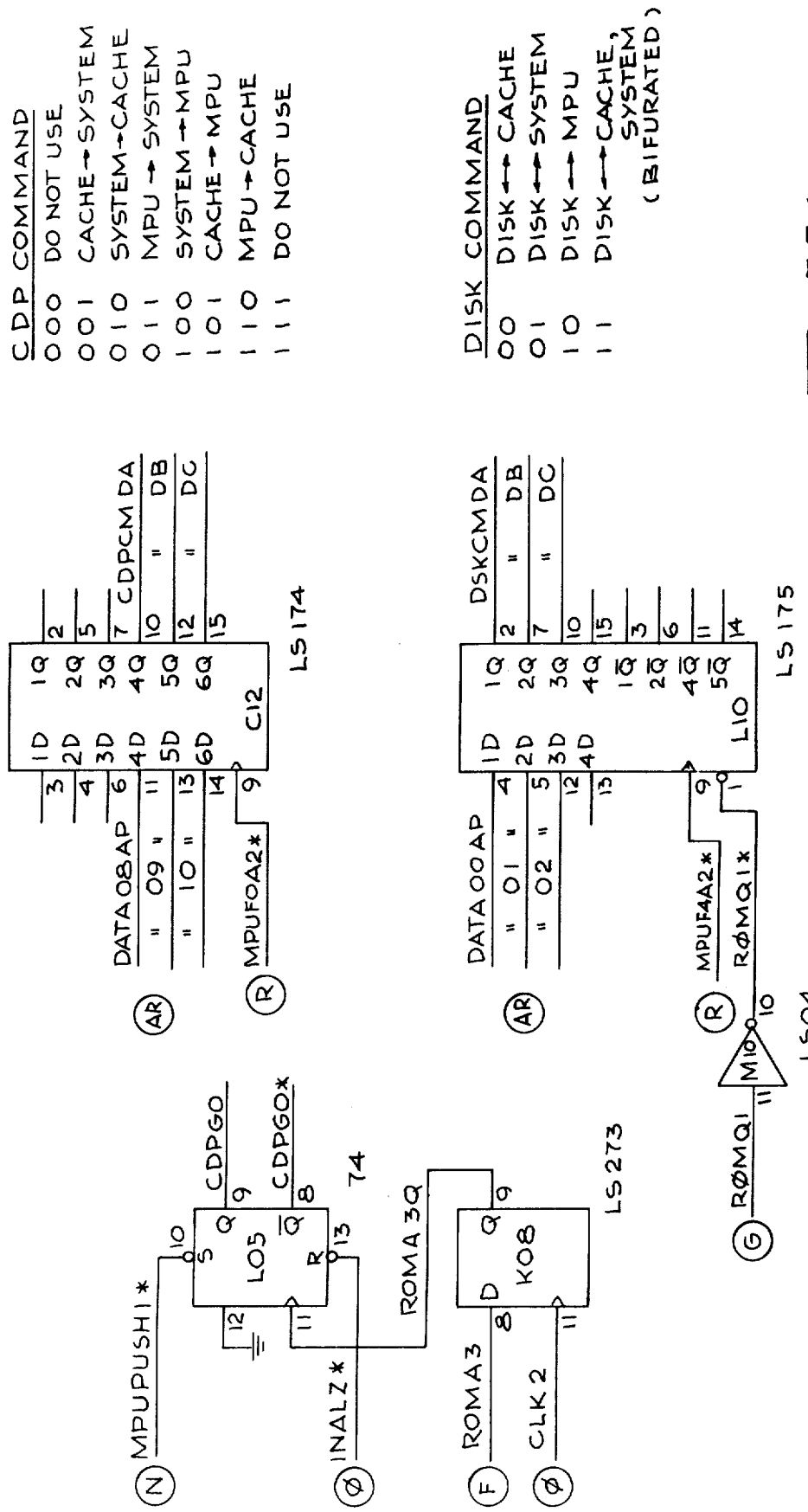
Figure 35A:
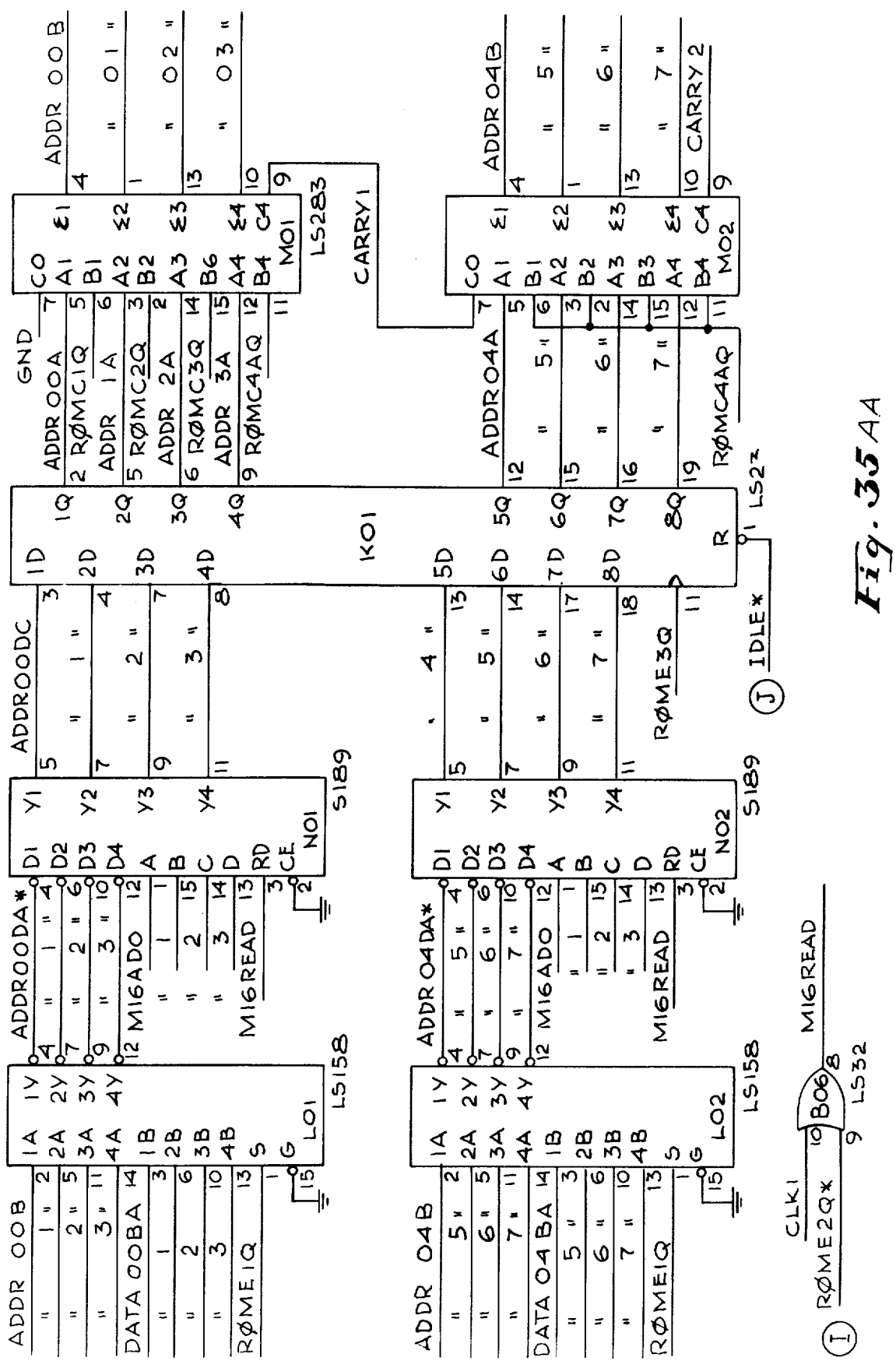
Figure 35A:
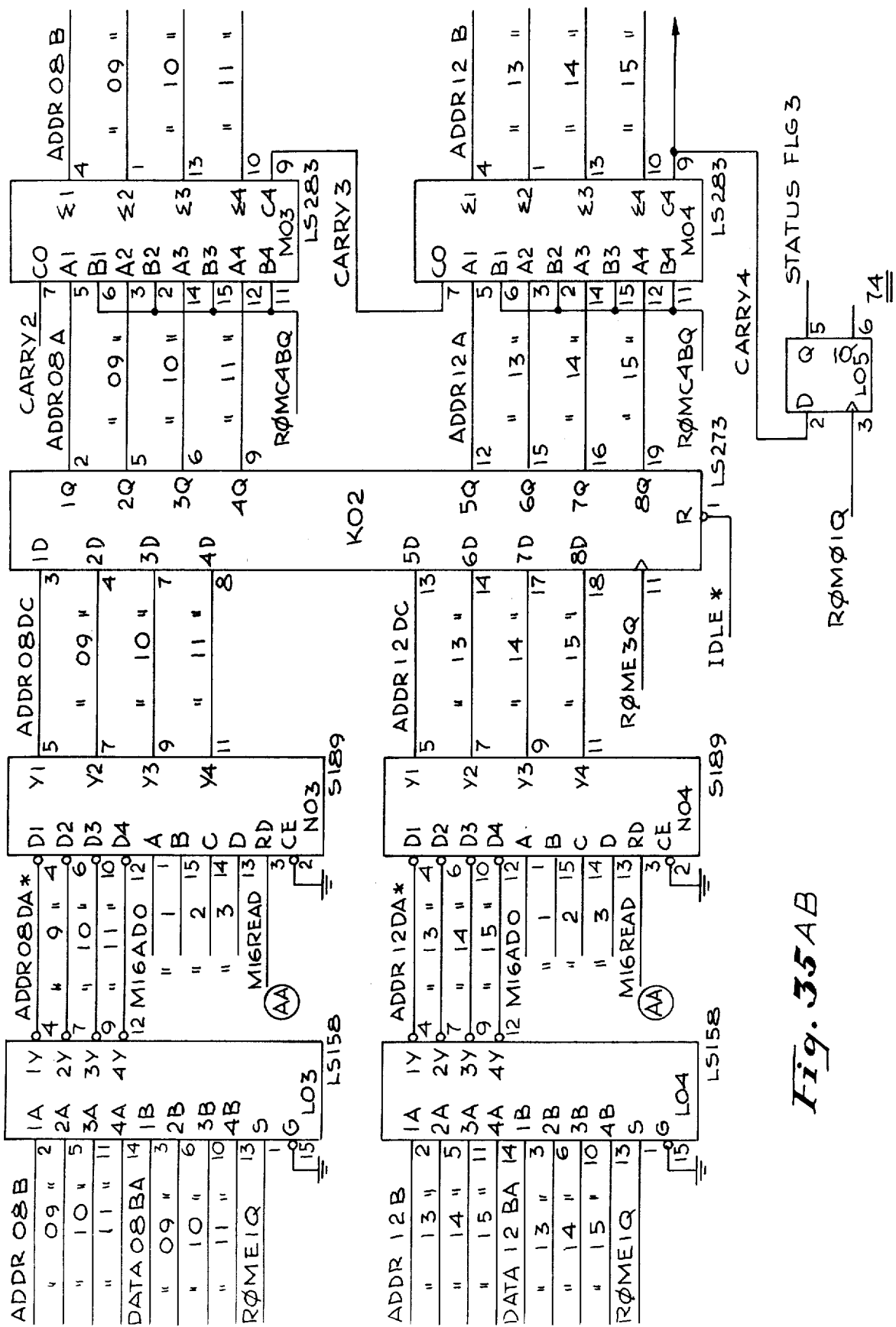
Figure 35A:
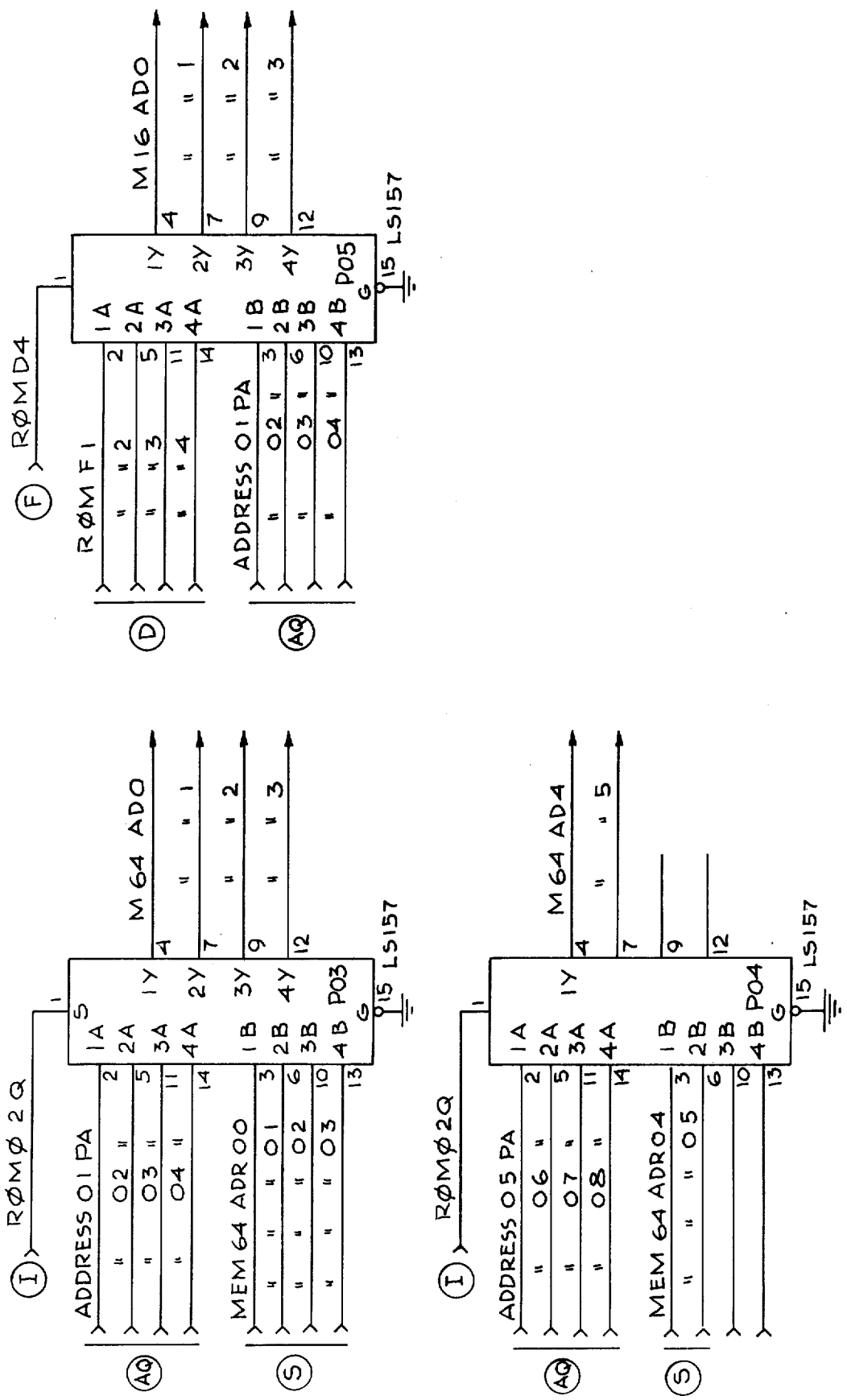
Figure 35:
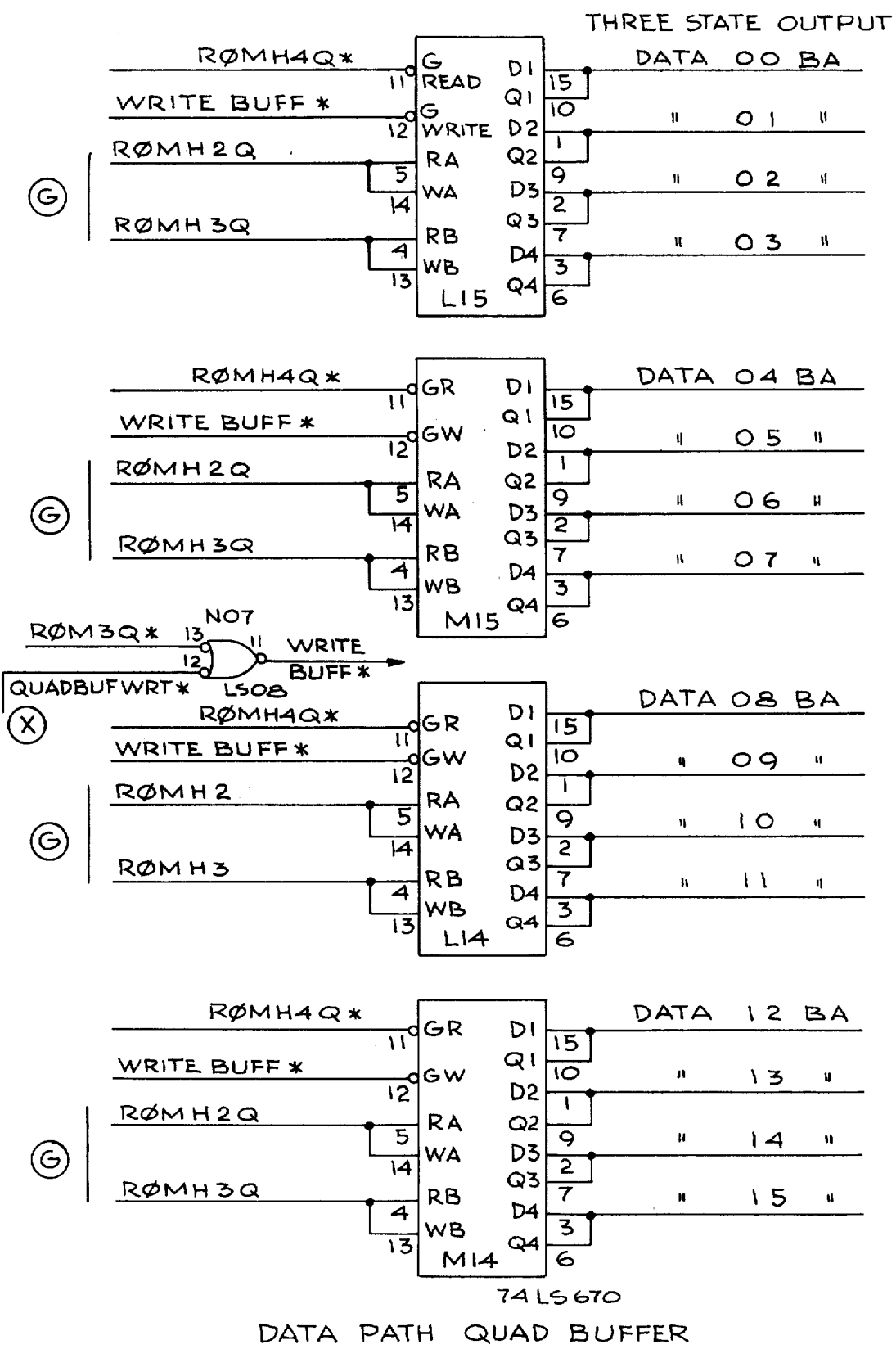
Figure 35:
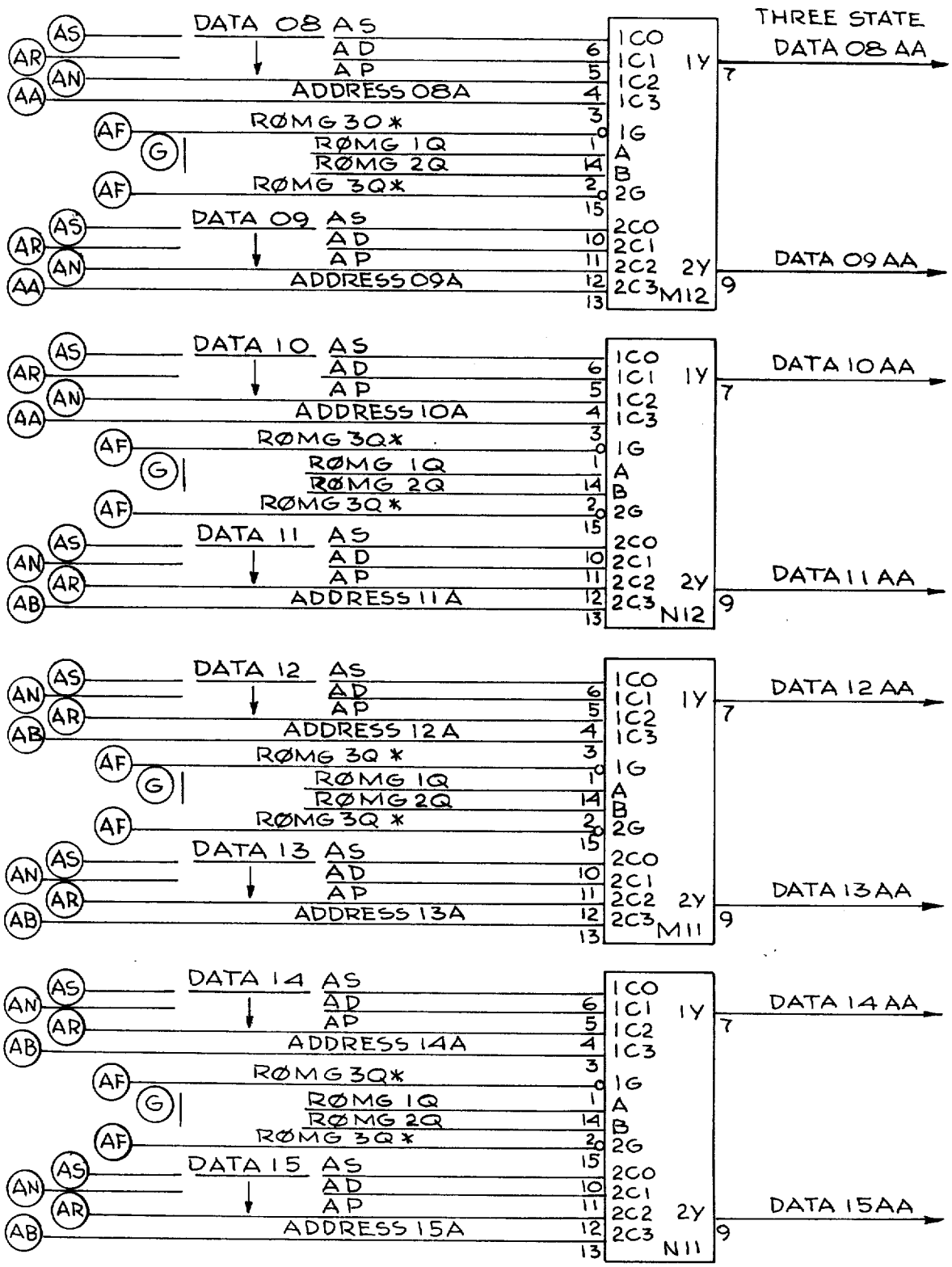
Figure 35:
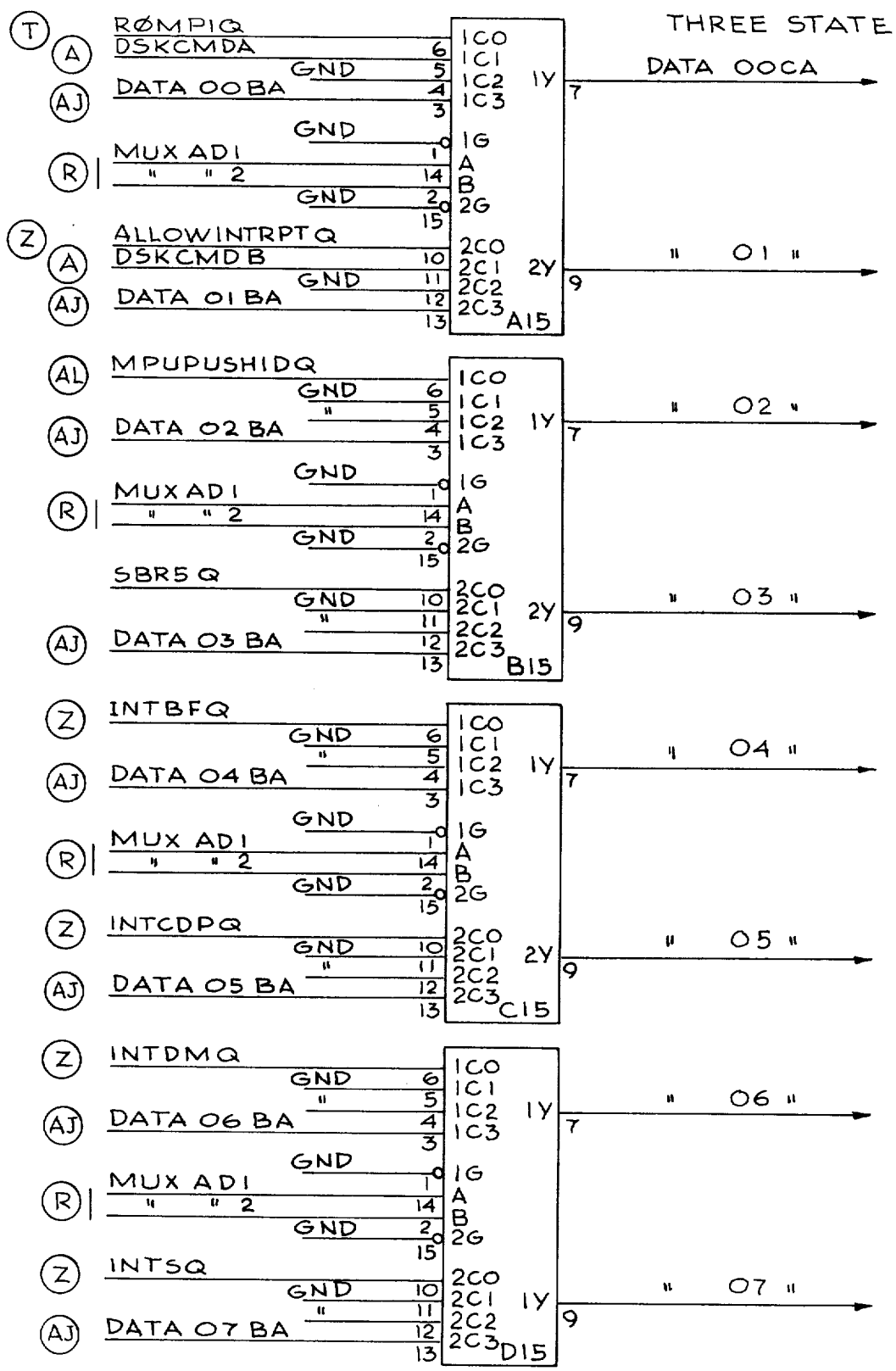
Figure 35:
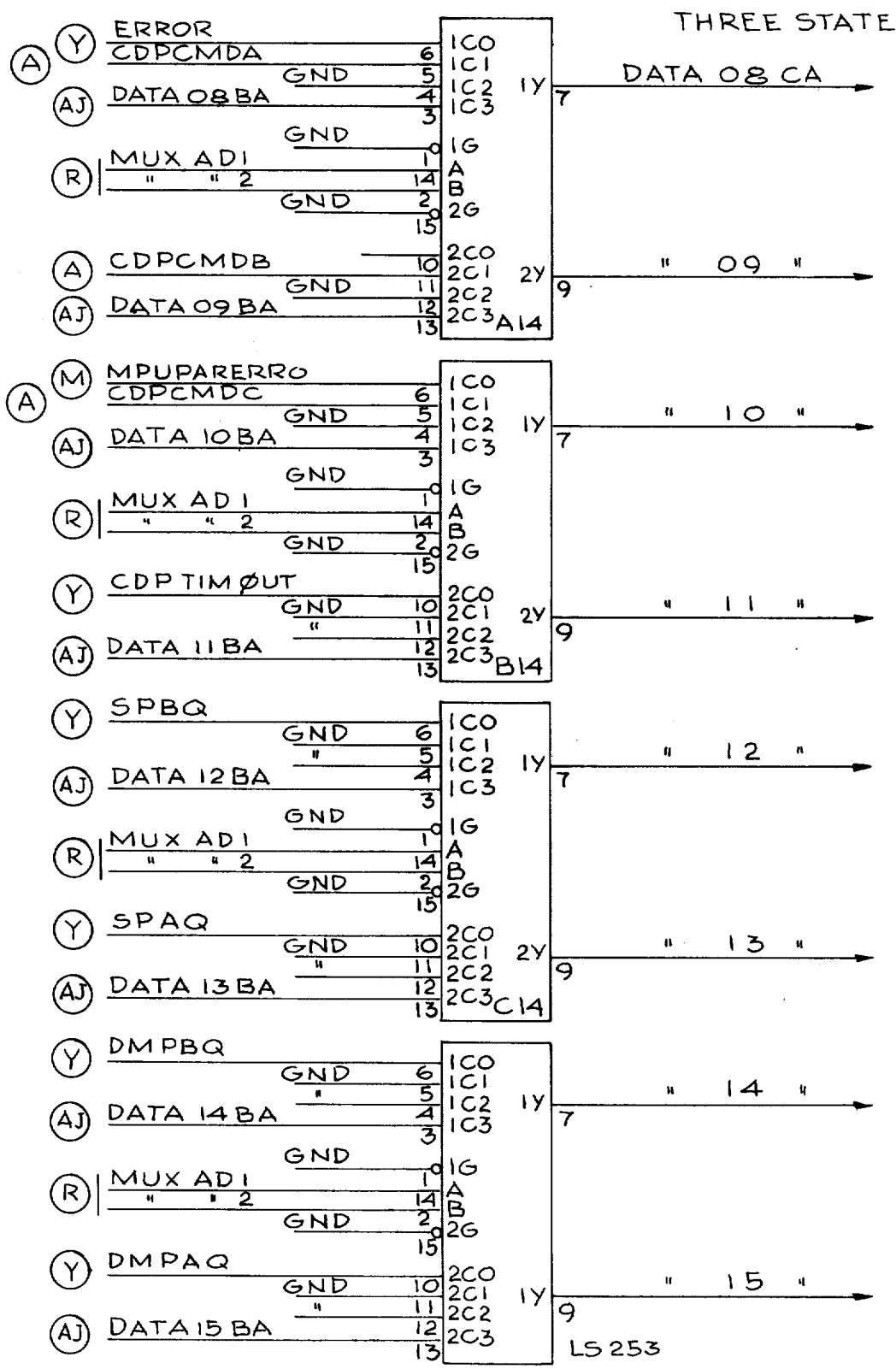
Figure 35A:
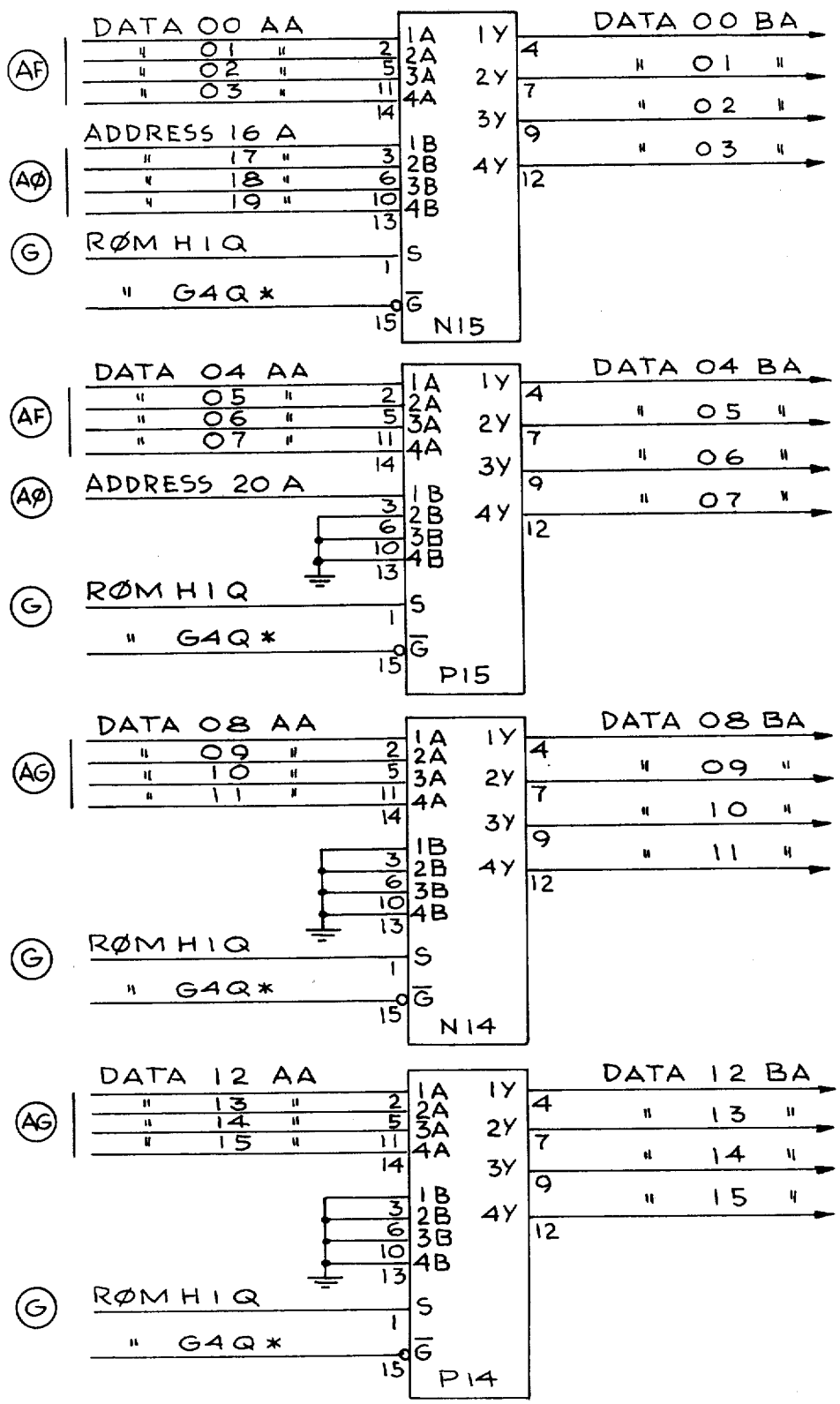
Figure 35:
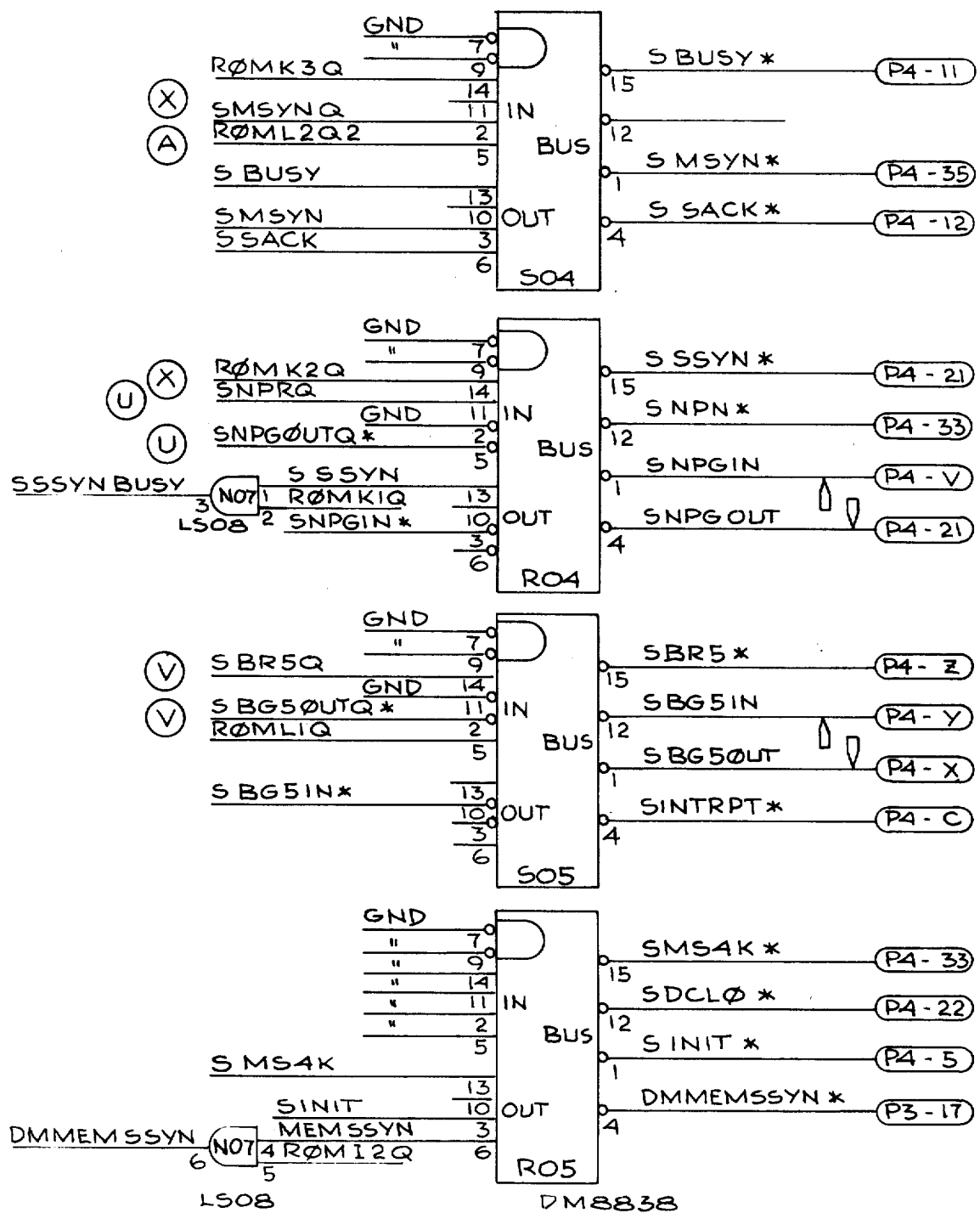
Figure 35:
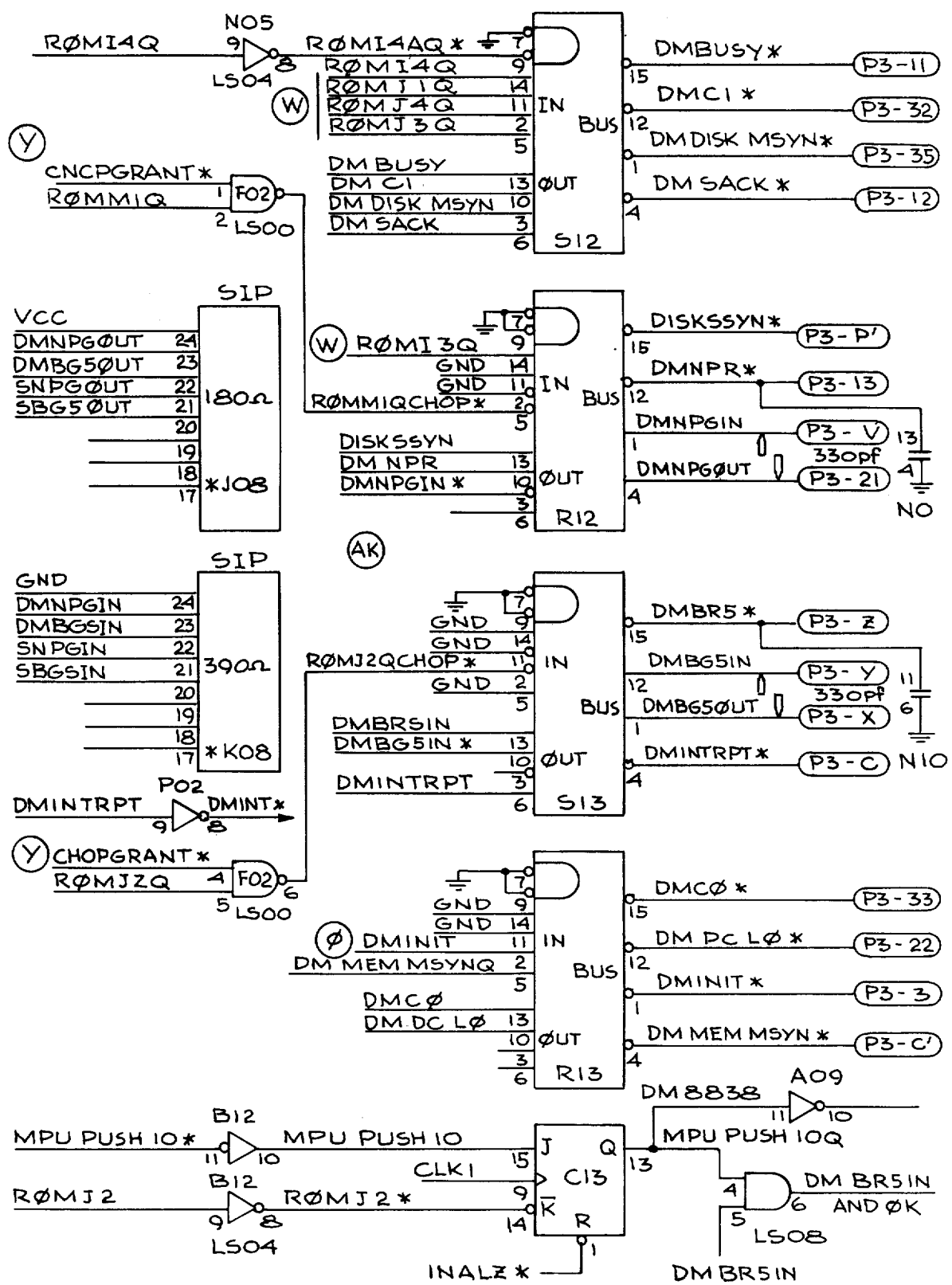
Figure 35:
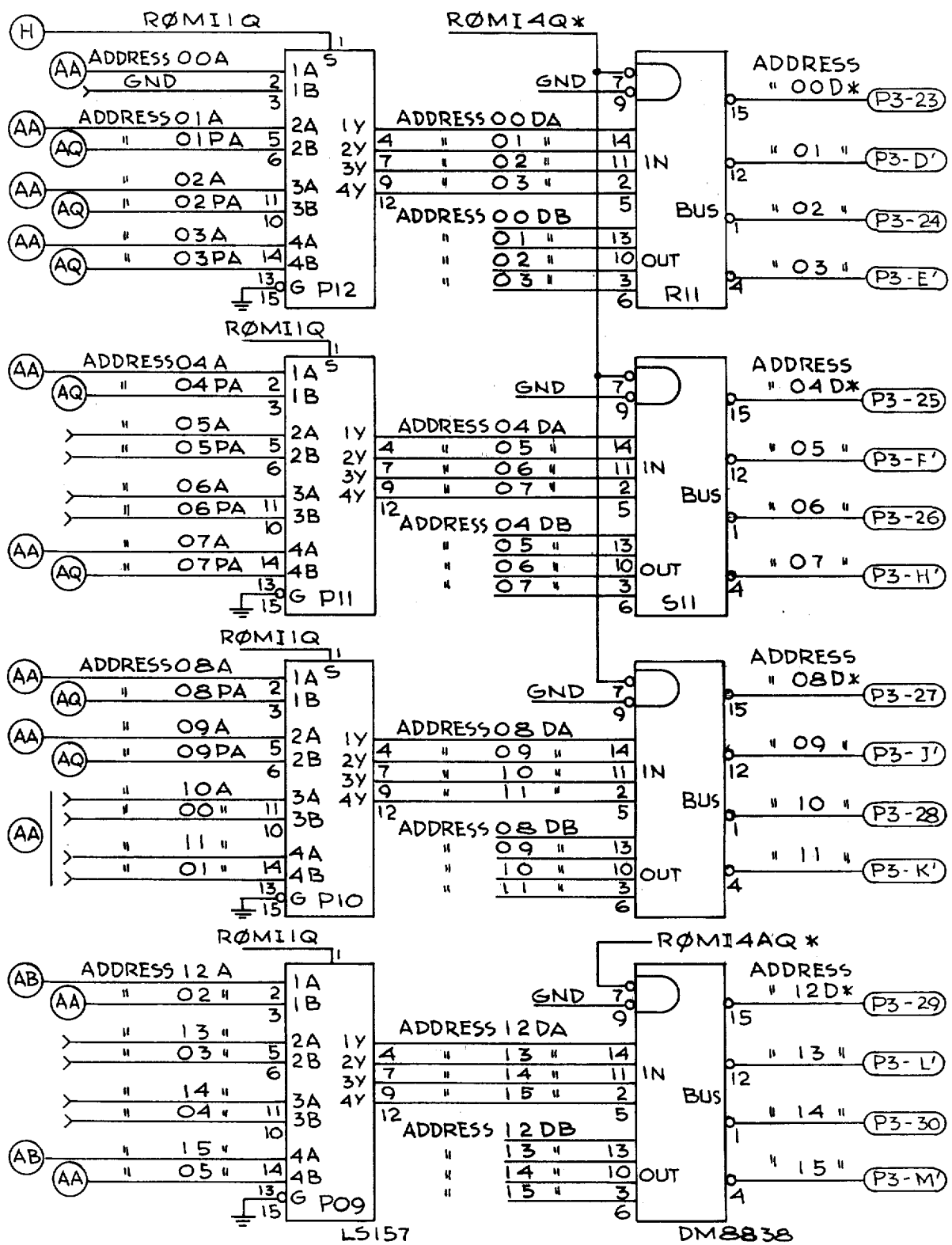
Figure 35A:
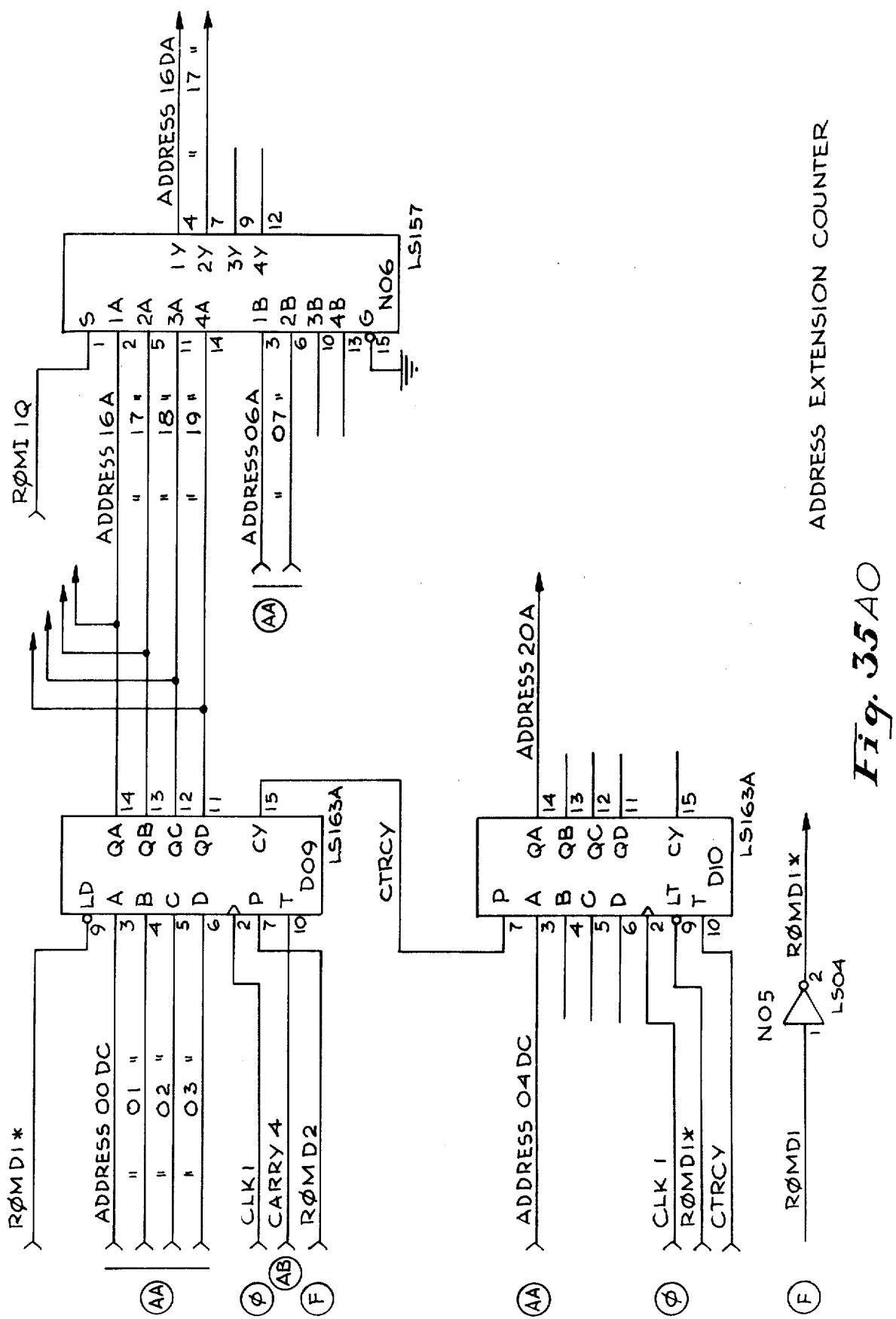
Figure 35A:
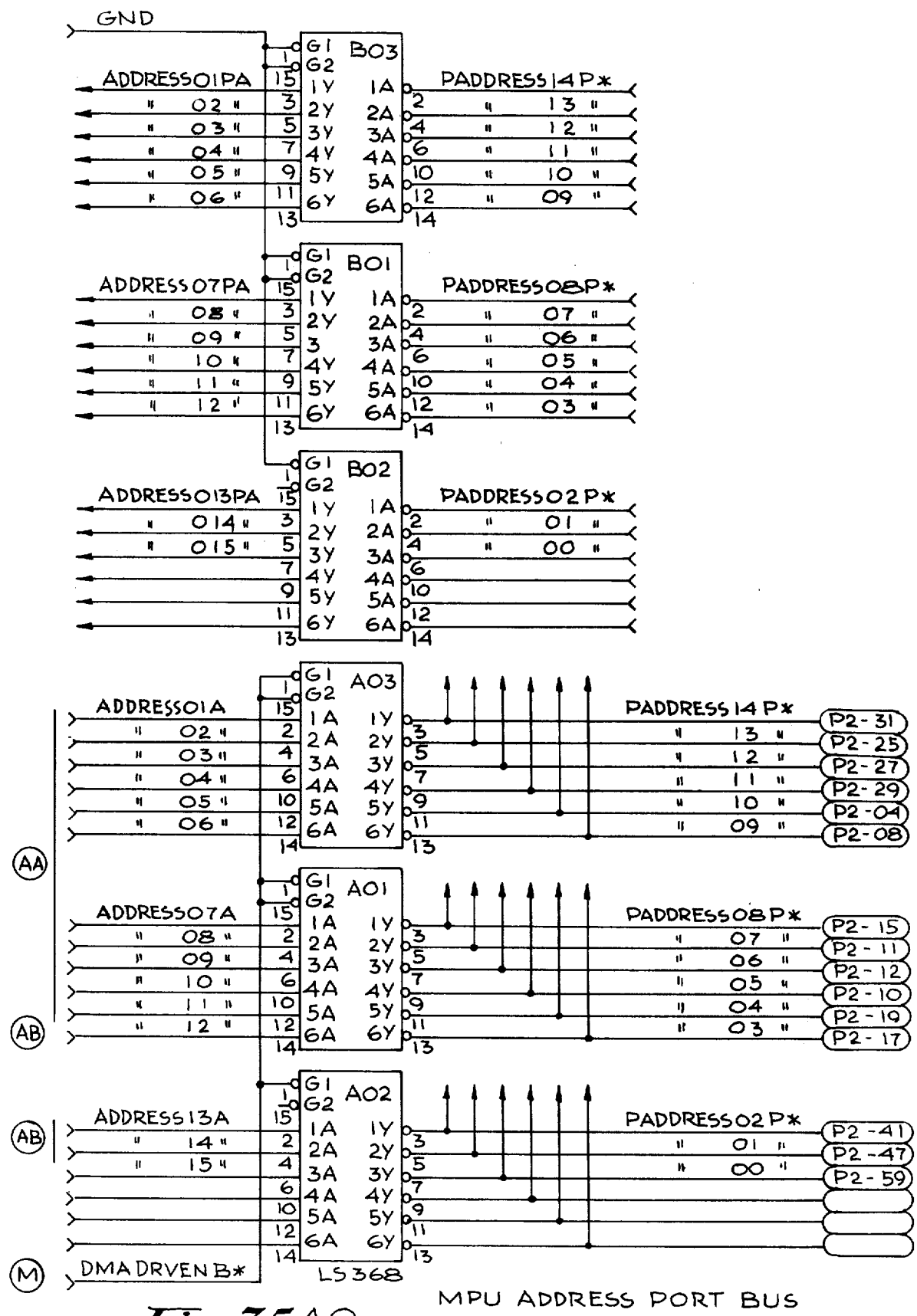
Figure 35A:
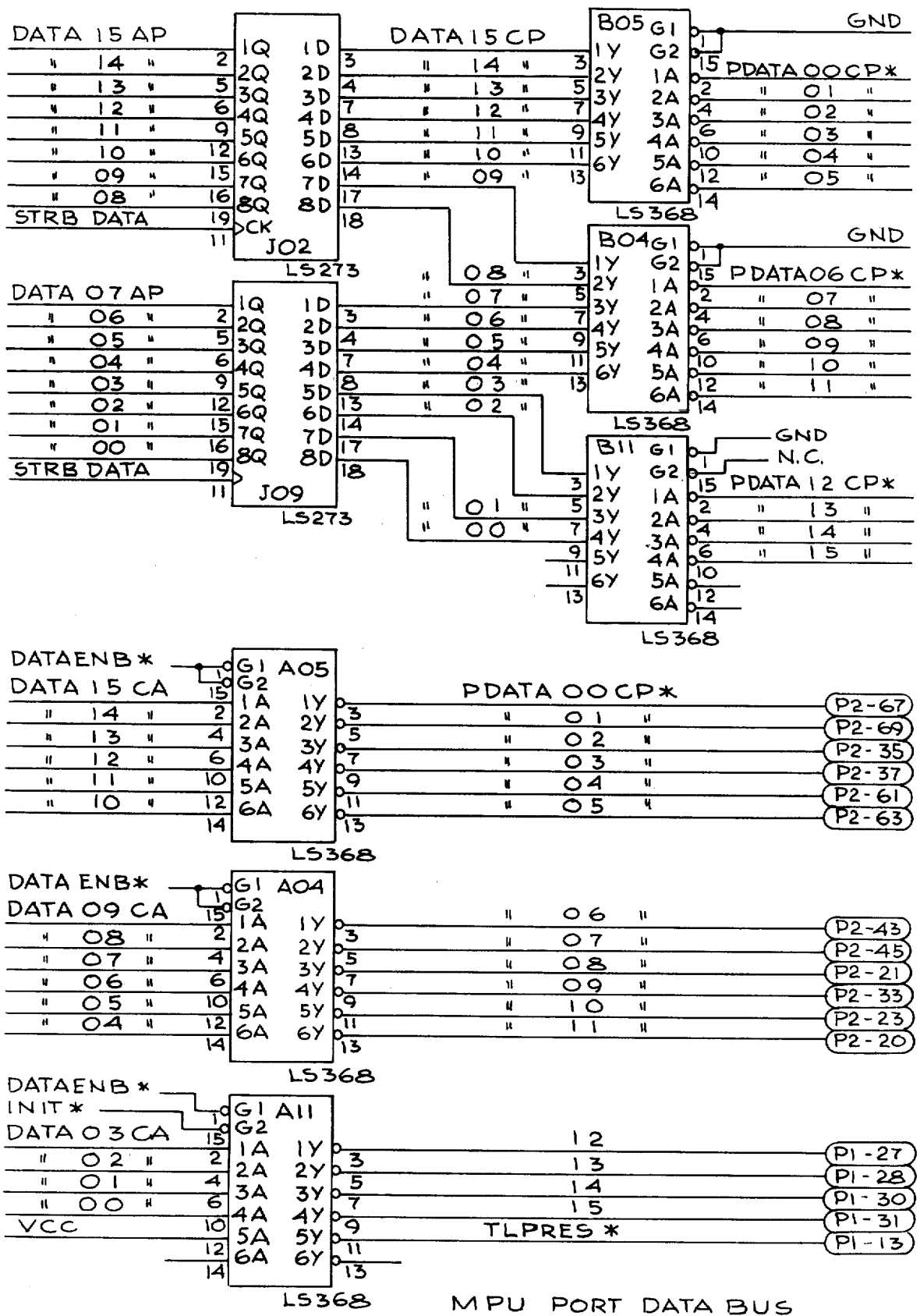
Figure 35:
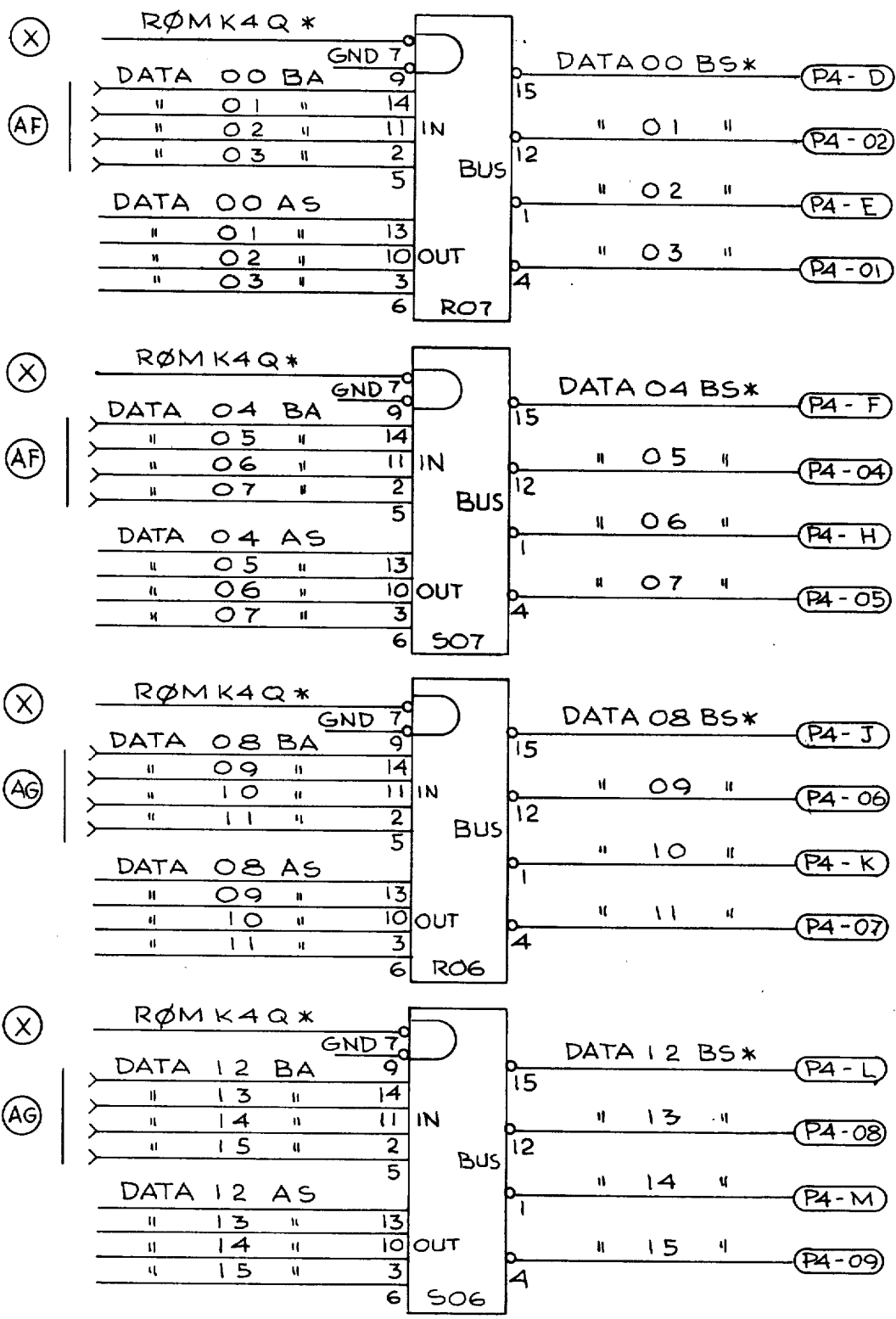
Figure 35:
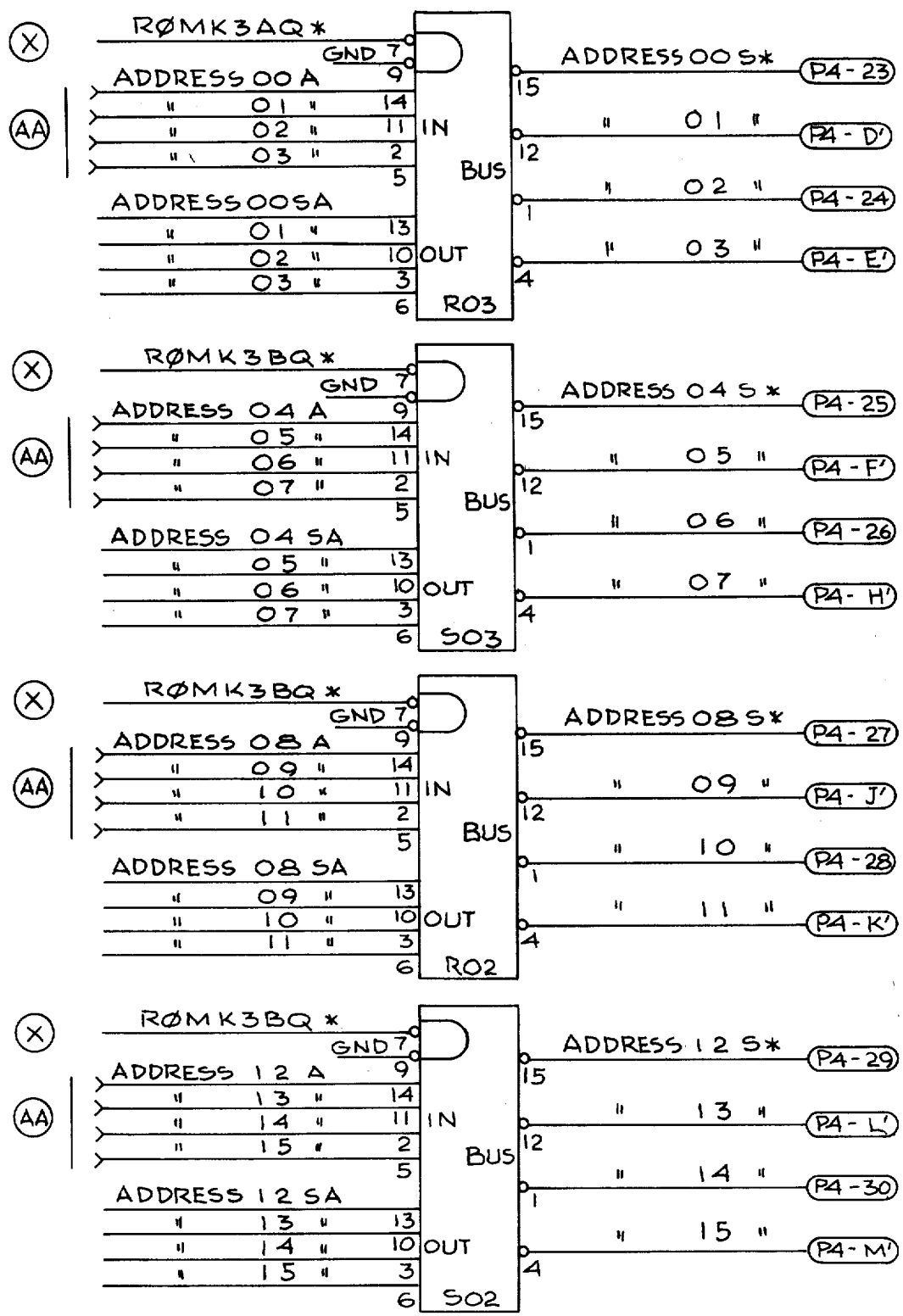
Figure 35B:
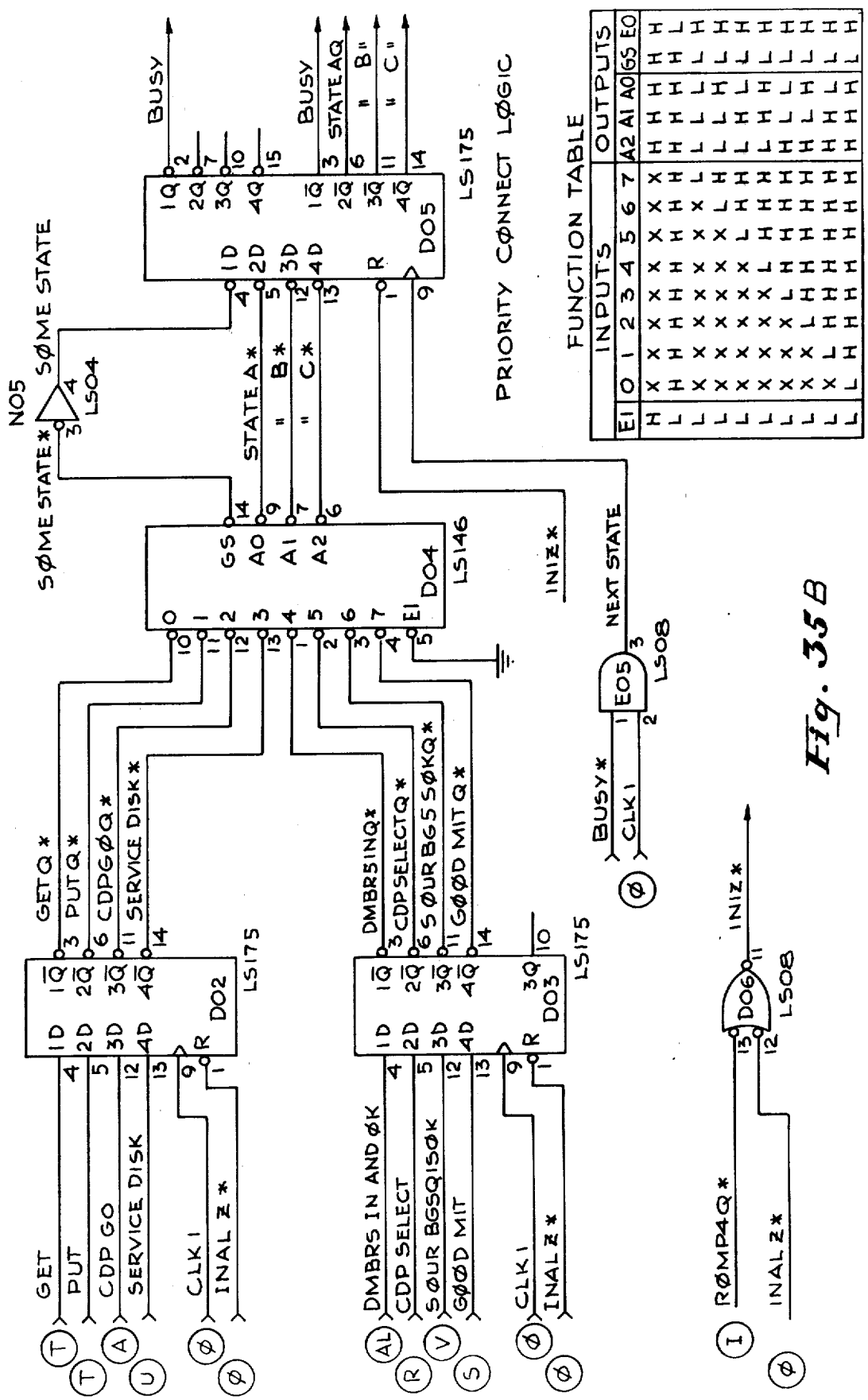
Figure 35C:
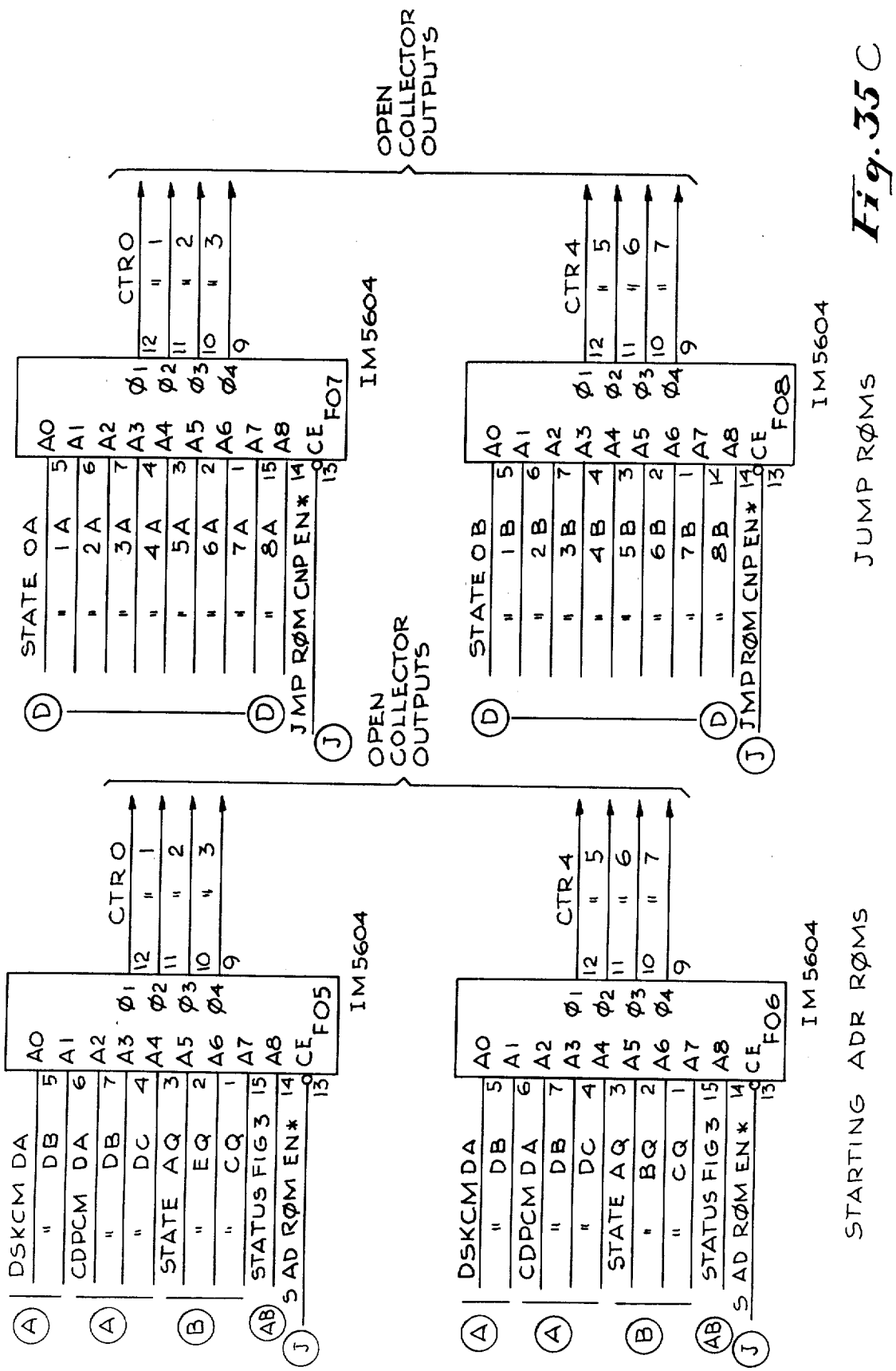
Figure 35E:
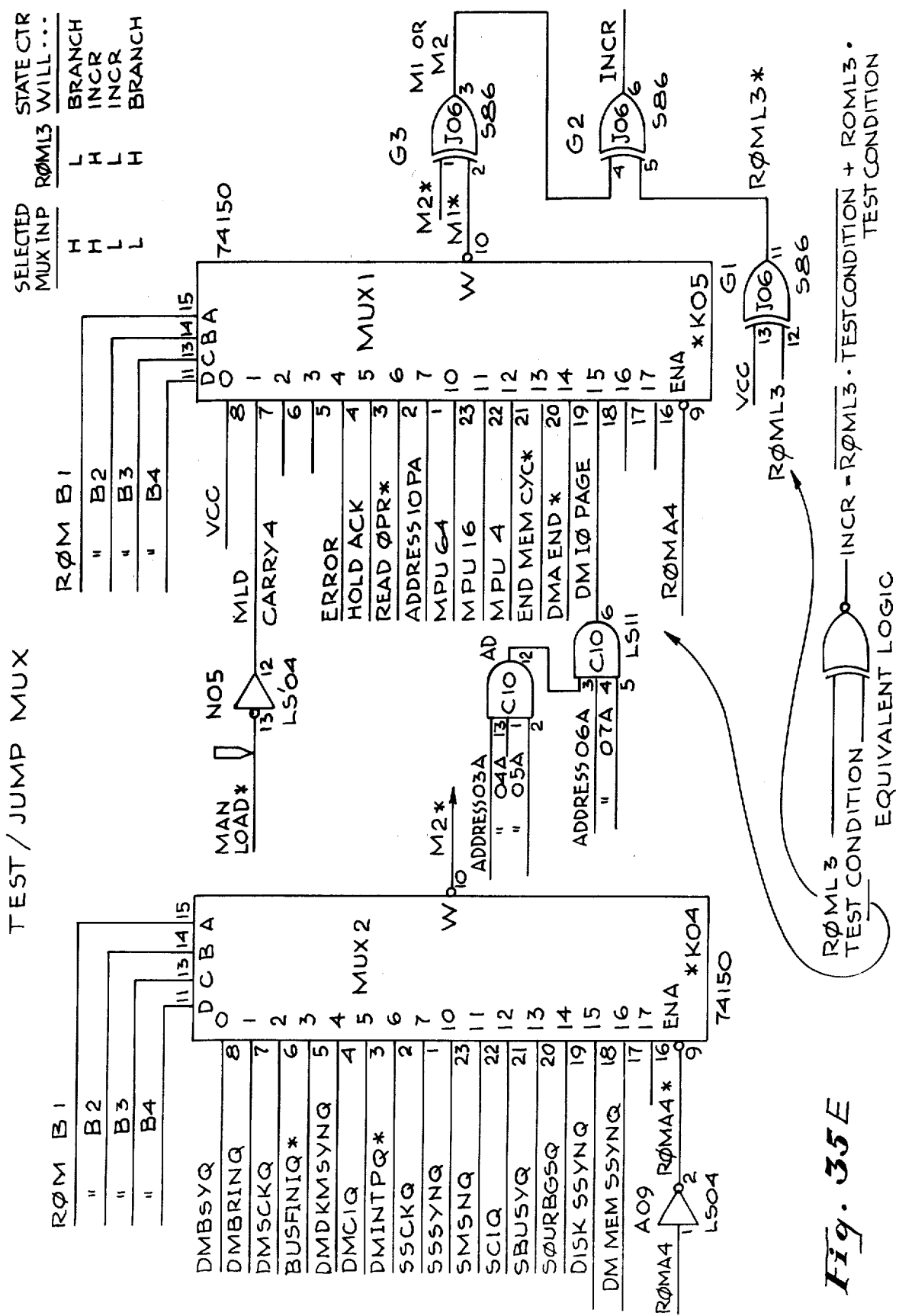
Figure 351:
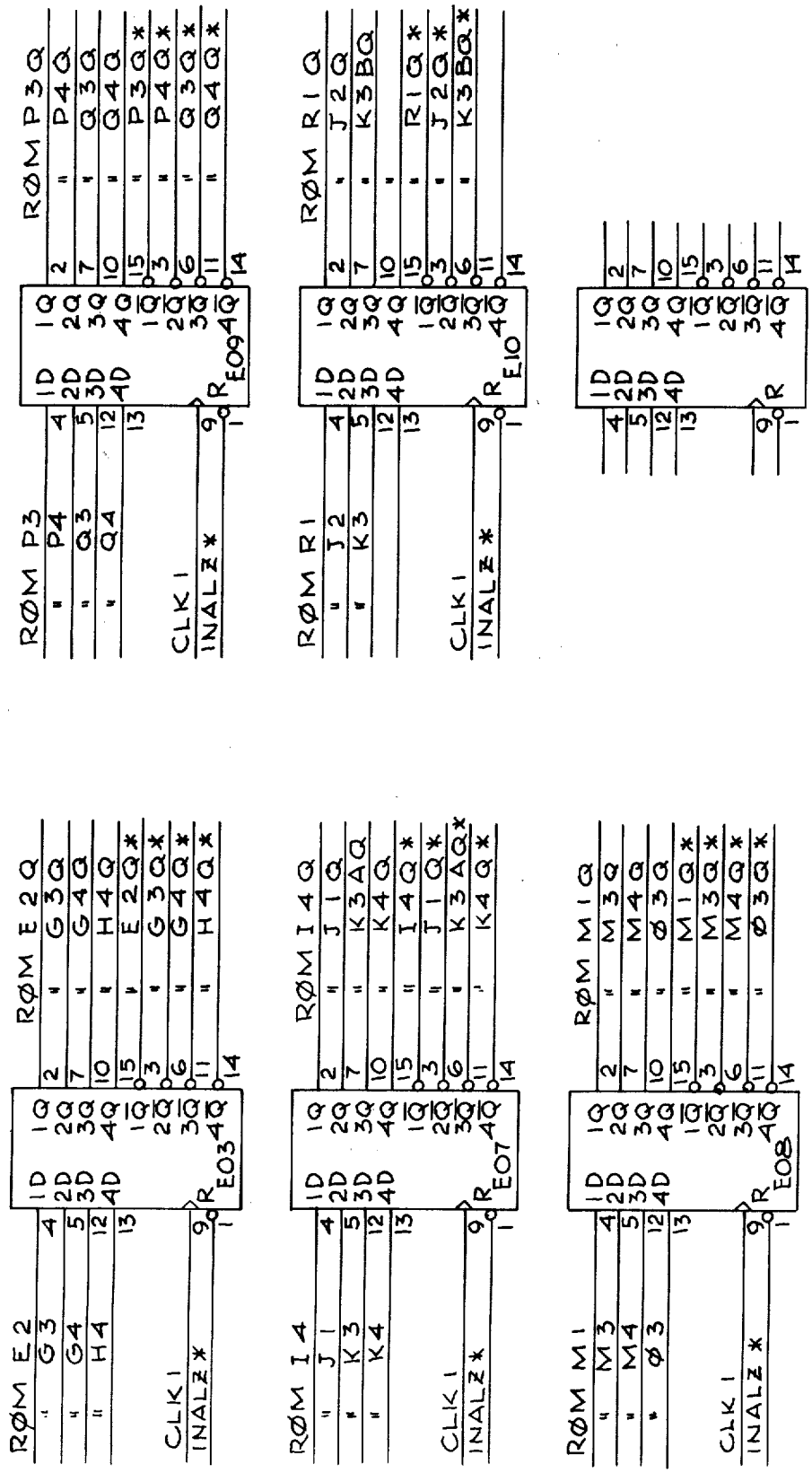
Figure 35J:
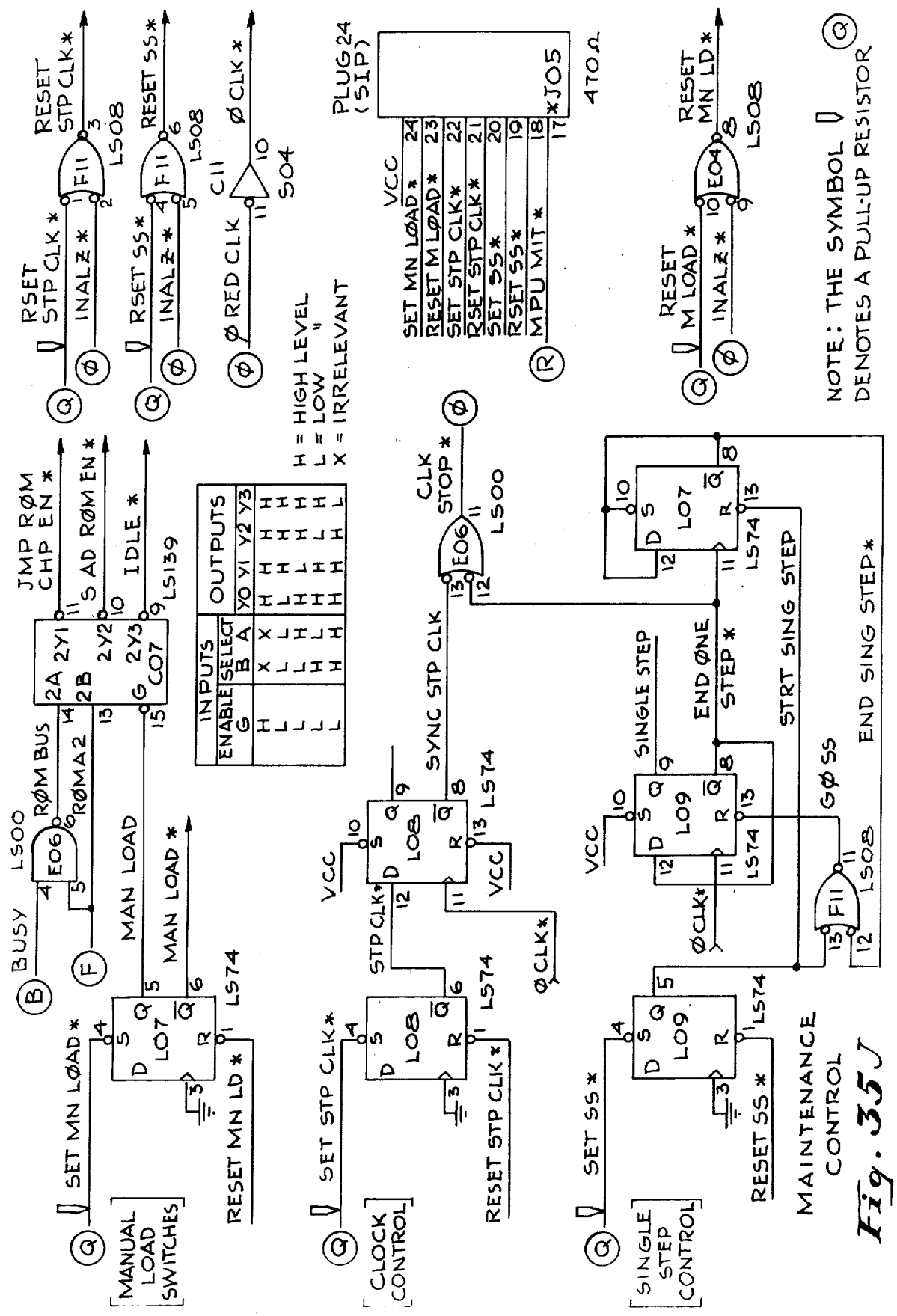
Figure 35M:
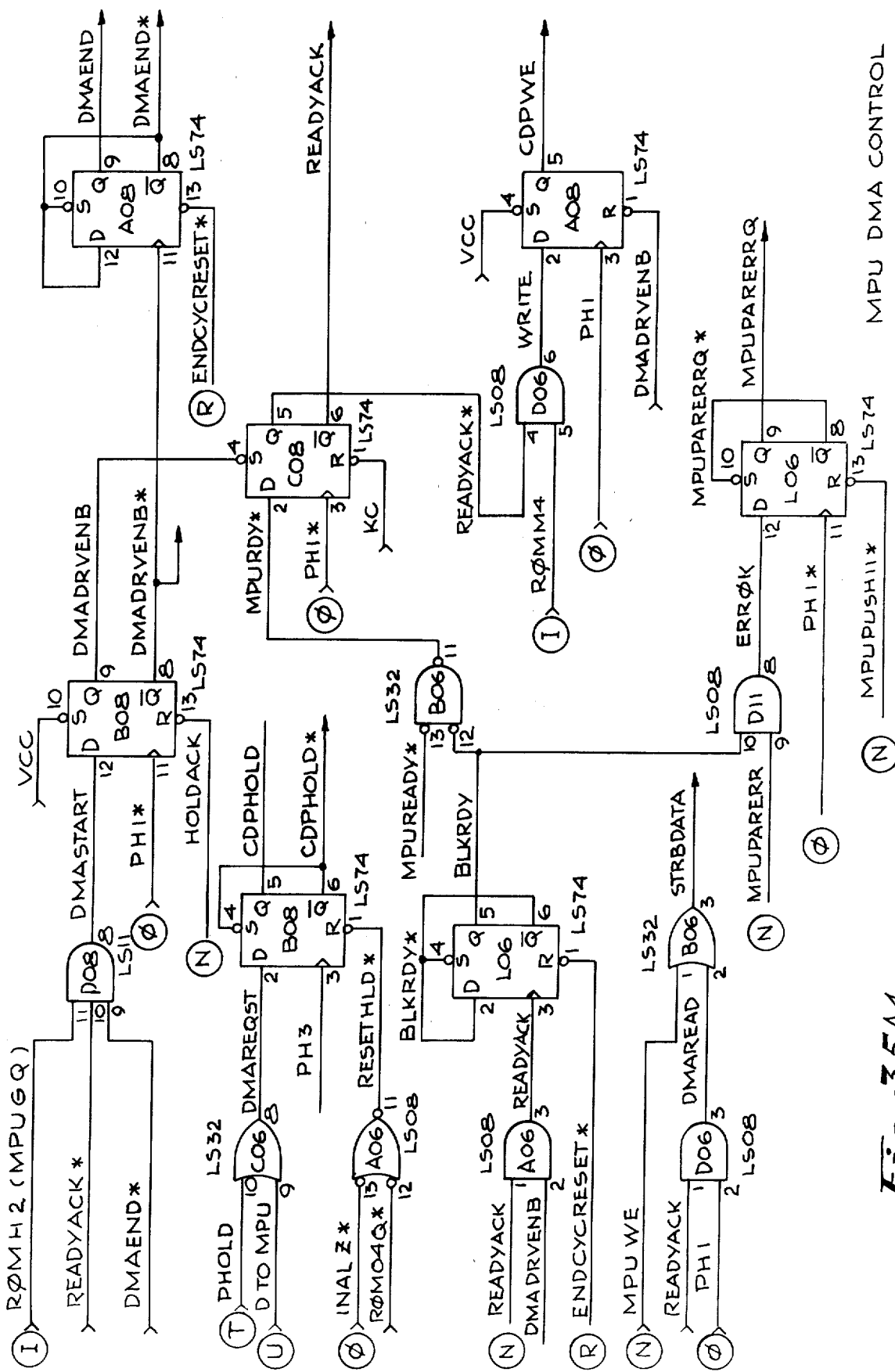
Figure 35:
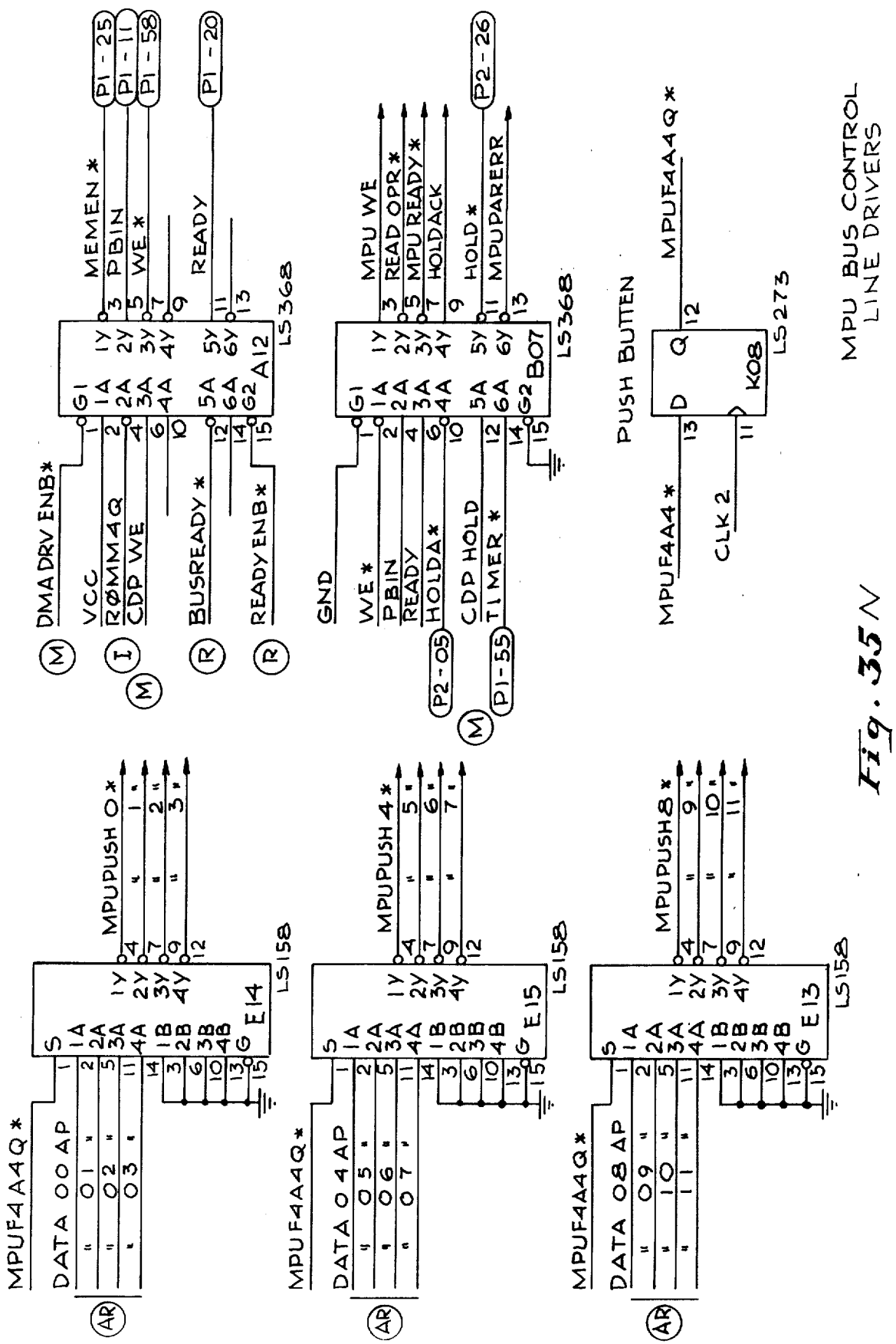
Figure 35:
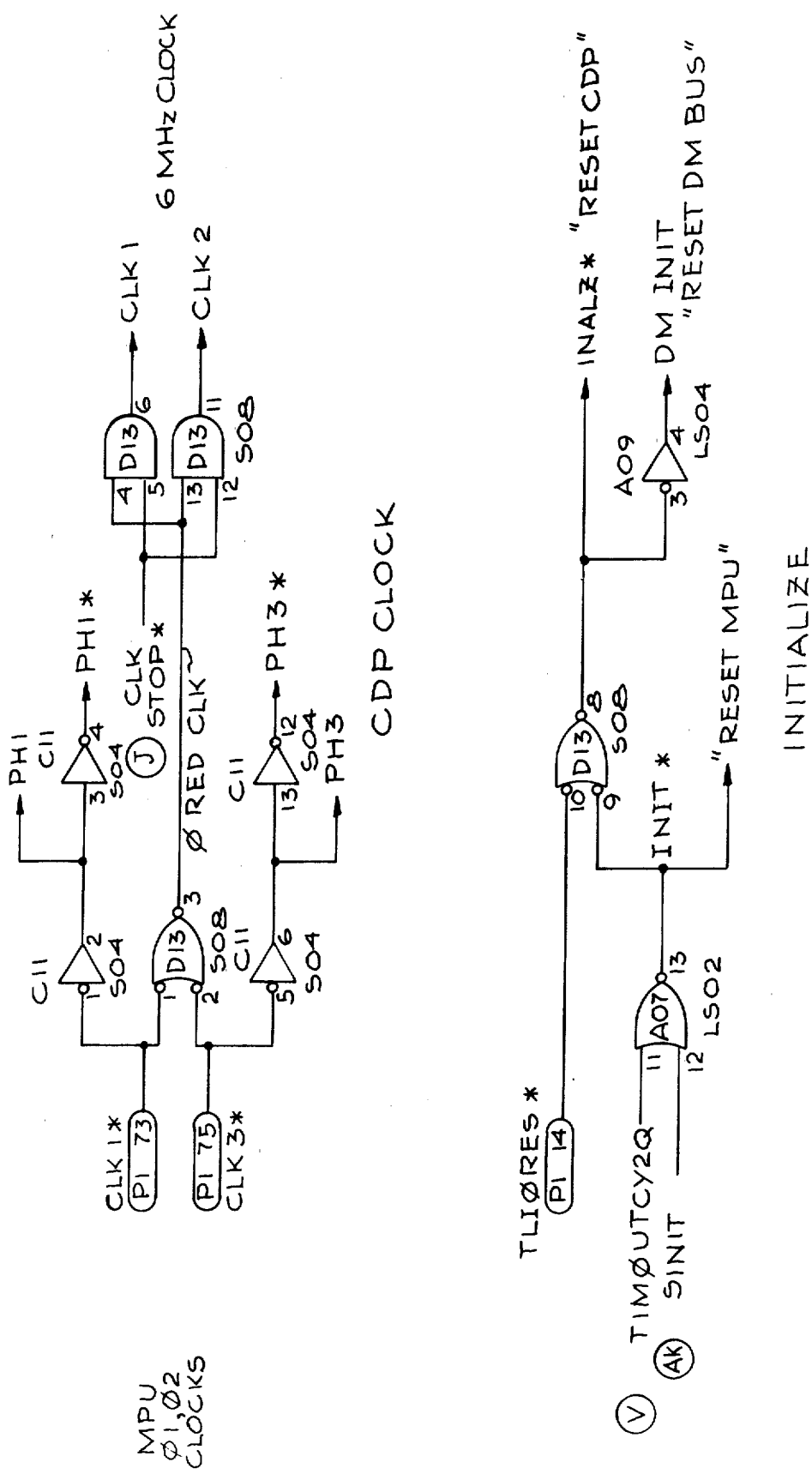
Figure 35:
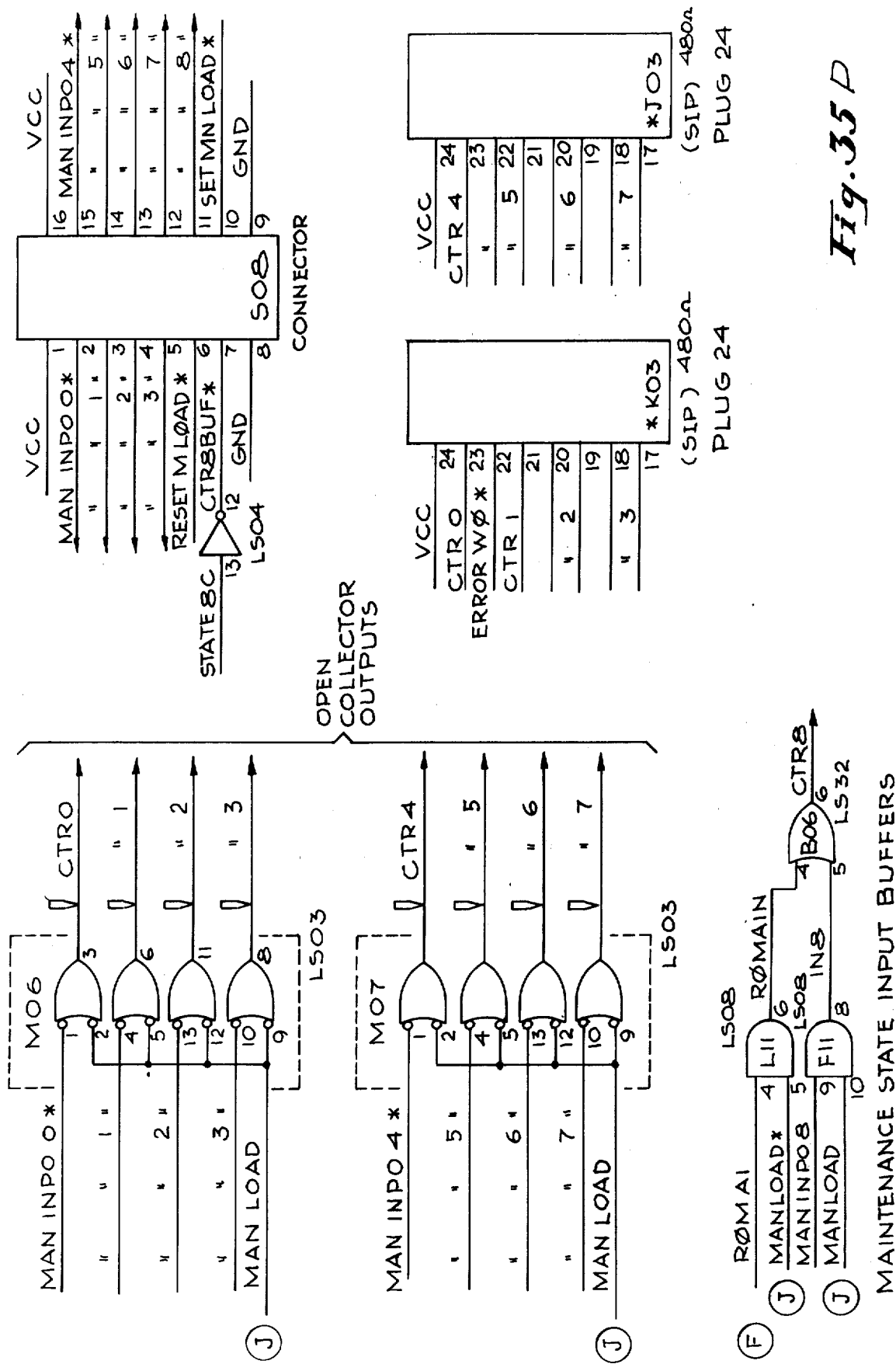
Figure 35R:
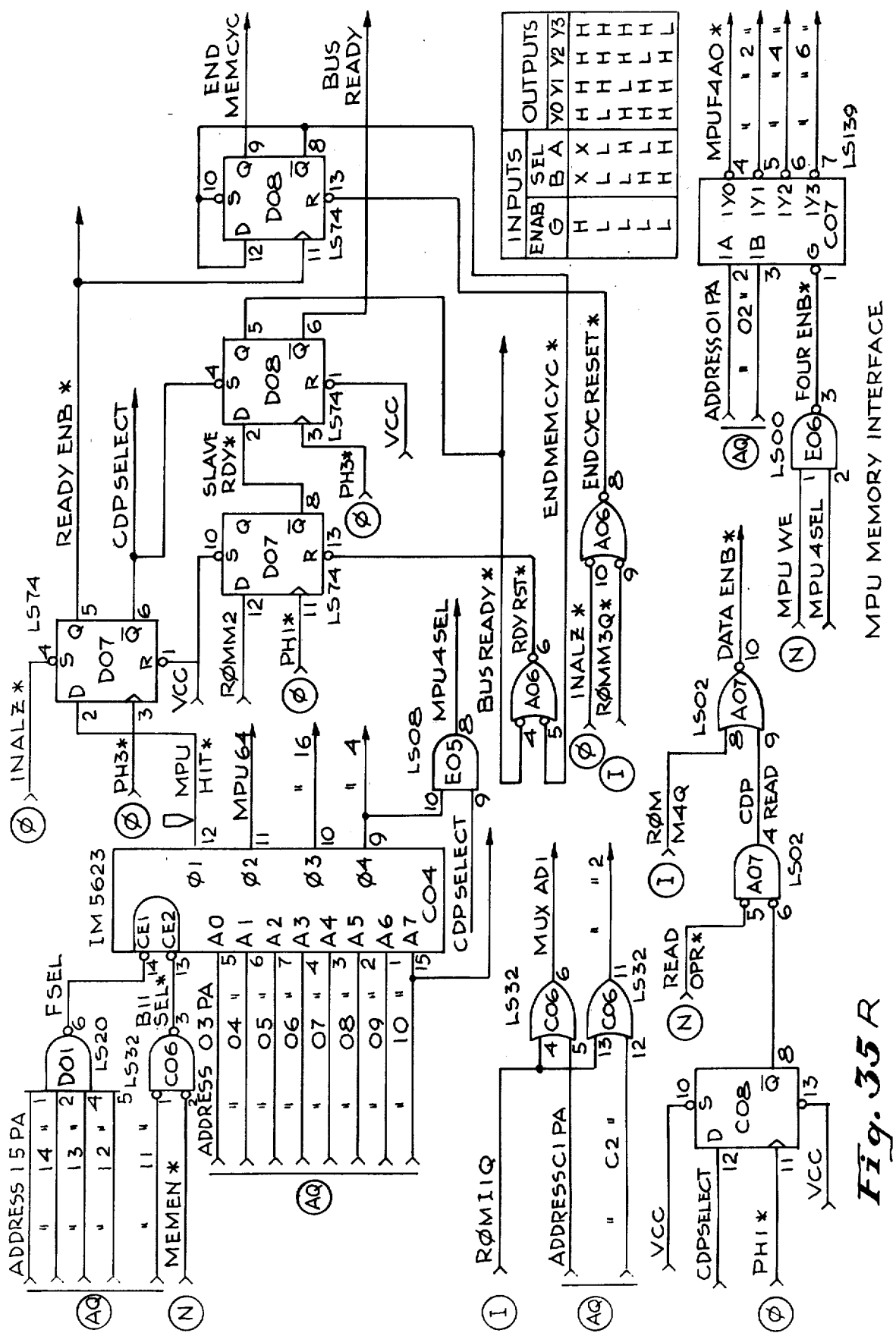
Figure 35:
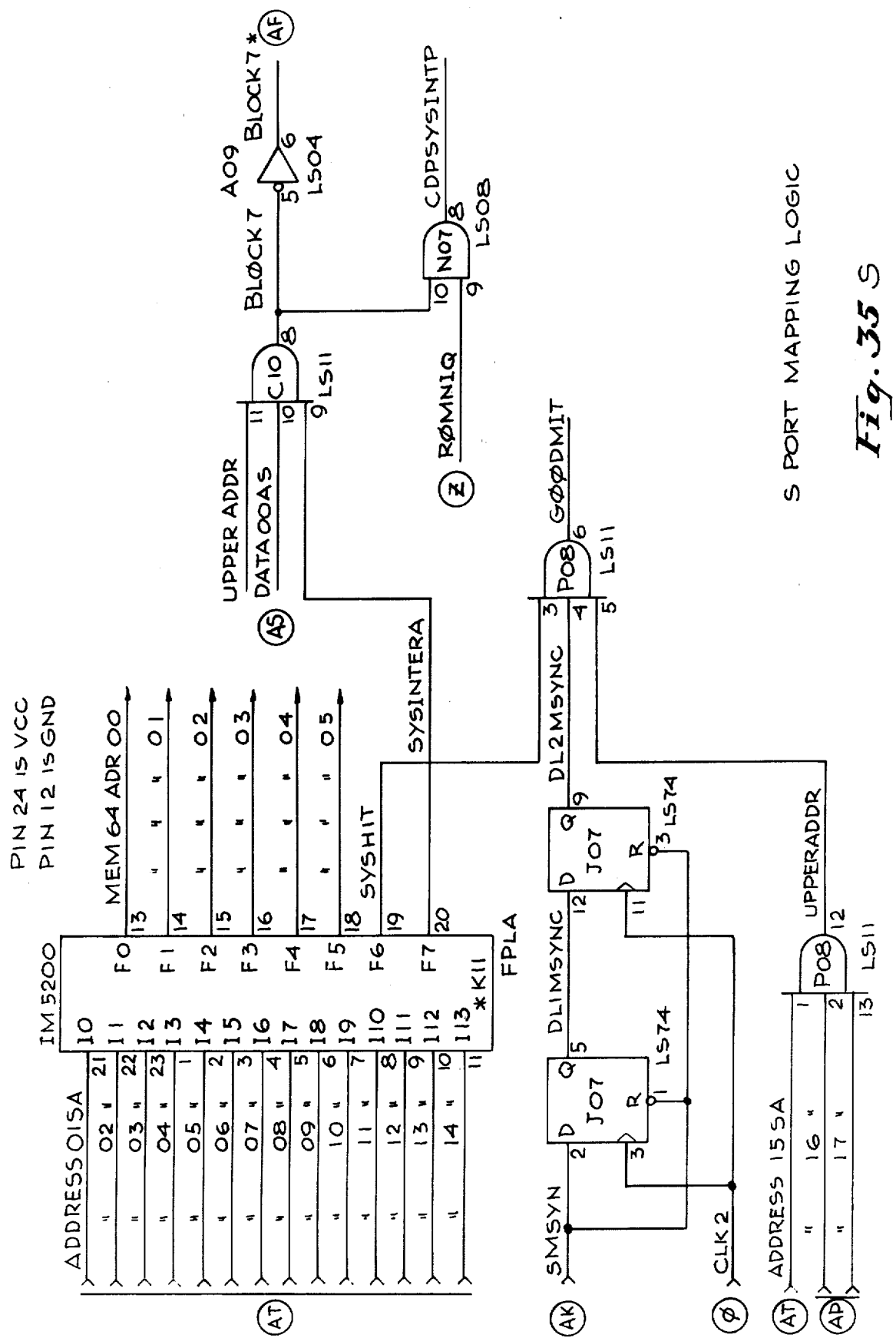
Figure 35:
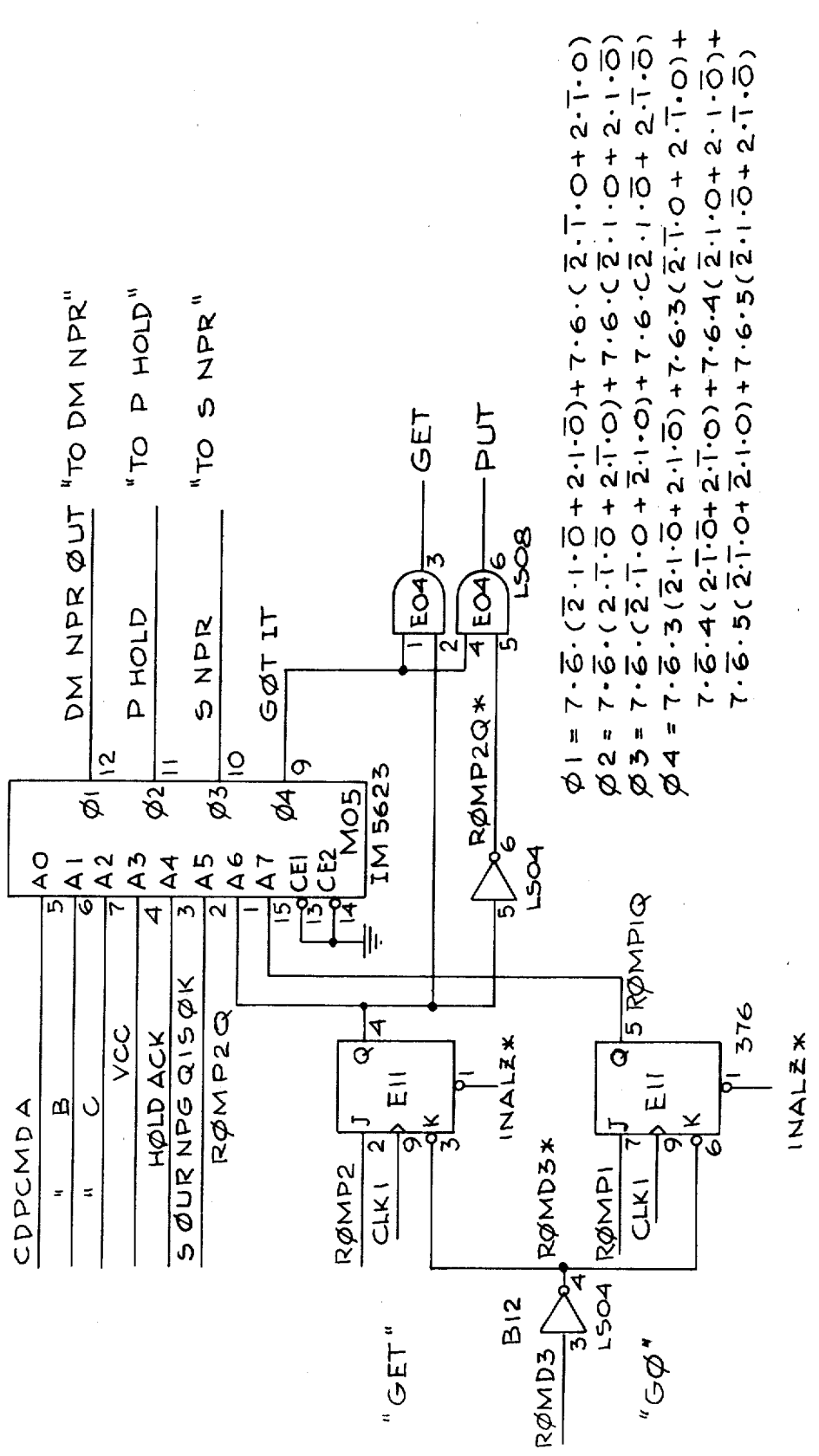
Figure 35U:
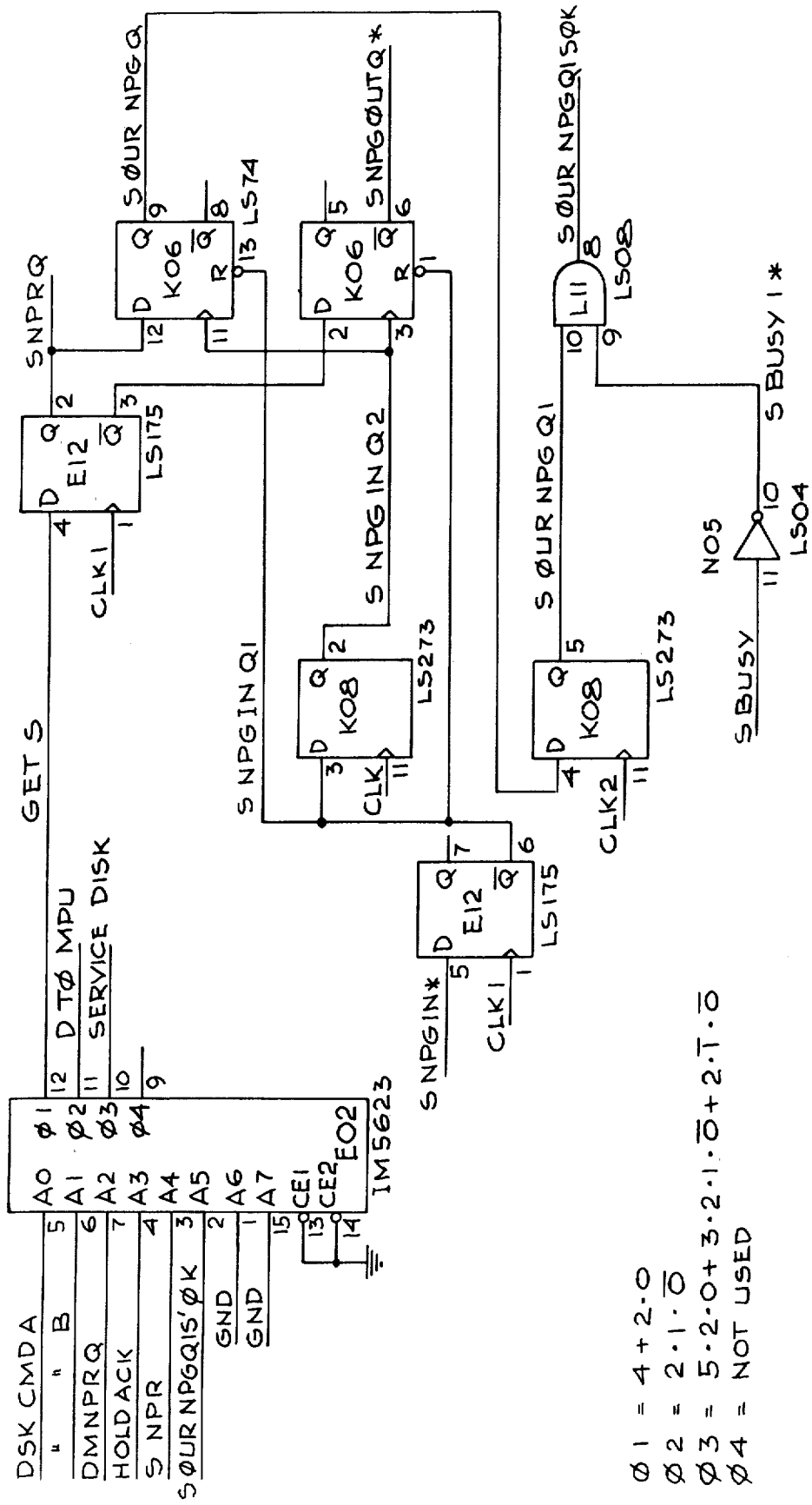
Figure 35:
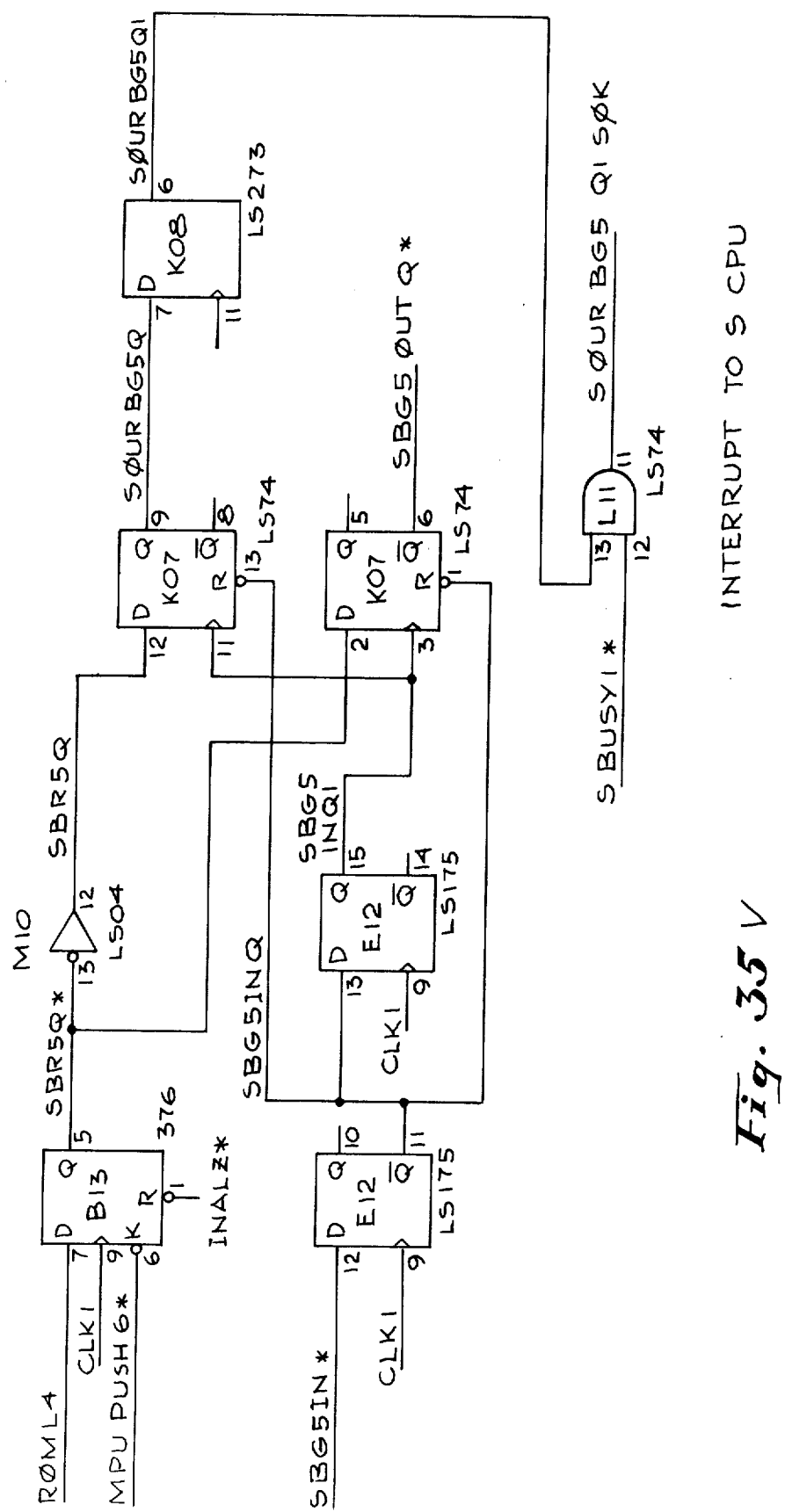
Figure 35:
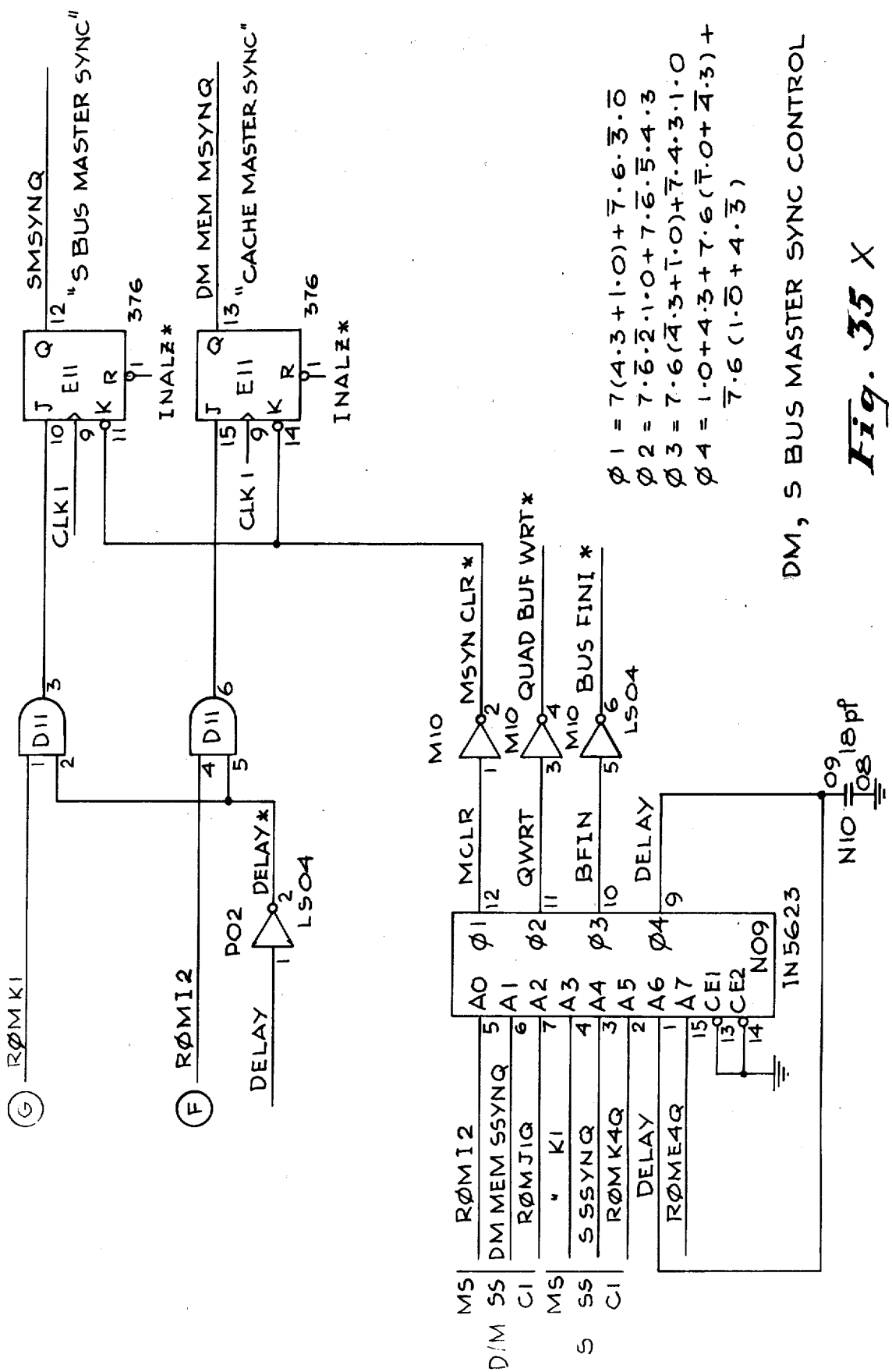
Figure 35:
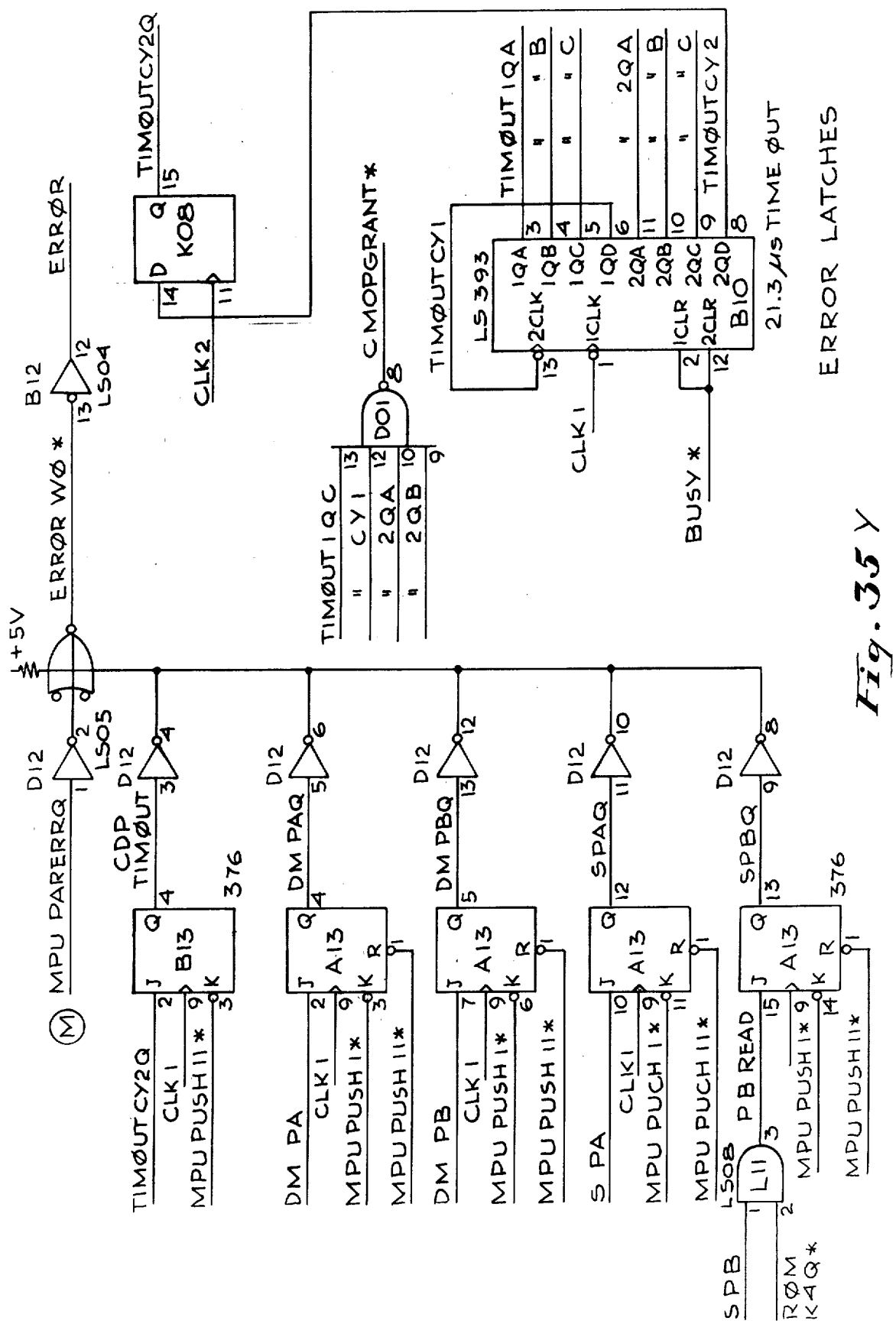
Figure 35:
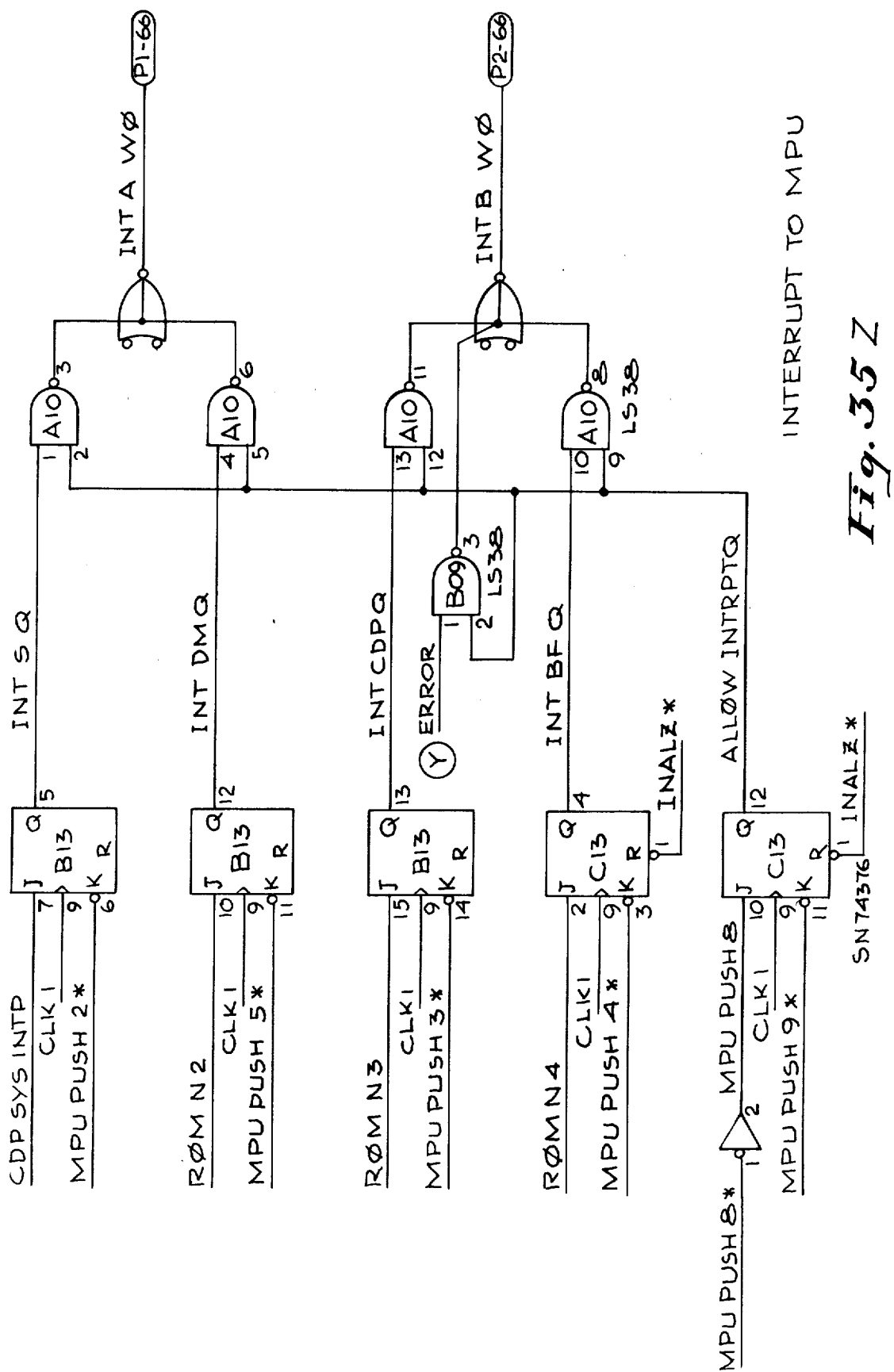

CPSRBK (See FIG. 34)
a. Clear status register.
b. Retrieve last delta (I) value and generate new M value. M = M + Delta CI)
c. Binary search the cache table to find disk blk number for specified disk drive number.
d. If disk block number found, determine if it is a dummy disk block number.
e. If disk block number found is dummy block number, then check if search is complete.
f. If the entire cache table is searched then reset number of block cell and exit.
g. If disk block number is found, save disk block number and determine number of blocks present.
h. Set disk block number found status and exit.

What is claimed:

1. A system for coupling a data processing system to a data storage subsytem comprising a random access memory and data transfer control means responsive to commands from said data processing system for preaccessing and transferring to said random access memory a predetermined amount of data resident in said data storage subsystem, and a configurable data path means connected to intercept said commands and adapted to respond to said commands for providing a data path between said data processing system and said data storage subsystem, between said data processing system and said random access memory, and between said random access memory and said data storage subsystem, as required by commands from said data processing system to said data storage subsystem intercepted by said configurable data path means, where said data transfer control means responds to intercepted commands for each requested access to said data storage subsystem for a block of data and controls accessing said random access memory for said block of data if previously transferred and still retained in said random access memory, and if not, controls accessing said data storage subsystem for transfer of said block of data both to said data processing system and to said random access memory simultaneously.

2. A system as defined in claim 1 wherein said data transfer control means includes means for determining what data in said random access memory is to be displaced by newly transferred data, once said random access memory is full, based upon programmed parameters, thereby retaining transferred data in said random access memory for a period of time dynamically determined by programmed parameters, said parameters pertaining to criteria for determining least useful data, whereby once said random access memory is full, said transfer means controls replacing said least useful data with subsequent blocks of data in response to requested access for data in said data storage system not being retained in said random access memory.

3. A system as defined in claim 2 wherein said criteria pertains to frequency of use, and said transfer control means comprises a first-in-first-out ordered directory in which the directory entry for data entered into said random access memory progresses to the head of the directory order as new data is entered into the random access memory, and old data having its directory entry at the head of the directory order is displaced, and in which directory entries of data accessed in said random access memory is reentered at the end of the directory order, whereby frequently accessed data has its directory entry frequently reentered in said directory to retain said data in said random access memory longer.

4. A system as defined in claim 3 wherein said transfer control means includes means for directing transfer of designated data from said data storage subsystem to said random access memory for retention until directed to remove it.

5. In a data processing system including a (1) main random access memory storing addressable information items, (2) at least one bulk data memory storing addressable information items, (3) a processing unit for generating instructions for retrieving information items stored in said bulk data memory or for storing information items in said bulk data memory, and (4) a system bus interconnecting said main memory and processing unit, the improvement comprising a control unit for reducing the time required to transfer addressed information items between said bulk data memory and said system bus, said control unit, including:

a high-speed buffer memory storing some of the information items stored in said bulk data memory; and logic means coupled to said system bus and responsive to instructions for retrieving addressed information items stored in said bulk data memory for determining whether or not each addressed information item is stored in said buffer memory and including means for accessing said addressed information item either from said buffer memory if the addressed information item is stored therein or from said bulk data memory if the addressed information item is not stored in said buffer memory;

said logic means further including data path means for transferring information items accessed from said buffer memory to said system bus and information items accessed from said bulk data memory to said system bus and said buffer memory simultaneously.

6. The system of claim 5 wherein said logic means further includes a programmable data processor having memory means storing data information identifying the information items stored in said buffer memory.

7. The system of claim 6 wherein said memory means further stores program information and wherein said data processor is responsive to said program information for controlling said data path means to transfer information items accessed from said bulk data memory to said main memory and selectively to said buffer memory.

8. The system of claim 5 wherein said logic means further includes data path means for transferring information items from said system bus to said bulk data memory and said buffer memory.

9. The system of claim 8 wherein said logic means includes a programmable data processor having a memory means storing program information and wherein said data processor is responsive to said program information for controlling said data path means to selectively transfer information items to and from said buffer memory.

10. The system of claim 5 wherein said buffer memory comprises a random access memory.

* * * * *